(12) United States Patent
Sun et al.

(10) Patent No.: US 10,890,383 B2
(45) Date of Patent: Jan. 12, 2021

(54) SYSTEMS AND METHODS OF USING PHASE CHANGE MATERIAL IN POWER PLANTS

(71) Applicants: Ying Sun, Merion Station, PA (US); Matthew McCarthy, Media, PA (US); Young I. Cho, Cherry Hill, NJ (US); Philipp Boettcher, Philadelphia, PA (US); Han Hu, Philadelphia, PA (US); Baolan Shi, Palo Alto, CA (US); Qinghua Xie, Reading, PA (US); Kent Zammit, Arroyo Grande, CA (US)

(72) Inventors: Ying Sun, Merion Station, PA (US); Matthew McCarthy, Media, PA (US); Young I. Cho, Cherry Hill, NJ (US); Philipp Boettcher, Philadelphia, PA (US); Han Hu, Philadelphia, PA (US); Baolan Shi, Palo Alto, CA (US); Qinghua Xie, Reading, PA (US); Kent Zammit, Arroyo Grande, CA (US)

(73) Assignee: Drexel University, Philadelphia, PA (US)

( * ) Notice: Subject to any disclaimer, the term of this patent is extended or adjusted under 35 U.S.C. 154(b) by 790 days.

(21) Appl. No.: 15/266,217

(22) Filed: Sep. 15, 2016

(65) Prior Publication Data

US 2017/0003079 A1    Jan. 5, 2017

Related U.S. Application Data

(63) Continuation-in-part of application No. 14/601,616, filed on Jan. 21, 2015, now Pat. No. 9,476,648.

(Continued)

(51) Int. Cl.
*F28D 20/02* (2006.01)
*F28B 1/02* (2006.01)

(Continued)

(52) U.S. Cl.
CPC .............. *F28D 20/023* (2013.01); *F28B 1/02* (2013.01); *F28B 9/06* (2013.01); *F28C 1/14* (2013.01);

(Continued)

(58) Field of Classification Search
CPC ........ F28D 20/02; F28D 20/023; F28D 19/04; F28D 19/041; F28D 19/042
See application file for complete search history.

(56) References Cited

U.S. PATENT DOCUMENTS 3,788,385 A    1/1974   Delahunty
4,299,274 A *  11/1981  Campbell ............... F28D 20/02
                                                      126/400

(Continued)

FOREIGN PATENT DOCUMENTS

EP    0220607 B1    8/1989
EP    0402131 B1    10/1993

(Continued)

OTHER PUBLICATIONS

Wei, Study on a PCM heat storage system for rapid heat supply, 2005, Applied Thermal Engineering (Year: 2005).*

(Continued)

*Primary Examiner* — Eric S Ruppert
(74) *Attorney, Agent, or Firm* — Mendelsohn Dunleavy, P.C.

(57) ABSTRACT

Phase change material modules for use in a heat exchanger are described. The phase change material module comprises two or more set of a plurality of substantially aligned hollow structures arranged to form a porous structure. A phase change material capable of undergoing a phase change as a result of heat exchange between it and a fluid is housed within the hollow tubes. Also described is a phase change material module with hollow tubes having a cross-sectional (Continued)

area through the phase change material selected from elliptical, rectangular, stadium-shaped, teardrop-shaped, airfoil-shaped, rounded rectangle and ovoid. A heat exchanger comprising a plurality of the phase change material modules, a first fluid inlet and outlet, and a second fluid inlet and outlet, wherein the phase change material modules are repeated circulated from alignment with the first fluid inlet and the second fluid inlet is also described.

14 Claims, 38 Drawing Sheets
(30 of 38 Drawing Sheet(s) Filed in Color)

Related U.S. Application Data

(60) Provisional application No. 62/219,557, filed on Sep. 16, 2015, provisional application No. 61/929,747, filed on Jan. 21, 2014.

(51) Int. Cl.
  *F28C 1/14* (2006.01)
  *F28B 9/06* (2006.01)
  *F28D 1/02* (2006.01)
  *F28C 3/10* (2006.01)

(52) U.S. Cl.
  CPC ............. *F28D 20/021* (2013.01); *F28C 3/10* (2013.01); *F28D 1/024* (2013.01); *Y02E 60/14* (2013.01)

(56) References Cited

U.S. PATENT DOCUMENTS

| | | | | |
|---|---|---|---|---|
| 4,443,389 | A | | 4/1984 | Dodds |
| 4,449,573 | A | * | 5/1984 | Pettersson ............... F28D 17/02 165/10 |
| 5,323,842 | A | * | 6/1994 | Spokoyny ............... F23L 15/02 165/10 |
| 5,441,097 | A | * | 8/1995 | Kanda ................. F28D 20/0034 165/10 |
| 5,482,108 | A | * | 1/1996 | Essle ...................... F23L 15/02 165/8 |
| 7,823,381 | B2 | | 11/2010 | Misselhorn |
| 7,900,690 | B2 | | 3/2011 | Hawwa et al. |
| 8,895,124 | B2 | | 11/2014 | Van Eibergen et al. |
| 2002/0000306 | A1 | * | 1/2002 | Bradley ................. F28D 20/02 165/10 |
| 2005/0269063 | A1 | | 12/2005 | Zuo et al. |
| 2008/0010999 | A1 | | 1/2008 | Sonnenrein |
| 2010/0018237 | A1 | | 1/2010 | Wallace |
| 2010/0154406 | A1 | | 6/2010 | Conrad et al. |
| 2010/0186438 | A1 | | 7/2010 | Jarvis |
| 2011/0162829 | A1 | | 7/2011 | Xiang |
| 2012/0018116 | A1 | | 1/2012 | Mathur et al. |
| 2012/0111005 | A1 | | 5/2012 | Fichtner et al. |
| 2013/0000867 | A1 | | 1/2013 | Szabo et al. |
| 2013/0228308 | A1 | | 9/2013 | Abhari |
| 2014/0023853 | A1 | | 1/2014 | Gueret et al. |

FOREIGN PATENT DOCUMENTS

| | | |
|---|---|---|
| EP | 1031808 A2 | 8/2000 |
| EP | 1015832 B1 | 9/2001 |
| EP | 1478891 B1 | 10/2008 |
| EP | 1841964 B1 | 9/2010 |
| EP | 2498037 A2 | 9/2012 |
| EP | 2612755 A1 | 7/2013 |
| JP | 2001201284 A | 7/2001 |
| JP | 2008309344 A | 12/2008 |
| KR | 101102333 B1 | 1/2012 |
| WO | WO2012011934 A1 | 1/2012 |

OTHER PUBLICATIONS

Mehling, H., et al., "Solid-Liquid Phase Change Materials," Heat and Cold Storage with PCM Heat and Mass Transfer, 2008, pp. 11-55.

Choi, Y. "Phase-Change Materials: Trends & Prospects," Department of Materials Science and Engineering, Korea Aerospace University, Jan. 10, 2013, pp. 1-58.

Shi, J., et al., "Potential Game Changing Cooling Technology Development for Power Plant Water Conservation," EPRI Electric Power Research Institute, Texas Industries of the Future Technology Forum, Houston, TX, Jun. 19, 2013.

Sutterlin, W. R., "Phase Change Materials, A Brief Comparison of Ice Packs, Salts, Paraffins, and Vegetable-derived Phase Change Materials," Pharmaceutical Outsourcing, Journal of Pharmaceutical and Biopharmaceutical Contract Services, 1-4 pages.

"Phase-change material" as retrieved on Nov. 22, 2013 from "http://en.wikipedia.org/w/index.php?title=Phase-change_material&oldid=562227688".

International Search Report and Written Opinion; dated Apr. 30, 2015 for the corresponding PCT Application No. PCT/US2015/012191.

* cited by examiner

FIG. 7

Prior Art $\delta_{PCM}$ =1.6mm, $L_{plate}$ =25.4mm,
$\delta_{wall}$ =0.2mm high-density polyethylene

| Parameter | Value |
|---|---|
| PCM density [kg/m³] | 800 |
| PCM latent heat [kJ/kg] | 240 |
| PCM cond. [W/m-K] | 0.2 |
| Encapsulant cond. [W/m-K] | 0.45 |

SYSTEMS AND METHODS OF USING PHASE CHANGE MATERIAL IN POWER PLANTS

RELATED APPLICATION DATA

This application is a continuation-in-part of U.S. application Ser. No. 14/601,616, filed on Jan. 21, 2015, which claims the benefit of U.S. Provisional Application No. 61/929,747, the contents of which are incorporated herein by reference. This application also claims the benefit of U.S. Provisional Application No. 62/219,557, filed on Sep. 16, 2016, the contents of which are also herein incorporated by reference.

STATEMENT OF GOVERNMENT INTEREST

This invention was made with government support under Grant No. 1357918 by the National Science Foundation. The government has certain rights in the invention.

BACKGROUND OF THE INVENTION

1. Field of the Invention

The present invention is directed to the field of power plants. In particular, the present invention is directed to systems and methods for cooling a power plant using phase change materials.

The cooling towers for power plants generally consume a large amount of water. For example, in the year 2000, coal and gas power plants in the eight-state Interior West region of the United States withdrew over 650 million gallons of water per day, totaling over 728,000 acre-feet each year. That is enough water for the annual needs of at least 3.64 million people. Water in the West of the United States is becoming increasingly valuable especially in light of widespread drought conditions.

2. Description of Related Technology

Although agriculture is the largest water user in most of the United States, power production can have a large impact on the water supply and water quality in specific locations, especially in river basins that are already over-extended with other water uses. Large amounts of research have been devoted to design a cooling tower with a higher cooling efficiency and to reduce water consumption. For example, U.S. Patent Application Publication No. 2010/0018237 discloses a low water consumption cooling tower for gasification plants. The cooling tower comprises a wet section having a plurality of wet section fans and a dry section having a plurality of dry section fans. The wet section fans are adjustable to operate at different rates, depending upon ambient conditions surrounding the cooling tower. The wet section may comprise at least one shutter door. In operation, the wet section fans typically operate at an increased rate during a summer peak price period and at a reduced rate during a winter peak price period and an off-peak price period. The dry section fans operate at the increased rate all year. This method allows for less evaporative cooling and more latent cooling thereby reducing water consumption.

U.S. Patent Application Publication No. 2010/0154406 discloses a cooling tower system that exhibits increased energy efficiency. The cooling tower system includes a cooling tower unit, an expansion engine and a power operated component such as a fan or pump. The process fluid is first used to heat a working fluid for an expansion engine before being sent to the cooling tower for cooling. Power generated by the expansion engine is utilized to operate a component of the cooling tower such as a fan or a pump. The cooling tower is also utilized to provide cooling to condense the working fluid from vapor to liquid. The cooling tower removes waste heat from the process fluid.

U.S. Patent Application Publication No. 2013/0000867 discloses a hybrid cooling system for condensing an exhaust stream of a steam turbine. The cooling system comprises a dry cooling circuit, a dry air-cooled unit performing heat dissipation to cooling water flowing therein, and a wet cooling circuit and a wet cooled unit performing heat dissipation to the cooling water flowing therein. The cooling water flowing in the dry cooling circuit is separated from the cooling water flowing in the wet cooling circuit, and the dry and wet cooling circuits are connected to a common condenser. The hybrid cooling system reduces the evaporation and deposition losses of the wet cooling system, thereby reducing water consumption.

EP 2 498 037 A2 discloses a hybrid fan cooling tower apparatus that extends along a vertical axis. The cooling tower includes a first housing structure having an inlet and a first outlet located at a first position along the vertical axis, wherein the housing structure includes a base and opposing side walls that extend along the vertical axis away from the base. The tower also includes a heat exchanger disposed in the housing structure. The heat exchanger is positioned adjacent the first outlet and extends at least partially across the first outlet. The hybrid tower employs an air current generator positioned in a plane normal to the vertical axis and oriented to direct an air stream toward the base and through the heat exchanger and the first outlet.

Even with these improved cooling tower designs from the prior art, water consumption is still a major disadvantage for power plants throughout the world. The reliance on water places constraints on the location of power plants, which is currently limited to areas near a large body of water. Unfortunately, these areas are also densely populated, creating safety and pollution concerns. A cooling tower that reduces or eliminates water consumption will enable building of power plants in remote areas with little water available which are poorly suited for human living and agriculture.

SUMMARY OF THE INVENTION

An aspect of the invention may be a cooling system for cooling a fluid, comprising: a phase change material container housing at least one phase change material; at least one conduit for transporting said fluid passing through said phase change material; an air flow chamber; a device for generating an air flow through the air flow chamber; an air flow outlet fluidly connected to said air flow chamber for removing heated air from said cooling system; and a phase change material flow system for circulating phase change material from said phase change material container via said air flow chamber and back to said phase change material container.

Another aspect of the invention may be a method for operating a cooling system for cooling a fluid, comprising steps of: transferring heat from the fluid to a phase change material to melt at least some of the phase change material to provide liquid phase change material; spraying droplets containing said liquid phase change material into circulating air for cooling and solidifying at least some of the liquid phase change material to provide solid phase change material by heating said air to provide heated air; recycling the solid phase change material to the transferring step; and removing the heated air from the cooling system Still yet another aspect of the invention may be a cooling system for cooling a fluid, comprising a heat exchanger including an encapsulated phase change material, wherein heat is transferred from the fluid to an encapsulated phase change material to melt at least some of the phase change material therein.

Another embodiment of the invention includes a heat exchanger for cooling a fluid comprising: a plurality of phase change material modules mounted for rotation about a central axis to form a porous structure, each said phase change material module including a plurality of hollow structures and a phase change material housed within the hollow structures; a first fluid inlet positioned to direct the fluid through the porous structure for contact between the first fluid and an outer surface of the hollow structures; a first fluid outlet for removing the first fluid from the heat exchanger and located to receive the first fluid after contact with the hollow structures; a second fluid inlet positioned to direct a second fluid through the porous structure for contact between the second fluid and the outer surface of the hollow structures; and a second fluid outlet for removing the second fluid from the heat exchanger and located to receive the second fluid after contact with the hollow structures, wherein rotation of the plurality of phase change material modules repeatedly circulates the porous structure of the modules into alignment with the first fluid inlet and the second fluid inlet, and the phase change material is selected to undergo a phase change as a result of heat exchange with each of the first and second fluids.

In the foregoing embodiment of the invention, said phase change material is selected from the group consisting of paraffinic hydrocarbons and fatty acids.

In each of the foregoing embodiments, the outer surfaces of the hollow structures is formed from a hydrophobic polymeric material.

In each of the foregoing embodiments comprises at least two sets of hollow structures in each said phase change material module and wherein each hollow tube of a set is substantially aligned in an intended fluid flow direction.

In each of the foregoing embodiments, the hollow structures have a length of a cross-section the hollow structure that is at least twice as long as a width of the same cross-section of the hollow structure.

Each of the foregoing embodiments further comprises a fluid removal section located such that said phase change material modules rotate through said fluid removal section to allow removal of fluid from the hollow structures.

In each of the foregoing embodiments, the first fluid inlet is fluidly connected to a supply of liquid and the second fluid inlet is fluidly connected to a supply of air and the phase change material freezes at a temperature above a temperature of the air and below a temperature of the liquid.

In each of the foregoing embodiments, the flow direction of the first fluid inlet is substantially opposite a flow direction of the second fluid inlet.

In each of the foregoing embodiments, said hollow structures have a cross-sectional area through said phase change material selected from the group consisting of elliptical, rectangular, stadium-shaped, teardrop-shaped, airfoil shaped, rounded rectangular, and ovoid.

In each of the foregoing embodiment, each of said hollow structures includes a plurality of partitions inside the hollow structure to increase rigidity of the hollow structure.

Another embodiment of the present invention includes a phase change material module suitable for use in a heat exchanger comprising two or more sets of a plurality of substantially aligned hollow structures arranged to form a porous structure, a phase change material located within said hollow structures, said phase change material being capable of undergoing a phase change as a result of heat exchange between said phase change material and a fluid.

In each of the foregoing embodiments, a distance between hollow structures as measured in a direction substantially parallel to an intended fluid flow direction is from about 1 to about 5 times a largest distance across said hollow structures as measured in the direction substantially parallel to the intended fluid flow direction. Preferably, the distance between hollow structures as measured in a direction substantially parallel to an intended fluid flow direction, is from about 2 to about 4 times a diameter of said hollow structures as measured in the direction substantially parallel to the intended fluid flow direction.

In each of the foregoing embodiments, a distance between hollow structures as measured in a direction substantially perpendicular to an intended fluid flow direction is from about 4 to about 16 times a largest distance across the hollow structures in a direction substantially parallel to the intended fluid flow direction. Preferably, the distance between hollow structures as measured in a direction substantially perpendicular to an intended fluid flow direction is from about 10 to about 14 times a diameter of the hollow structures in a direction substantially parallel to the intended fluid flow direction.

In each of the foregoing embodiments, the hollow structures are substantially aligned in an intended fluid flow direction.

Another embodiment of the present invention includes a phase change material module suitable for use in a heat exchanger comprising a plurality of hollow structures arranged to form a porous structure, a phase change material located within said hollow structures, said phase change material being capable of undergoing a phase change as a result of heat exchange between said phase change material and a fluid, wherein said hollow structures have a cross-sectional area through said phase change material selected from the group consisting of elliptical, rectangular, stadium-shaped, teardrop-shaped, airfoil shaped, rounded rectangular, and ovoid, In each of the foregoing embodiments, a wall forming each said hollow structure is made of high-density polyethylene and the wall is about 0.1 to about 0.3 mm thick or about 0.2 mm thick.

Yet another embodiment of the present invention includes a power plant cooling system, a power plant, a data center cooling system or a data center including one or more of any of the foregoing heat exchangers, and preferably a plurality of any of the foregoing heat exchangers.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 7 shows the relationship between spray-freezing distance vs. phase change material droplet diameter in a computer simulated model.

DETAILED DESCRIPTION OF THE PREFERRED EMBODIMENT(S)

Figure 1:
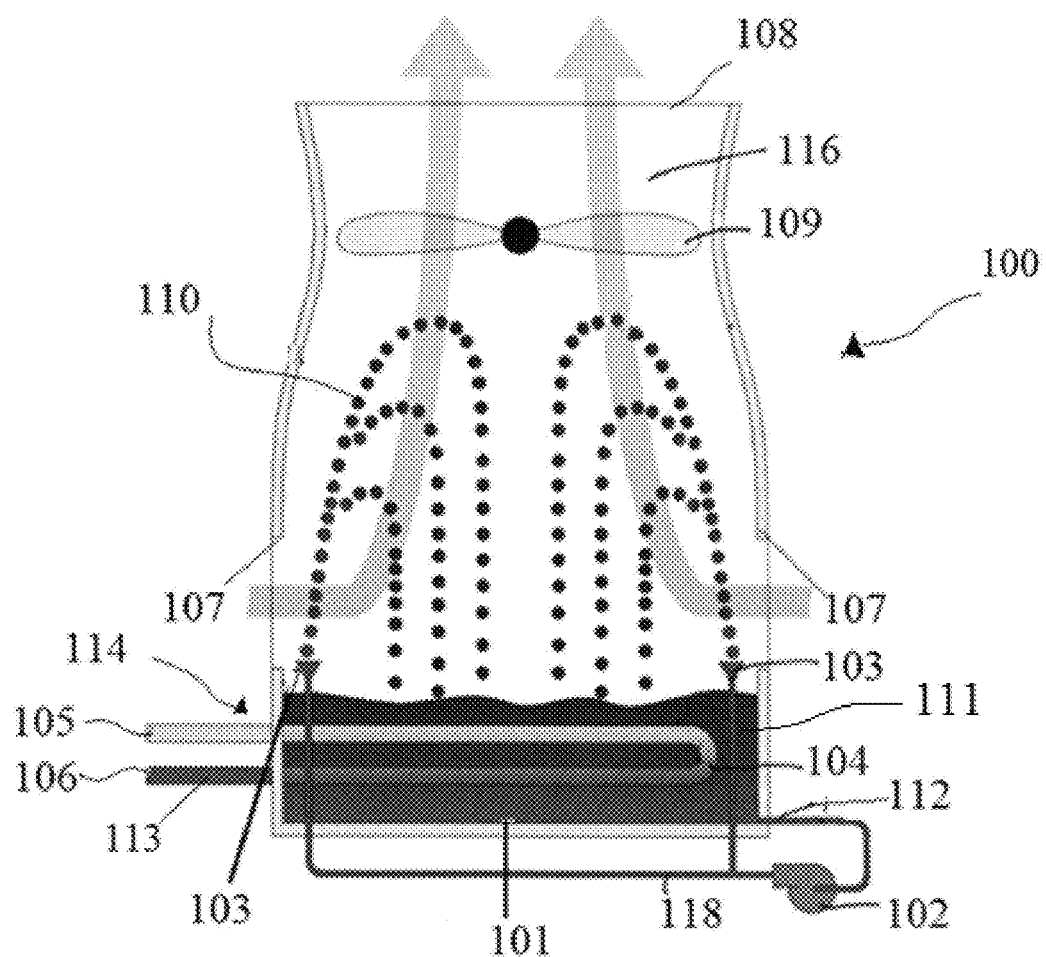
FIG. 1 is a schematic representation of a cooling system according to one embodiment of the present invention.

For illustrative purposes, the principles of the present disclosure are described by referencing various exemplary embodiments. Although certain embodiments are specifically described herein, one of ordinary skill in the art will readily recognize that the same principles are equally applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel method is therefore not limited to the particular arrangement of steps disclosed herein.

It must be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably. Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

As used herein, the term "phase change material" or "PCM" refers to a material that has the capability of absorbing or releasing heat by undergoing a phase change or transition within a temperature stabilizing range. A temperature stabilizing range can include a specific phase change or transition temperature or a range of phase change or transition temperatures. Heat can be stored by, or removed from, a phase change material as a result of the material undergoing a phase change. Phase change materials described herein have an enthalpy of phase change of at least about 50 J/g.

As used herein, the term "encapsulated phase change material" or "EPCM" refers to a phase change material that is partially or completely enclosed by another material. For example, a phase change material encapsulated by a tube or a sphere.

Spray-Freezing of Phase-Change Materials

As shown in FIG. 1, the present invention provides a cooling system 100 for cooling a fluid 113. The cooling system 100 has a PCM flow system 114, which includes a PCM container 101 housing at least one PCM 111. The PCM container 101 has at least one conduit 104 located therein for transporting fluid 113 through the PCM 111 located within the PCM container 101. The fluid 113 may be any fluid typically used for cooling, such as water.

An air flow chamber 116 is located above the PCM container 101 within the cooling system 100. The air flow chamber 116 is provided with an air flow device 109 for generating air flow through the air flow chamber 116 and an outlet 108 for removing heated air from the cooling system 100. The air flow device 109 in the embodiment shown in FIG. 1 is large fan-type object with rotating blades. However, other mechanisms may be used as the air flow device 109 in order to create the air flow.4

The PCM system 114 comprises an outlet 112 located at a lower portion of the PCM container 101, at least one PCM spray nozzle 103 for spraying liquid-containing PCM droplets 110 into the air flow chamber 116, and a pump 102 in fluid communication with the PCM spray nozzle 103 and outlet 112 of the PCM container 101. The pump 102 moves the liquid-containing PCM from the outlet 112 to the PCM spray nozzle 103 and the PCM spray nozzle 103 sprays the liquid-containing PCM 111 into the air flow chamber 116. The PCM outlet 112 may be located at a lower portion of the phase change material container 101, where the phase change material 111 contains liquid phase change material 115. In an exemplary embodiment, the PCM outlet 112 is at or near the bottom of the phase change material container 101. However, the liquid PCM 115 may also be pumped to an elevated position in the air flow chamber 116 below the air flow device 109 and sprayed downwardly into the PCM container 101.

For certain implementations, the PCM 111, may be a PCM that can be a mixture of two or more materials. By selecting two or more different materials and forming a mixture, a temperature stabilizing range can be adjusted for any desired application. The resulting mixture can exhibit two or more different phase transition temperatures or a single modified phase transition temperature when encapsulated in the coated articles described herein.

Phase change materials may be broadly divided into organic phase change materials and inorganic phase change materials. Organic phase change materials, include paraffinic hydrocarbons ($C_nH_{2n+2}$) and fatty acids ($CH_3(CH_2)_{2n}COOH$). Other organic phase change materials include fatty alcohols, glycols, ethers, amides, fatty acid esters, linear hydrocarbons, branched hydrocarbons, cyclic hydrocarbons, halogenated hydrocarbons and combinations thereof. Alkanes (often referred to as paraffins), esters and alcohols are particularly preferred. Alkanes are preferably substantially n-alkanes that are most often commercially available as mixtures of substances of different chain lengths, with the major component, which can be determined by gas chromatography, having 10-50, or usually between 12 and 32 carbon atoms. Examples of suitable major components of alkane organic phase change materials include n-octacosane, n-docosane, n-eicosane, n-octadecane, n-heptadecane, n-hexadecane, n-pentadecane and n-tetradecane.

Suitable esters for use as organic phase change materials may comprise one or more $C_1$-$C_{10}$ alkyl esters of $C_{10}$-$C_{24}$ fatty acids, particularly methyl esters where the major component is methyl behenate, methyl arachidate, methyl stearate, methyl palmitate, methyl myristate or methyl laurate. Suitable alcohols for use as organic phase change materials include one or more alcohols where the major component is, for example, n-decanol, n-dodecanol, n-tetradecanol, n-hexadecanol, and n-octadecanol.

Inorganic phase change materials include salt hydrates ($M_n H_2 O$), as well as inorganic salts such as aluminum phosphate, ammonium carbonate, ammonium chloride, cesium carbonate, cesium sulfate, calcium citrate, calcium carbonate, calcium chloride, calcium hydroxide, calcium oxide, calcium phosphate, calcium saccharate, calcium sulfate, cerium phosphate, chromic chloride, iron phosphate, lithium carbonate, lithium sulfate, magnesium chloride, magnesium sulfate, manganese chloride, manganese nitrate, manganese sulfate, potassium acetate, potassium carbonate, potassium chloride, potassium hydroxide, potassium phosphate, rubidium carbonate, rubidium sulfate, disodium tetraborate, sodium acetate, sodium bicarbonate, sodium bisulfate, sodium borate, sodium carbonate, sodium citrate, sodium chloride, sodium hydroxide, sodium nitrate, sodium percarbonate, sodium persulfate, sodium phosphate, sodium propionate, sodium selenite, sodium silicate, sodium sulfate, sodium tellurate, sodium tetraborate, sodium thiosulfate, strontium hydrophosphate, zinc acetate, zinc chloride, eutectic of $Li_2CO_3$ and $Na_2CO_3$, and combinations thereof.

Phase change materials can undergo a solid-liquid/liquid-solid phase transition at phase changing temperatures. A person skilled in the art may select the proper phase change material depending on the temperature of the fluid 113 entering and exiting the PCM container 101. At the temperature of the fluid 113 entering the PCM container 101, the phase change material should be essentially a liquid. In addition, at the temperature of the fluid 113 exiting the phase change material container 101, the phase change material should also be liquid.

Figure 2:
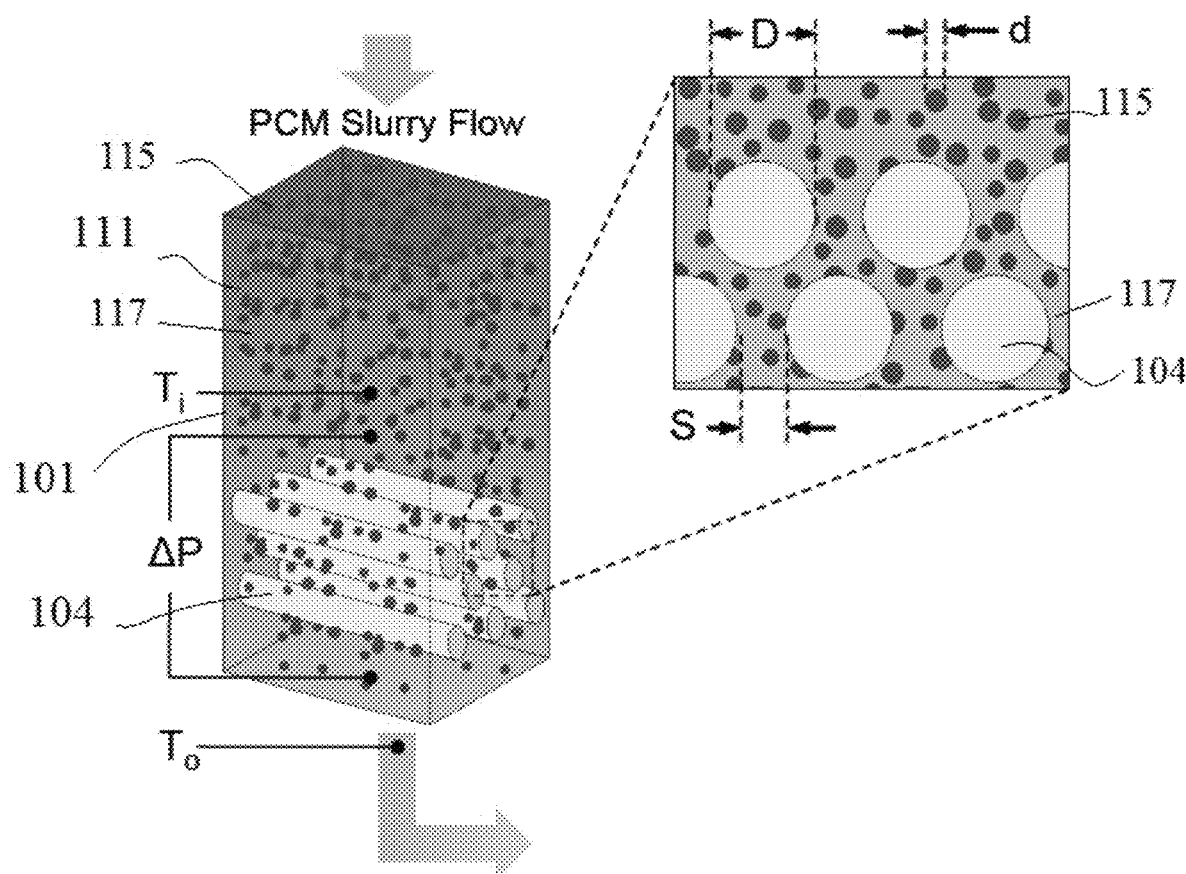
FIG. 2 is a schematic representation of phase change material slurry flow and heat transfer characteristics in the phase change material.

Referring to FIG. 2, in some embodiments, the PCM 111 in the PCM container 101 may be a slurry of solid particles 117 and liquid PCM 115. The provision of a slurry of phase change material 111 in the PCM container 101 offers some advantages by promoting heat transfer through the phase change material 111 and by stabilizing the temperature of the slurry. The lower portion of the phase change material 111 in the PCM container 101 will contain liquid PCM 115.

Referring back to FIG. 1, in some embodiments, the phase change temperature of the PCM 111 is from about 0° C. to about 100° C. below the temperature of the fluid 113 entering into the inlet 105 and passing through the PCM container 101 via the conduit 104. In some embodiments, the phase change temperature of the PCM 111 is from about 5° C. to about 80° C. below the temperature of the fluid 113 passing into the inlet 105 and passing through the phase change material container 101 via conduit 104. In some embodiments, the phase change temperature of the PCM 111 is from about 10° C. to about 60° C. below the temperature of the fluid 113 passing into the inlet 105 and through the phase change material container 101 via conduit 104.

In some embodiments, the fluid 113 is steam which is passed through the conduit 104 to be condensed. The steam enters the conduit 104 through the fluid inlet 105 and exits as a liquid (such as water) through the fluid outlet 106. In an exemplary embodiment, the steam condensation temperature is in the range of from about 20° C. to about 70° C., or from about 25° C. to about 60° C., or from about 30° C. to about 55° C., or from about 30° C. to about 50° C., or from about 35° C. to about 45° C. It has been found that at a fluid condensation temperature of about 40° C. using a phase change material, net power production can be increased, with a gain of up to 10%, in comparison with air cooled condensers.

In an another exemplary embodiment, the phase change temperature of the PCM 111 is in the range of from about 10° C. to about 60° C., or from about 15° C. to about 50° C., or from about 20° C. to about 45° C., or from about 20° C. to about 40° C., or from about 25° C. to about 35° C.

Generally, the enthalpy of phase change for the phase change of the PCM 111 is high. Suitable organic phase change materials 111 exhibit a high enthalpy of phase change, typically greater than 50 J/g, usually at least 90 J/g, preferably at least 100 J/g, more preferably greater than 120 J/g, even more preferably greater than 150 J/g and most preferably greater than 200 J/g when determined by Differential Scanning Calorimetry (DSC) as measured using a Perkin Elmer DSC1 at a scan speed of 5° C./minute. This high enthalpy of phase change allows a relatively large amount of heat transfer from the fluid to the PCM 111 and from the PCM droplets 110 to the air, based on the weight of the PCM 111, and allows use of less material to transfer the heat rendering the cooling system 100 more energy efficient.

In some embodiments, one or more types of thermal conductivity enhancers, including metal meshes, graphite foams, and nano-sized additives may be added to the PCM 111 to facilitate heat transfer to or from the PCM 111. Metal meshes have mesh holes for enhancing thermal conductivity. The meshes have a structure in which fibers of the mesh are interwoven, such as a film or sheet provided with through holes. More details about metal meshes can be found in, for example, EP 2 612 755 A1, the disclosure of which is incorporated herein by reference in its entirety.

Graphite foams offer an integrated network for heat flow. In one embodiment, graphite foams are embedded between the conduits 104 to enhance thermal conductivity in the PCM container 101. Such graphite foams may add drag to phase change material slurries, which may be compensated by increasing the pumping power of the pump 102. The graphite foams are described in, for example, WO 2012/011934 A1, which is incorporated herein by reference.

In another embodiment, high thermal conductivity nano-sized additives may be added to the PCM 111. Some examples of nano-sized additives include carbon nanotubes, carbon/graphite nanofibers, and exfoliated graphene nanoplatelets (xGnP). In an exemplary embodiment, xGnP at 10 wt. % loading in a phase change material, such as paraffin, can provide up to a 10-fold increase thermal conductivity. However, the viscosity of the paraffin/xGnP composite increases as the loading, f, of the xGnP, increases, thereby placing an effective upper limit on the amount of xGnP that can be incorporated into the phase change material 111.

Suitable nano-sized additives include carbon black, other carbon-based materials, silicon carbide, carbon nanotubes (commercially available from Carbon Nanotechnologies, Inc.) and nano fibers (commercially available from Applied Sciences, Inc. of Ohio). In some embodiments, the nano-sized additives have a loading of from about 2 wt. % to about 15 wt. % of the total weight of the phase change material/nano-sized additive composition, or from about 3 wt. % to about 12 wt. %, or from about 3 wt. % to about 10 wt. % or from about 4 wt. % to about 8 wt. % or from about 5 wt. % to about 7 wt. % of the total weight of the phase change material/nano-sized additive composition.

Referring to FIGS. 1 and 2, the PCM container 101 houses PCM 111. The top surface of the PCM 111 held in the PCM container 101 receives solid phase change material 117 from the air flow chamber 116. During operation, the lower portion of the PCM 111 held in the PCM container 101 contains liquid PCM 115. In some embodiments, the combination of the solid PCM 117 and the liquid PCM 115 forms a slurry of phase change material 111 in the PCM container 101. As shown in FIGS. 1 and 2, at least one conduit 104 runs through the PCM container 101, and as shown in FIG. 2 it is contemplated that a plurality of conduits 104 run through the PCM container 101. The fluid 113 to be cooled enters the conduit 104 through a fluid inlet 105 and the cooled fluid 113 exits from the conduit 104 through fluid outlet 106. As the fluid 113 passes through the conduit 104 in the PCM container 101, heat is transferred from the fluid 113 through the wall(s) of the conduit 104 to the PCM 111. As a result of the transfer of this heat, solid phase change material 117 is melted whereby a large amount of heat is absorbed as a result of the high enthalpy of phase transition of the PCM.

Figure 3:
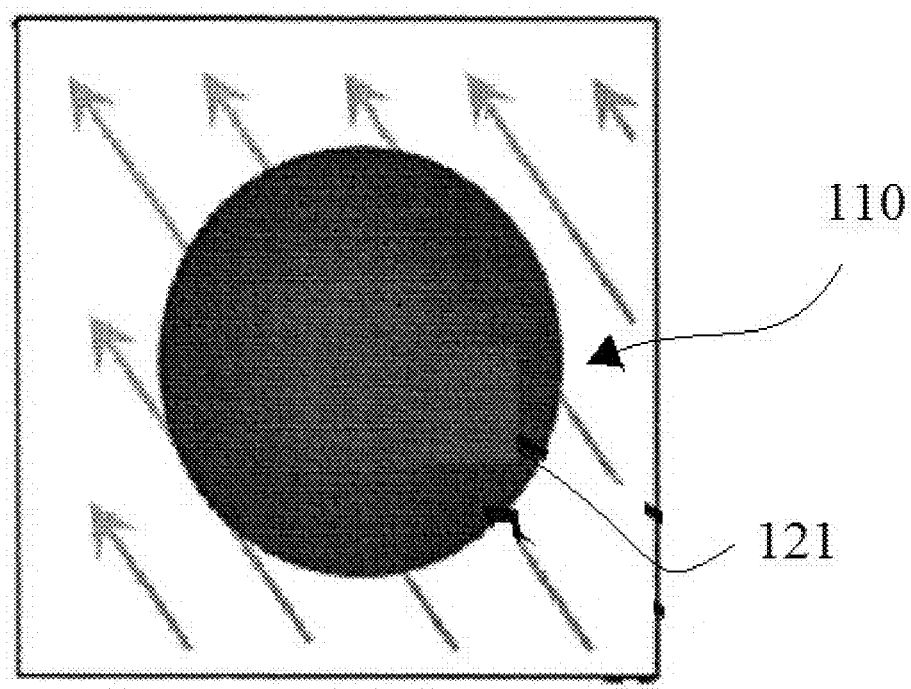
FIG. 3 shows a phase change material droplet in an air flow within an air flow chamber of the cooling system of the present invention.

Referring to FIGS. 2 and 3, in some embodiments, a plurality of conduits 104 pass through PCM container 101 to provide a greater surface area for heat transfer from the fluid to the PCM 111 held within the PCM container 101. The conduits 104 pass through the PCM 111 in the PCM container 101. Solid PCM 117 may be provided to the top surface of the PCM 111 in the PCM container 101, though it is also possible to deliver the solid PCM 117 to other locations within the phase change material 111 in PCM container 101. Thus, in operation, the phase change material 111 in the PCM container 101 typically contains a mixture of solid PCM 117 and liquid PCM 115 which may form a slurry. As a result of the heat transfer from the fluid 113 to the PCM 111, the solid PCM 117 in the PCM container 101 undergoes a phase change to become liquid PCM 115.

Referring to FIG. 2, at the lower portion of the PCM container 101, the PCM 111 includes liquid PCM 115. Liquid-containing phase change material 111 at the lower portion of the PCM container 101 exits through an outlet 112 to enter the phase change material flow system 114. Thus, the PCM 111 in the PCM container 101 undergoes a constant vertical flow from the top of the PCM container 101 to the bottom of the PCM container 101 and then is returned to the PCM container 101 by the phase change material flow system 114. In the process of moving through the PCM container 101, the PCM 111 absorbs heat from the fluid in the at least one conduit 104 and solid PCM 117 undergoes the solid-liquid phase change to form liquid phase change material 115.

In some embodiments, the solid PCM 117 may become molten at from about 30% to about 70% of the distance from the top surface of the PCM 111 to the bottom of the PCM container 101, or from about 40% to about 60%, or from about 45% to about 55% of the distance from the top surface of the PCM 111 to the bottom of the PCM container 101.

In some embodiments, each conduit 104 has a diameter of from about 0.025 m to about 0.1 m, or from about 0.035 m to about 0.09 m, or from about 0.045 m to about 0.08 m, or from about 0.055 m to about 0.07 m. The distance between the conduits 104 may be from about 0.01 m to about 0.03 m, or from about 0.015 m to about 0.025 m.

Referring to FIG. 2, the flow and thermal behavior of slurries comprising solid PCM 117 of a defined size suspended in liquid PCM 115 is explained. FIG. 2 shows a schematic representation of one embodiment of vertical flow from the top to the bottom of the PCM container 101 that passes a phase change material slurry over the assembly of conduits 104. The overall net flow of PCM 111 towards the bottom of the PCM container 101 may be at a volume flux in a range of from about 1 mm/s to about 20 mm/s, or from about 2 mm/s to about 15 mm/s, or from about 2 mm/s to about 12 mm/s, or from about 3 mm/s to about 10 mm/s. The denser solid PCM 117 may settle through the liquid PCM 115 due to buoyancy effects as the slurry flows towards the bottom of the PCM container 101.

In some embodiments, the thermofluidic phenomena in the PCM container 101 may be characterized by dimensionless parameters as listed in Table 1 that may be used to correlate fluid flow and heat transfer. Table 1 shows value ranges for the dimensionless control variables. In Table 1, U is the free stream volume flux entering the cylinder array, $V_{Solid}$ and $V_{Total}$ are the volumes of the solid particles and the total slurry, and $\alpha$ is the thermal diffusivity of the liquid phase PCM.

TABLE 1

Dimensionless Control Variables

| Parameter | Equation | Range |
| --- | --- | --- |
| Reynolds number | $Re = UD/\upsilon$ | 1-1200 |
| Prandtl number | $Pr = \upsilon/\alpha$ | 1-100 |
| PCM volume fraction | $\phi = V_{Solid}/V_{Total}$ | 0.01-0.6 |
| Diameter ratio | $\delta = d/D$ | 0.01-0.4 |
| Spacing ratio | $\sigma = S/D$ | 0.1-2 |

These dimensionless control parameters are correlated to pressure coefficient ($C_P$) and Nusselt number (Nu) as:

$$C_p = 2\Delta P/\rho_{pcm}U^2 = f_1(Re, Pr, \phi, \delta, \sigma)$$

$$Nu = h_{pcm}D/k_{pcm} = f_2(Re, Pr, \phi, \delta, \sigma)$$

$$h_{pcm} = Q/[A(T_{wall} - T_i)]$$

where $\sigma_{pcm}$ and $k_{pcm}$ are the density and thermal conductivity of the liquid phase change material 111, and $h_{pcm}$ is the heat transfer coefficient of the phase change material slurry, Q is the total heat supplied by the fluid 113 entering the conduit 104, A is the total surface area of the conduits 104, and $T_{wall}$ and $T_i$ are the average conduit surface temperature and the phase change material temperature before absorbing heat from the conduit 4, respectively. $T_o$ is the temperature of the PCM 111 exiting the PCM container 101, i.e. after heat absorption from the conduit 104.

Referring back to FIG. 1, the air flow chamber 116 is where the heat transfers from the liquid-containing phase change material droplets 110 to an air flow through the air flow chamber 116. The air flow chamber 116 has plurality of air inlets 107 for the cool air to enter the air flow chamber 116 and an air outlet 108 for the heated air to exit the air flow chamber 116. The air flow in the air flow chamber 116 may be from the bottom to the top of the air flow chamber 116 as shown. The air flow may be driven by an air flow device 109 in the air flow chamber 116. The air flow device 109 may be one or more fans or any other suitable conventional apparatus.

One or more phase change material spray nozzles 103 spray fine droplets 110 of liquid-containing phase change material into the air flow chamber 116.

Figure 4:
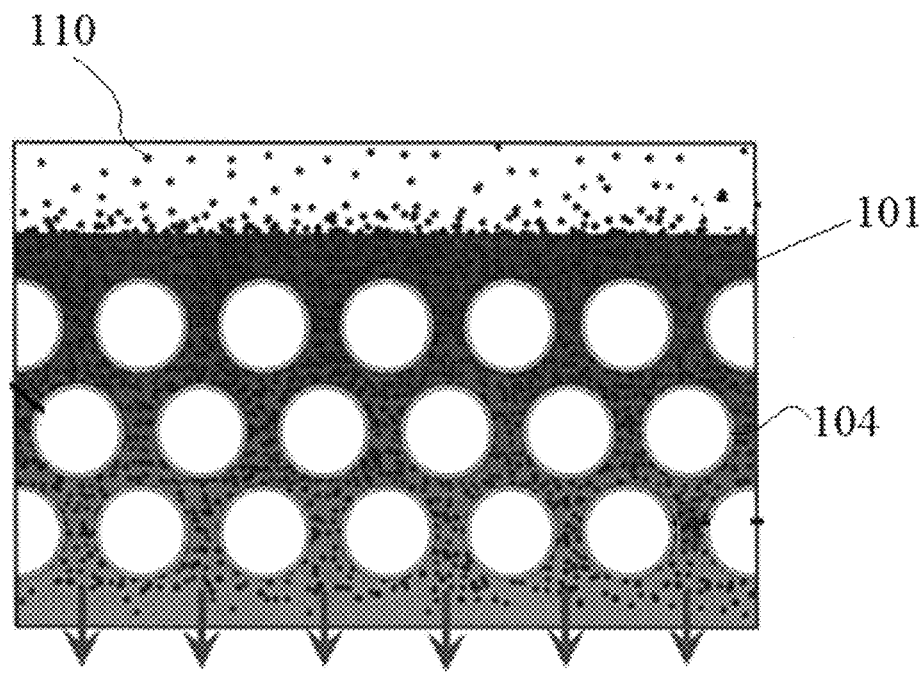
FIG. 4 is a schematic representation of a phase change material container with conduits and containing a phase change material.
Figure 5:
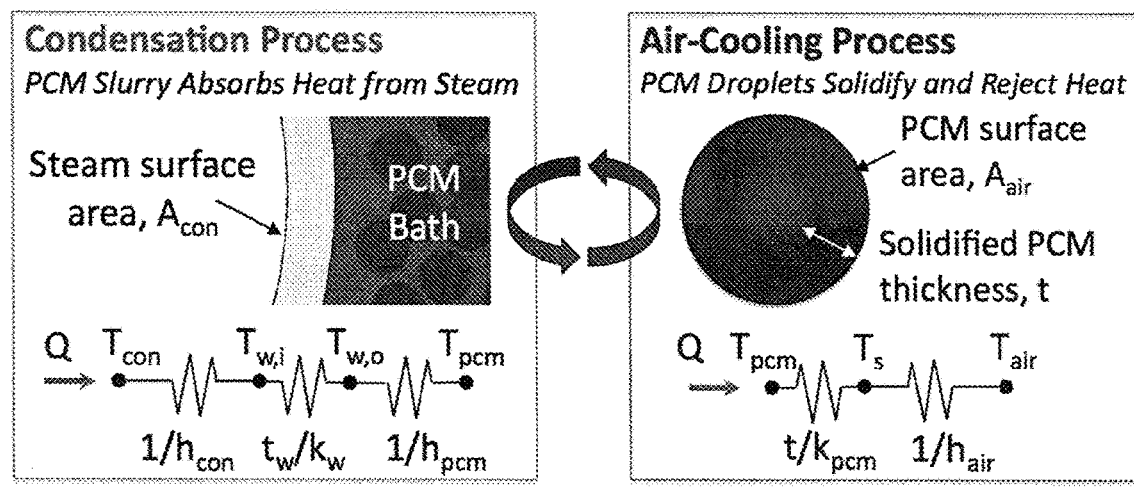
FIG. 5 depicts decoupled steam condensation and air cooling in accordance with the present invention.

Referring to FIGS. 3-5, a droplet 110 of liquid-containing phase change material is exposed to the air flow in the air flow chamber 116. The PCM droplets 110 provide a large surface area for transferring heat from the PCM droplets 110 to the air. As the heat is being transferred from the PCM droplets 110 to the air flow, the surface 121 of the PCM droplets 110 starts solidifying. As more heat is transferred out of the PCM droplets 110, the PCM droplets 110 may completely solidify. In some embodiments, PCM droplets 110 may contain only liquid PCM 115 though in other embodiments, PCM droplets 110 can potentially be a slurry of a portion of solid PCM 117 in liquid PCM 115.

The air flow in the air flow chamber 116 is controlled such that the air flow is not strong enough to carry the PCM droplets 110 out of the air flow chamber 116 through the air outlet 108. At the exit of the phase change material spray nozzle 103, the PCM droplets 110 have a relatively high velocity to propel the PCM droplets 110 through the air flow in the air flow chamber 116. In this embodiment, due to the direction of spraying, the PCM droplets 110 gradually lose velocity as they travel through the air flow chamber 116 and become solidified. The air flow rate should be adjusted so as not to entrain the PCM droplets 110 and carry them out through air outlet 108. The PCM droplets 110 eventually fall back to the surface of the PCM 111 in the phase change material container 101 which, in this embodiment, is located below the air flow chamber 116.

The diameter of the PCM droplets 110 is in millimeters. If the size of the droplets 110 is too small, a large amount of phase change material will be lost from the cooling system 100 since small PCM droplets 110 will be carried out of the air flow chamber 116 by the air flow through the air outlet 108. If the size of the PCM droplets 110 is too large, then there may not be sufficient surface area for transferring heat from the PCM droplets 110 to the air flow in the air flow chamber 116. As a result, the PCM droplets 110 may not be sufficiently solidified while passing through the air flow. Thus, if the diameter of the PCM droplets 110 is too large, the heat rejection from the PCM droplets 110 to the air may not be complete and this will result in a reduction in the efficiency of the cooling system 100.

In some embodiments, the mean diameter of the PCM droplets 110 is from about 0.5 mm to about 20 mm, or from about 1 mm to about 15 mm, or from about 1 mm to about 12 mm, or from about 2 mm to about 10 mm. The phase change material spray nozzles 103 are designed to generate phase change material droplets 110 with a narrow size distribution of, for example, ±2 mm, more preferably, ±1 mm and, most preferably, ±0.1 mm.

The phase change material spray nozzle 103 injects phase change material droplets 110 into the air flow chamber 116. While the phase change material droplets 110 travel through the air flow in the air flow chamber 116, they lose heat to the air flow and become solidified. The travel distance for the phase change material droplets 110 before they solidify depends on the size of phase change material droplets 110 and air flow rate in the air flow chamber 116. When the size of the phase change material droplets 110 increases, the phase change material droplets 110 take longer to solidify, thus requiring a larger and taller air flow chamber 116. Air flow rate increases will enhance heat transfer from the phase change material droplets 110 to the air flow, thus accelerating solidification of the phase change material droplets 110 and may reduce the size and height of the air flow chamber 16. Therefore, smaller phase change material droplets 110 and a higher air flow rate will accelerate solidification of the phase change material droplets 110 as they travel through the air flow, thus reducing the residence time required for the phase change material droplets 110 to solidify in the air flow chamber 116.

The one or more phase change material spray nozzles 103 spray phase change material droplets 110 into the air flow chamber 116. The phase change material spray nozzles 103 are designed to provide droplets 110 of a desired size and may atomize the liquid-containing phase change material 111 pumped from the lower portion of the phase change material container 101. The phase change material spray nozzles 103 spray the phase change material droplets 110 with a velocity such that the phase change material droplets 110 can travel through the air flow for sufficient time for transferring heat to the air flow and at least partially or completely solidifying the phase change material droplets 110, before the phase change material droplets 110 are returned to the phase change material container 101. In preferred embodiments, the phase change material droplets 110, as they lose velocity and heat, become solidified and fall back to the top surface of the phase change material 111 in the phase change material container 101.

In a preferred embodiment, droplets 110 of phase change material will be completely solidified upon passage through air chamber 116 prior to being returned to phase change material container 101. Thus, it is desirable to ensure that the residence time of the phase change material droplets 110 in the air chamber 116 is sufficient to completely solidify the liquid phase change material 115 in droplets 110. In the embodiment shown in FIG. 1, the phase change material droplets 110 are sprayed in a generally upward direction to maximize contact time with the air flow by requiring that the droplets 110 travel both upwardly in air chamber 116 and then back downwardly in air chamber 116 thereby providing additional time to solidify the phase change material 111. This embodiment allows use of a smaller air chamber 116 and thus a smaller cooling system 100. Alternatively, the droplets 110 can be sprayed from the top or another location of air chamber 116 but this may require enlargement of air chamber 116 to ensure sufficient residence time of droplets 110 in air chamber 116 for the desired complete solidification of liquid phase change material 115 to occur. Typically, the phase change material droplets 110 will be sprayed at an angle of 60-120° relative to the upper surface of the phase change material 111 in the phase change material container 101, or from 70-110° or from 80-100° or at about 90°.

It is also desirable to ensure that the solid phase change material 113 is returned to the phase change material container 101 in a manner which distributes as evenly as possible over the entire area of the phase change material 111 in phase change material container 101. This can be accomplished, for example, by directing the spraying of phase change material droplets 110 into air chamber 116 in a manner which ensures that the droplets 110 are relatively evenly distributed over the upper surface of the phase change material 111 in the phase change material container 101 when the solid phase change material 101 returns to the phase change material container 101. An exemplary spray pattern is shown in FIG. 1.

In some embodiments, the air flow rate in the air flow chamber 116 is from about 10,000 kg/s to about 130,000 kg/s, or from about 20,000 kg/s to about 120,000 kg/s, or from about 30,000 kg/s to about 100,000 kg/s, or from about 40,000 kg/s to about 90,000 kg/s, or from about 50,000 kg/s to about 80,000 kg/s. In some embodiments, the air velocity in the air flow chamber 116 may be from about 4 m/s to about 14 m/s, or from about 5 m/s to about 13 m/s, or from about 6 m/s to about 12 m/s, or from about 7 m/s to about 11 m/s, or from about 8 m/s to about 10 m/s.

The size of phase change material droplets 110 is correlated with the air flow speed in the air flow chamber 116. A faster air flow rate tends to carry phase change material droplets 110 out of the air flow chamber 116 more easily. The faster air flow rate also enhances heat transfer from the phase change material droplets 110 to the air flow. Thus, the size of phase change material droplets 110 should be increased when a faster air flow rate is used in the air flow chamber 116. Conversely, a slower air flow rate tends to not carry phase change material droplets 110 out of the air flow chamber 116. However, a slower air flow rate is less efficient for heat transfer from the phase change material droplets 110 to the air flow. Thus, a slower air flow rate requires smaller phase change material droplets 110 to provide more surface area for the heat transfer. A slower air flow rate also requires less power input into the air flow generation device 109. The air flow velocity must be sufficiently high to generate a sufficient heat transfer coefficient to remove the required amount of heat.

Figure 6:
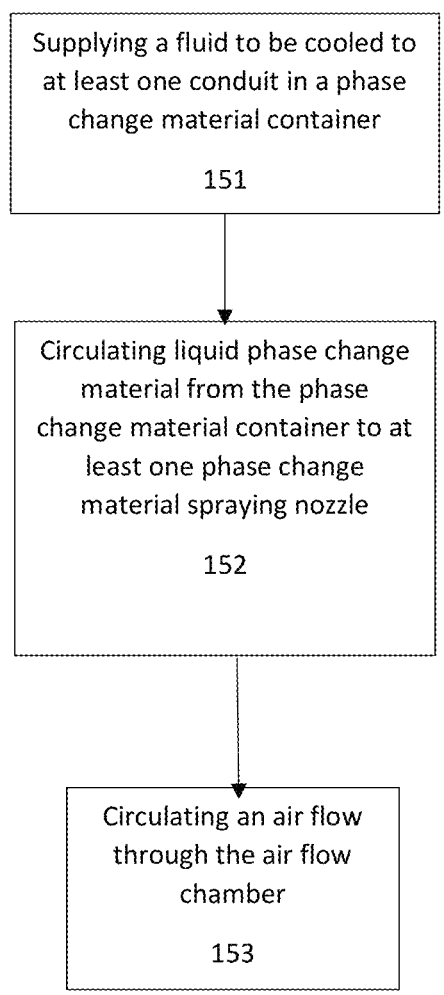
FIG. 6 is a flow chart of a method for operating a cooling system for cooling a fluid, according to one embodiment of the present invention.

In another aspect, the present invention provides a method as shown in FIG. 6 for operating a cooling system 100 for cooling a fluid. The method includes the steps of transferring heat from the fluid to a phase change material 111 to melt at least some solid phase change material 113 to provide liquid phase change material 115; spraying droplets 110 of liquid-containing phase change material 111 into circulating air for cooling and solidifying at least some of the liquid phase change material 115 to provide solid phase change material 113 by heating said air to provide heated air; recycling the solid phase change material 113 to the transferring step; and removing the heated air from the cooling system 100.

In the method, shown in FIG. 6, in supplying step 151, a fluid 113 to be cooled is supplied to at least one conduit 104 and passed through a phase change material container 101 for transferring heat from the fluid in the conduit 104 to the phase change material 111 in the phase change material container 101. In liquid circulating step 152, liquid-containing phase change material 111 is circulated from the phase change material container 101 to at least one phase change material spraying nozzle 103 for spraying liquid-containing phase change material droplets 110 into an air flow chamber 116. In air circulating step 153, air is circulated through the air flow chamber 116 for cooling the phase change material droplets 110, whereby the cooled phase change material droplets 110 become solidified and solid phase change material 113 is returned to the phase change material 111 located in the phase change material container 101.

The fluid to be cooled may be from any source of fluid that requires cooling such as fluid from a boiler that has been heated in a power plant. The fluid needs to be cooled and then cycled back to the boiler of the power plant. In supplying step 101, the fluid is supplied to the at least one conduit 104 passing through the phase change material container 101, where the at least one conduit 104 is bathed in a body of phase change material 111 which may be in the form of a slurry of solid phase change material 113 in liquid phase change material 115. The heat from the fluid in the conduit 104 is transferred through the wall of the conduit 104 to the phase change material 111 in the phase change material container 101. The absorption of heat from the conduit 104 causes a solid to liquid phase transition of the solid phase change material 113 to form liquid phase change material 115. After heat is transferred out of the fluid to the phase change material 111, the fluid is cooled and exits the conduit 104 through fluid outlet 106.

The phase change material container 101 has liquid phase change material 115 at its lower portion. A pump 102 pumps liquid-containing phase change material 111 through the outlet 112 from the phase change material container 101 to the at least one phase change material spray nozzle 103 through conduit 118.

The liquid-containing phase change material 111 in the conduit 118 may have a flow rate of from about 1,000 kg/s to about 5,500 kg/s, or from about 2,000 kg/s to about 4,500 kg/s, or from about 2,500 kg/s to about 4,000 kg/s, or from about 3,000 kg/s to about 4,000 kg/s, or from about 3,300 kg/s to about 3,800 kg/s.

The nozzle 103 sprays droplets 110 of the liquid-containing phase change material 111 of a desired size and/or size distribution, which travel through the air flow chamber 116 as shown, for example, in FIG. 1.

The air flow in the air flow chamber 116 is generated by an air flow device 109. The air flow device 109 may be one or more fans or any other suitable device for generating an air flow. The air flow device 109 controls the air flow rate in the air flow chamber 116. The air flow rate may be in the range of from about 10,000 kg/s to about 130,000 kg/s, or from about 20,000 kg/s to about 120,000 kg/s, or from about 30,000 kg/s to about 100,000 kg/s, or from about 40,000 kg/s to about 90,000 kg/s, or from about 50,000 kg/s to about 80,000 kg/s.

In some embodiments, the air velocity in the air flow chamber 116 may be from about 4 m/s to about 14 m/s, or from about 5 m/s to about 13 m/s, or from about 6 m/s to about 12 m/s, or from about 7 m/s to about 11 m/s, or from about 8 m/s to about 10 m/s.

The air flow is generated by drawing cool air into the air flow chamber 116 using, for example, a device such as an air flow device 109. The circulating air makes contact with the phase change material droplets 110, as shown in FIG. 4. Heat is transferred from the phase change material droplets 110 to the air flow, which warms up the air flow. After losing heat, the phase change material droplets 110 become solidified and fall back into the phase change material container 101.

EXAMPLE 1

A cooling tower based on the parameters listed in Table 2 was simulated. Table 2 summarizes the baseline spray-freezing air cool condenser (ACC) design parameters for the steam tube, the phase change material container, the phase change material sprayers, and the air flow, as well as the fans, pumps, and atomizers used to achieve the desired parameters. As highlighted in Table 2, the calculated air-side convective heat transfer coefficient $h_{air}$=165 W/m$^2$K, which is about four times that of complex finned tubes in current ACCs. In addition, the total air-side heat transfer surface area provided by phase change material droplets 110 in-flight is around 440,000 m$^2$, equivalent to about twice the total surface area of current fin-tube ACCs with a larger footprint.

TABLE 2

Baseline air-cooled spray-freezing condenser design parameters.

| Parameter | Value | Parameter | Value |
|---|---|---|---|
| HT area for steam, $A_s$ | 700,000 m$^2$ | PCM settling time, $t_{set}$ | 80 s |
| Steam tube dia., d | 0.065 m | Total PCM drop HT area, $A_t$ | 440,000 m$^2$ |
| Steam tube spacing, $\delta$ | 0.02 m | # of PCM atomizers | 1000 |
| U-value for cond., $U_s$ | 100 W/m$^2$K | PCM spray req. power, $P_{sp}$ | 200 kW |
| # of steam tube, N | 690,000 | Air flow rate, $\dot{m}_{air}$ | 70,000 kg/s |
| Steam tube length, H | 5 m | Air velocity, $V_{air}$ | 9.1 m/s |
| Steam flow rate per tube | 0.91 g/s | Air-side HTC, $h_{air}$ | 165 W/m$^2$K |
| Steam pressure drop | <20 Pa | U-value for air cooling, $U_{air}$ | 116 W/m$^2$K |
| PCM flow rate, $\dot{m}_{PCM}$ | 3,500 kg/s | Air Reynolds # | 3200 |
| PCM pumping power, $P_{PCM}$ | 343 kW | Air pressure drop, $\Delta p_{air}$ | 100 Pa |
| PCM liquid pipe dia, $d_l$ | 2 m | Fan power, $P_{fan}$ | 125 kW |
| PCM drop diameter, D | 0.005 m | Fan diameter, $d_{fan}$ | 10 m |
| PCM drop Biot # | <0.1 | Fan static pressure, $p_{fan}$ | 120 Pa |
| PCM drop gen. rate, $\dot{N}$ | 6.7 × 10$^7$/s | # of fans | 64 |

Figure 7:
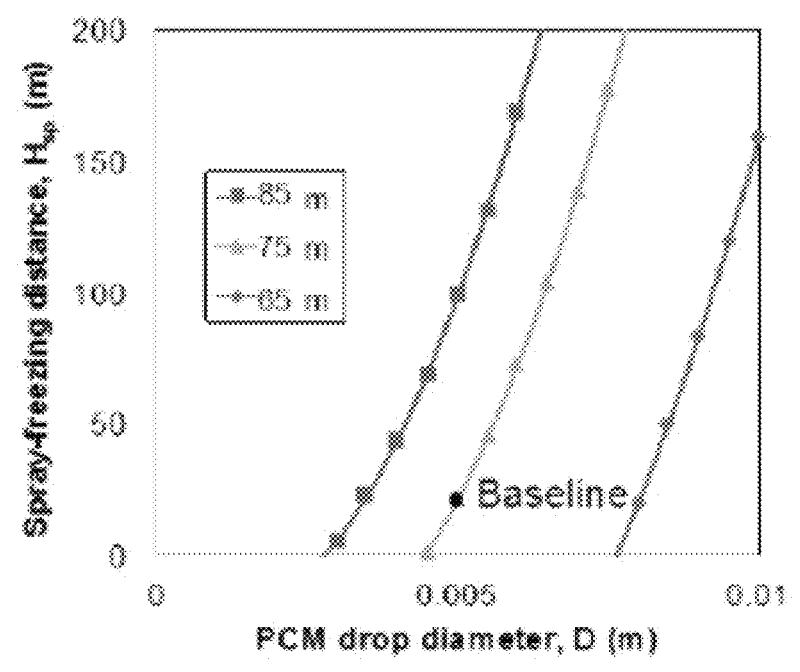

The computer simulated model based on the cooling tower described in Table 2 details the air-side heat transfer from the PCM droplets to the air flow in the air flow chamber. The spray-freezing distance for the PCM droplets in relation to the size (diameter) of the phase change material droplet is shown in FIG. 7. The spray-freezing distance is the distance that the PCM droplet must travel before the PCM droplet solidifies. It is observed that an increase of the size of the phase change material droplet will require a larger spray-freezing distance, thus a larger and/or taller air flow chamber. The computer simulated model shows three different air flow chambers with heights of 65 m, 75 m, and 85 m. Note that, in contrast to finned-tube ACCs, the steam condensation and air-cooling are decoupled in the present invention, which allows the steam tubes be optimized independently of the air flow chamber to reduce cost and pressure drop.

Encapsulated Phase Change Materials

The spray-freezing of PCMs is able to help in the cooling of power plants, but there is a chance of contamination caused by drift when spray-freezing PCMs. Encapsulating the PCMs can help avoid spray nozzle clogging due to dust and other debris.

A solution employing encapsulated PCMs (EPCMs) may involve using a modular based EPCM lattice. This will provide high $h_{air}$, which involves no blow away or the use of a nozzle. The EPCM lattices can be fabricated using low cost fabrication methods, such as via the use of molds and 3D-printing. Different modules may have different $T_{pcm}$ for the EPCMs. It is further possible to employ holographic polymerized photonic crystals as the EPCM encapsulant.

Figure 8:
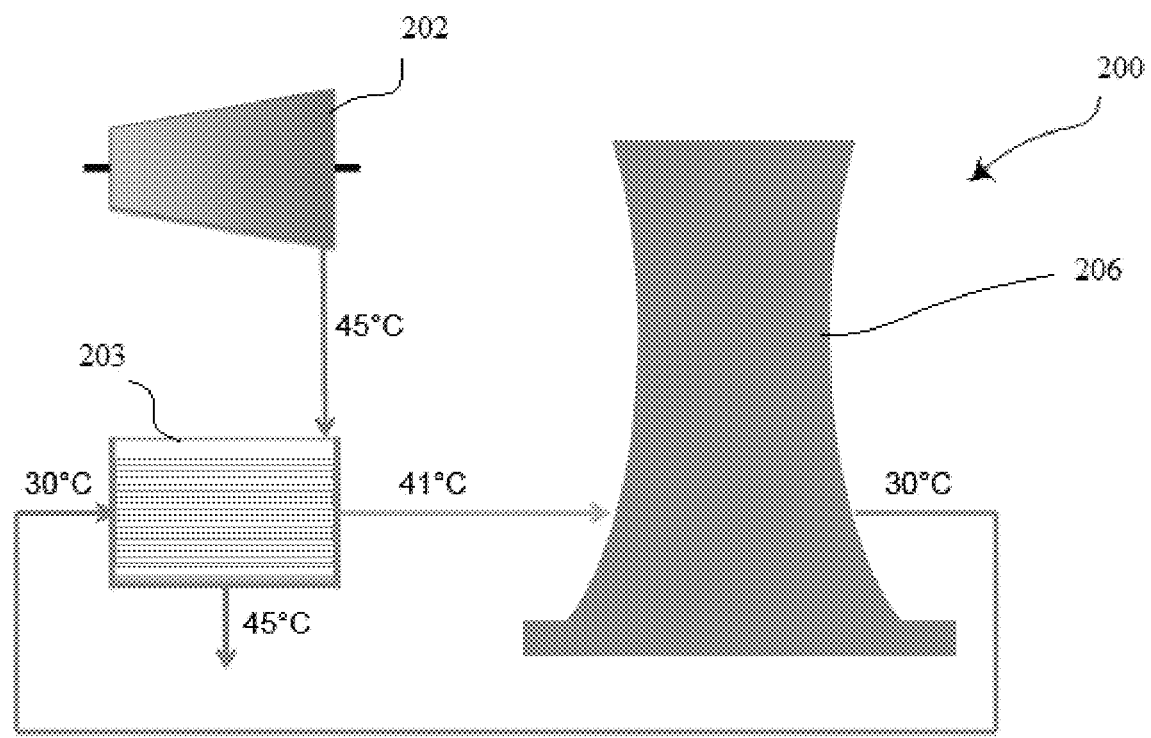
FIG. 8 is a schematic diagram of the power plant cooling system in accordance with an embodiment of the invention.

A diagram of a power plant system 200 that may employ the air-cooled EPCM heat exchanger is shown in FIG. 8. The power plant system 200 includes a turbine 202 and a condenser 203. Hot water is sent from the condenser 203 to the cooling tower 206. Within the cooling tower 206 is the heat exchanger 210 that will provide cooling. Heat exchanger 201 is shown in in more detail in FIG. 9.

Figure 9:
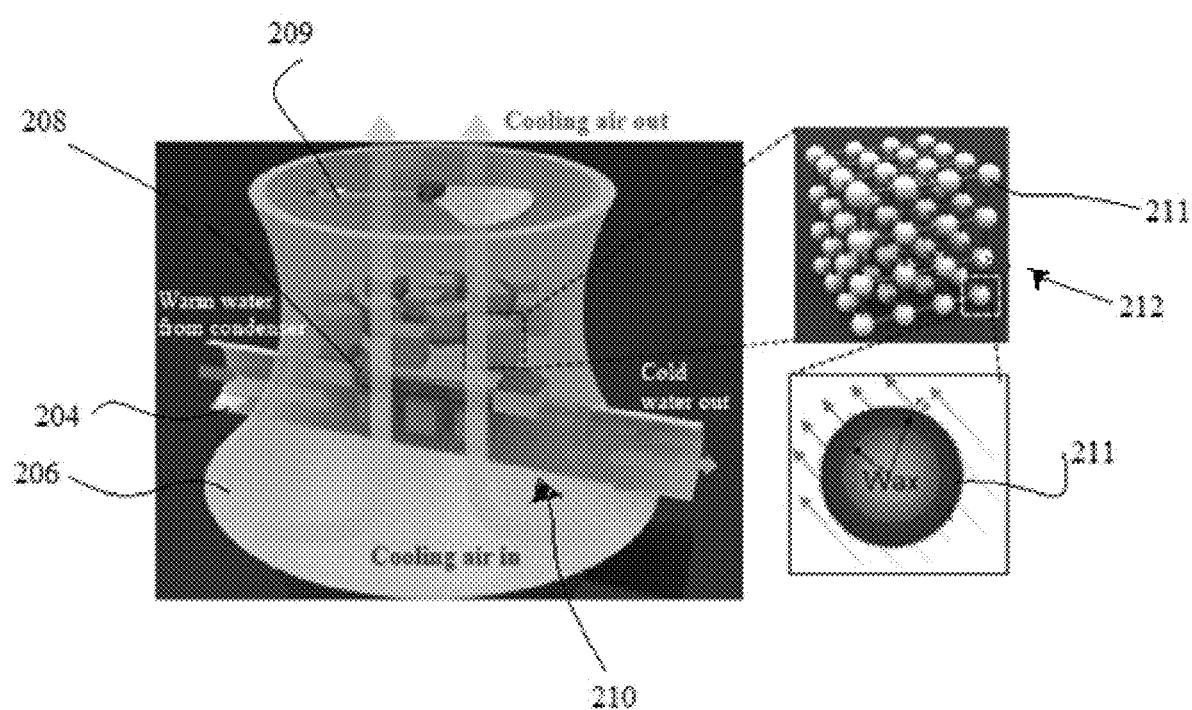
FIG. 9 is a schematic diagram of the cooling system using an encapsulated phase change material.
Figure 10:
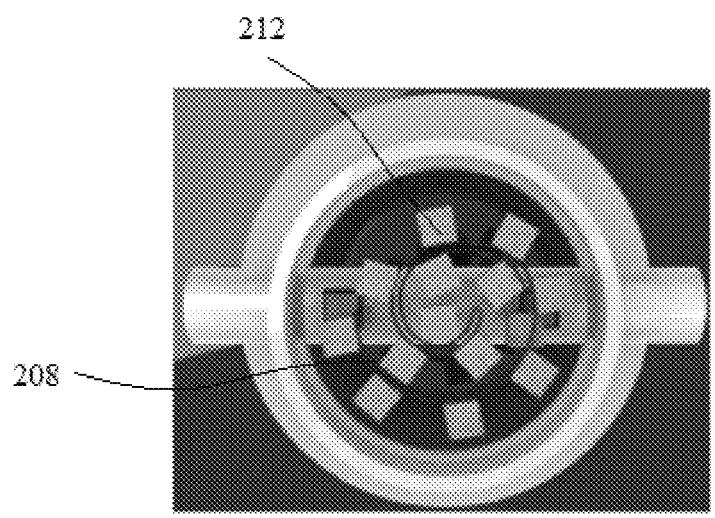
FIG. 10 is a top down view of the cooling system shown in FIG. 9.
Figure 11:
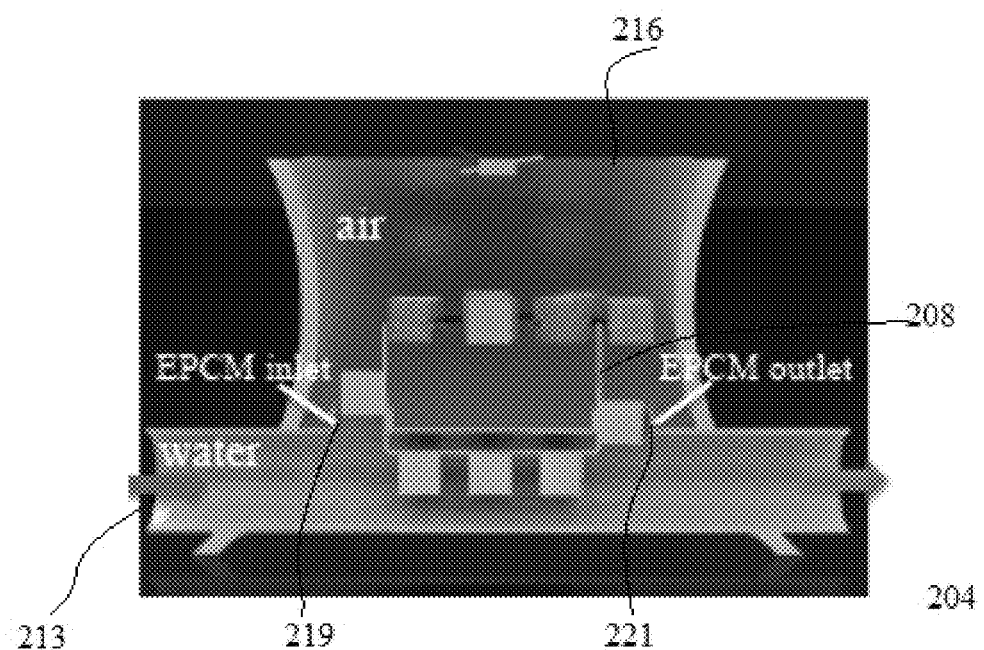
FIG. 11 is an interior diagram of a portion of the cooling system shown in FIG. 9 using the encapsulated phase change material.

FIGS. 9-11 illustrate the air-cooled EPCM heat exchanger 210. FIG. 9 shows the interior of the cooling tower 206 and the details of the heat exchanger 210. The heat exchanger 210 comprises EPCM modules 212. The EPCM modules 212 are comprised of lattices of individual EPCM particles 211. As shown in FIG. 9 the EPCM lattices may form a cube shaped matrix, however it is contemplated other shapes may be formed from EPCM particles 211, such as, for example, belts, wires, drag bodies (e.g. parachute shaped), etc. The heat exchanger 210 is designed to move EPCM modules 212 throughout the cooling tower 206.

As shown in FIGS. 9-11 the EPCM modules 212 are interconnected via a cable 208, or other mechanism for moving the EPCM modules 212 throughout the cooling fluid 213. The cooling fluid 213 may be, for example, water, from the condenser 203. The cooling fluid 213 enters the cooling tower 206 via the conduit 204. The EPCM modules 212 are moved through the conduit 204 using the cable 208 and eventually EPCM modules 212 move through the EPCM inlet 219 into the air flow chamber 216. The EPCM modules 212 are circulated within the airflow chamber 216 using the cable 208 and ultimately leave the airflow chamber 216 via the EPCM outlet 221. The EPCM inlet 219 and the EPCM outlet 221 are relatively small openings, which are about 1% larger than the size of the PCM structure thereby allowing for use of a flexible material e.g. a rubber or plastic film to form a seal around the EPCM inlet 219 and the EPCM outlet 221 that can be used to limit evaporative loss via the EPCM inlet 219 and EPCM outlet 221 to about 0.0% to 0.0042%.

EPCM modules 212 are uniformly distributed in the cooling tower and may be moved using the cable 208 at a suitable speed such as about 1 m/s. The ratio of EPCM modules 212 within the cooling fluid 213 to the EPCM modules 212 within the airflow chamber 216 is about 1:20. When using EPCM modules 212, different EPCM modules 212 having different $T_{pcm}$ can be easily interchanged based upon the different environmental factors, such as the current weather. The EPCM modules 212 also possess ultra-high surface area as a result of being made up of lattices of micron- and millimeter-sized EPCM particles 211. The EPCM modules 212 have greater than four times the $h_{air}$ when compared with ACCs. The EPCM modules 212 may also be fabricated to have a porosity of greater than 98% and low drag.

Additionally, the EPCM modules 212 is low in cost, able to be made via emulsion techniques, molding techniques, 3D printing, polymerization and other techniques known to those of ordinary skill in the art. Additionally, the EPCM modules 212 are easy to transport since they are light weight and modular based.

Figure 12:
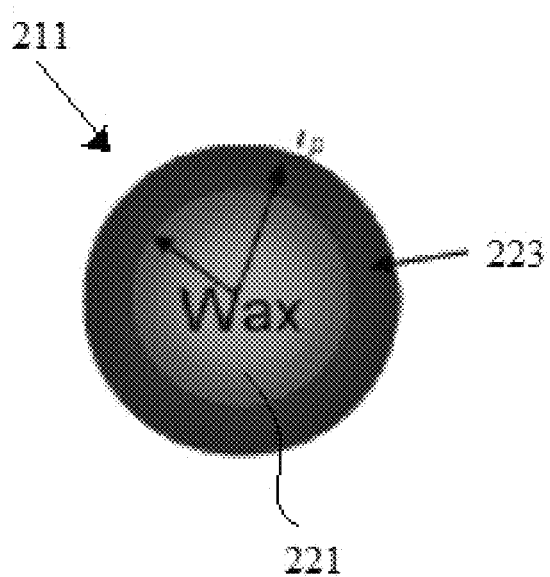
FIG. 12 is a diagram of an encapsulated phase change material.

The movement of the EPCM lattices 212 within the relatively warmer fluid 213 in the conduit 204, melts the encapsulated cores 221 of the EPCM particles 211. An exemplary EPCM particle 211 is shown in FIG. 12. The melting of the core 221 removes heat from the fluid 213. Circulation of the EPCM lattices 212 through the air flow chamber 216 re-solidifies the core 221 for the next pass through the fluid 213.

Figure 15:
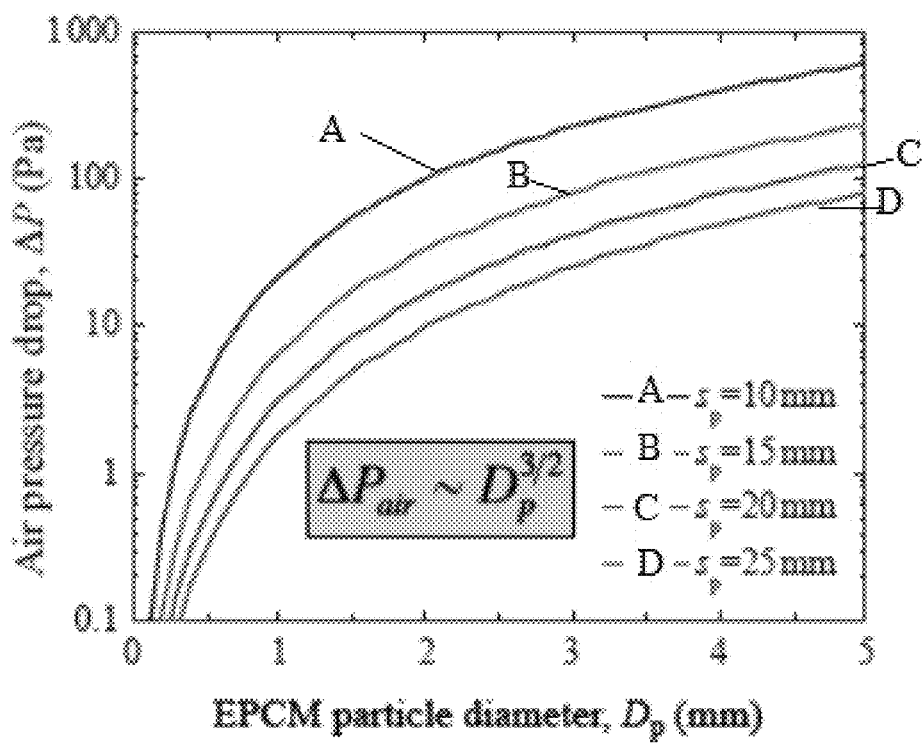
FIG. 15 is a graph showing air pressure drop versus encapsulated particle diameter for varying center-to-center particle spacings.
Figure 16:
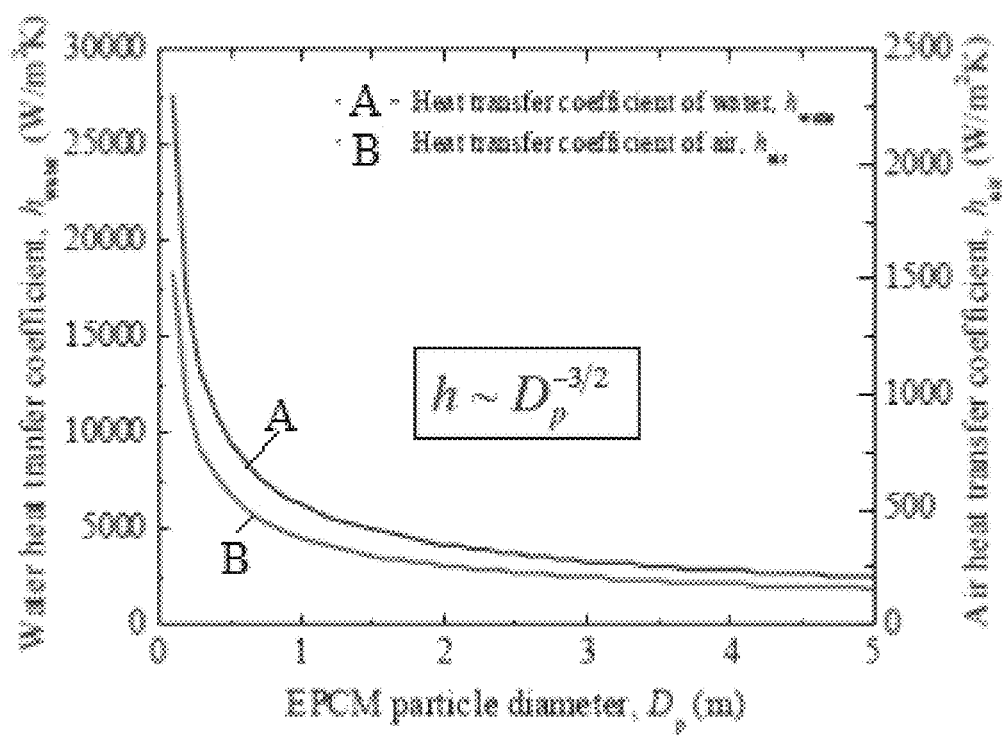
FIG. 16 is a graph of the encapsulated phase change material particle diameter as it relates to the water heat transfer coefficient and the air heat transfer coefficient.

FIGS. 15 and 16 are graphs that show the effects of different diameters of the EPCM particles 211. FIG. 15 shows the air-side pressure drop versus the diameter of the EPCM particles 211. Air-side pressure drop is calculated using the correlations of pressure drop over tube banks. Air-side pressure drop is calculated using the equation:

$$\Delta P_{air} = n_l f_\chi \frac{\rho_{air} U_{air}^2}{2}$$

Where f is the friction factor, X is the correction factor and $n_l$ is the number of tube layers. FIG. 16 is a graph showing the effect of the EPCM particle diameter on the water and air heat transfer coefficients. From FIGS. 15-16, it can be seed that a smaller diameter EPCM particle 211 reduces the fan power required (FIG. 15) and enhances heat transfer. However, these factors must be balanced with the concern that the encapsulating material needs to be thick enough to be sufficiently strong and this may increase cost of the EPCM. The diameter of the rods within the EPCM lattice 212 may be 0.2 mm to 5 mm, more preferably 0.4 mm to 2.7 mm.

Table 3 shows some of the properties of EPCM particles obtained from Microtek.

TABLE 3

Properties of EPCM particles obtained from Microtek

| Model # | Latent heat (kJ/kg) | Melting point (° C.) | Core Material | Shell material | PCM (core) concentration (wt. %) |
|---|---|---|---|---|---|
| MPCM18 | 163-173 | 18 | Paraffin | Polymer | 85-90 |
| MPCM28 | 180-195 | 28 | Paraffin | Polymer | 85-90 |
| MPCM37 | 190-200 | 37 | Paraffin | Polymer | 85-90 |

Using the EPCM lattice 221 to provide cooling of the fluid 213 eliminates emission issues that may occur when compared with sprayed PCMs. Encapsulated EPCM particles 211 are fixed thus eliminating emissions. Further, the EPCM is not pumped, but circulated by, for example, a conveyor, thereby reducing the power necessary to overcome frictional forces. Also, unlike the spray, there is no need for nozzles, fins or tubes in order for the EPCM particles 211 to be circulated. Instead, equipment is used to move the EPCM lattice 221 through the cooling tower 206. Suitable equipment may include a conveyor belt, rollers, etc. EPCM particles 211 have a controllable size and no coalescence during melting. However, they have a lower latent heat of about 150 kJ/kg, as compared to the pure PCM, which has a latent heat of about 220 kJ/kg. Suitable EPCMs are commercially available from companies such as BASF, Microtek, CIBA, etc.

Table 4 shows baseline EPCM heat exchanger design parameters.

TABLE 4

Baseline EPCM heat exchanger design Parameters

| Parameter | Value | Parameter | Value |
|---|---|---|---|
| Air Temperature | 20° C. | Inlet water temp. to condenser | 30° C. |
| EPCM melting point | 30° C. | Exit water temp. from condenser | 41° C. |
| EPCM particle center-center spacing | 15 mm | EPCM particle solidification time (in air) | 220 s |
| EPCM particle dia. | 5 mm | Water flow rate | 5583 kg/s |
| EPCM module dimension 1 m × 1 m × 1 m | 1 m × 1 m × 1 m | Water flow velocity | 0.05 m/s |
| EPCM module spacing | 0.3 m | Water Re # | 350 |
| Water-side EPCM module # | 2,500 | Water-side heat transfer coefficient | 2500 W/m²K |
| Air-side EPCM module # | 57,000 | Air flow rate | 70,000 kg/s |
| EPCM module velocity | 1 m/s | Air flow velocity | 10 m/s |
| Total EPCM particle # | 1.76 × 10¹⁰ | Air Re # | 3200 |
| Total EPCM particle HT area | 440,000 m² | Air-side heat transfer coefficient | 165 W/m²K |
| EPCM melting time (in water) | 10 s | | |

Figure 13:
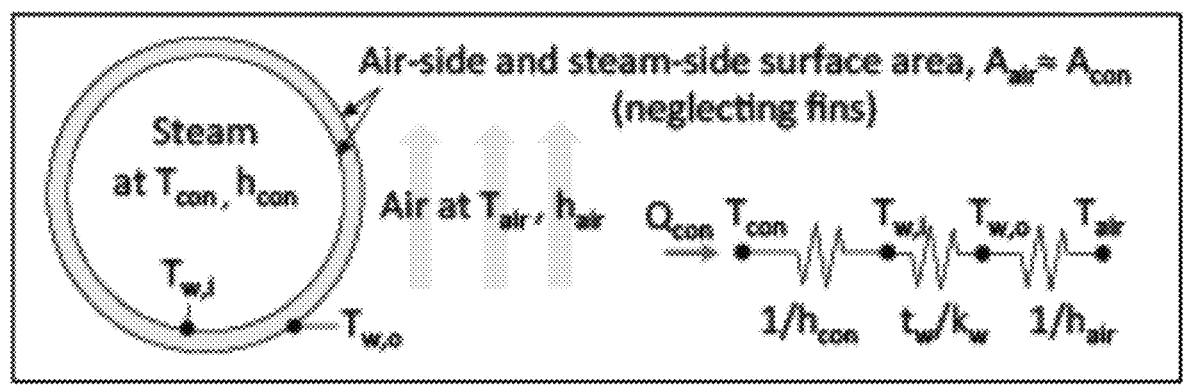
FIG. 13 is a diagram of a conventional air cooled steam tube.
Figure 14:
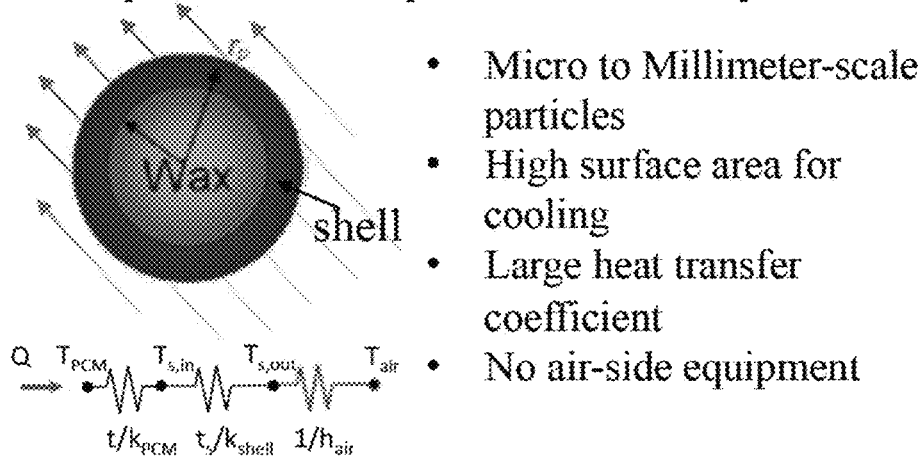
FIG. 14 is a diagram showing a cooled encapsulated phase change material particle.

FIGS. 13 and 14 show a system analysis of the air-side and steam side heat transfer of a traditional air cooled condenser (ACC) and an EPCM heat exchanger. FIG. 13 shows a diagram of the air-side and steam side surface area for a traditional ACC. FIG. 14 shows an EPCM particle 211 cooled by air. In a system with a 700 MW heat load and an air temperature of 20° C. the $h_{air}$ is about 45-50 W/m²-K for a traditional ACC, and the $h_{air}$ is about 165 W/m²-K for the EPCM heat exchanger using an EPCM particle 211 with a diameter of about 5 mm. The value $h_{air}$ is calculated as follows:

$$h_{air} = \left(2 + 0.6\, Re_p^{1/2} Pr^{1/3}\right) \frac{k_{air}}{D}$$

The total EPCM particle heat transfer area is about $A_t = 440,000\ m^2$ and this parameter is preferably within the range of 400,000 m² to 750,000 m². This information demonstrates that the EPCM heat exchanger provides a significant improvement over the standard ACC.

Table 5 shows a system analysis of an EPCM heat exchanger, a PCM ACC and a traditional ACC with respect to PCM pumping and fan power. The analysis is performed using a 700 MW heat load, a $T_{air}$ of between 10-20° C. and 5 mm diameter EPCM particles 211.

TABLE 5

System analysis of PCM pumping and fan power

| | EPCM Heat Exchanger | PCM ACC | Traditional ACC |
|---|---|---|---|
| Total air flow rate, kg/s | 35,000-70,000 | 35,000-70,000 | 32,400-45,000 |
| Air Reynolds # | 1,600-3,200 | 1,600-3,200 | 4000-6000 |
| Air pressure drop, Pa | 100-200 | 100-200 | 75-100 |
| Air temperature rise, K | 10-20 | 10-20 | 17 |
| Fan static pressure, Pa | 100-220 | 100-220 | 75-125 |
| Total fan power, MW | 5.8-11.7 | 5.8-11.7 | 7.6 |
| Pumping power, MW | 0.22 | 0.343 | N/A |
| Fan diameter, m | ~10 | ~10 | ~10 |
| # of fans | 100 | 100 | 100 |

The analysis shows that the pumping power is reduced the fan power is similar when compared to a PCM ACC. With an air pressure drop of $\Delta P \sim D_p^{3/2}$ a smaller particle size is desired.

Table 6 shows a system analysis of an EPCM heat exchanger and surface condenser, a PCM ACC and a traditional ACC based on size and cost. The table shows that there is a significant advantage of an EPCM heat exchanger and surface condenser over a PCM ACC and traditional ACC. The system employing the EPCM heat exchanger and surface condenser results in lower costs and requires no primary steam tubing. Further, the cooling tower height can be reduced to less than 20 meters. Also, there is a reduced particle emission problem as well as no nozzle clogging problem.

TABLE 6

System Analysis Size and Cost

| Parameter | EPCM heat exchanger + Surface Condenser | PCM ACC | Traditional ACC |
|---|---|---|---|
| Steam cond. temp (° C.) | 45 | 40 | 55-65 |
| # of units | 1 | 1 | 40-72 |
| Unit dimension (m²) | 75 × 75 | 75 × 75 | 12 × 12 |
| Total footprint (m²) | 5600 | 5600 | 6,000-11,000 |
| Equipment cost (MM$) | 15-20 | 30-45 | 60-100 |
| Total Power input (MW) | 11.7 | 12 | 7.5 |
| Production gain % (1%/3° C. cond. temp.) | 3.3-6.7% | 5-8.3% | |

More than One PCM

Figure 17:
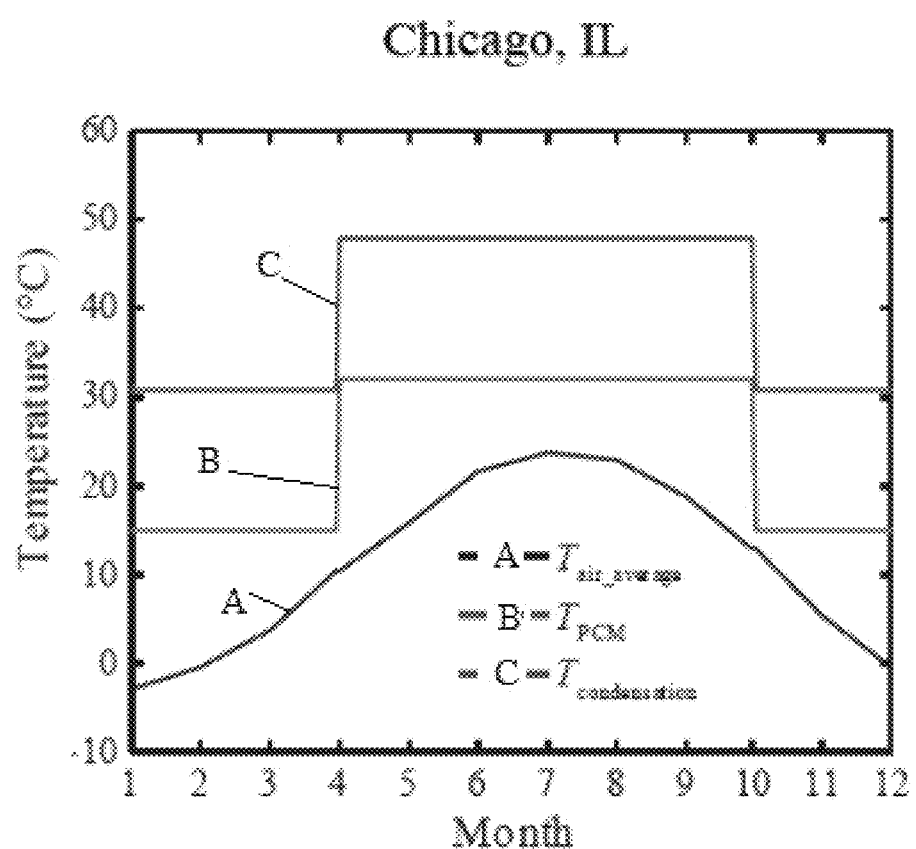
FIG. 17 is a graph showing the annual temperatures of the air, the temperature of condensation and the temperature of the phase change material in Chicago, Ill.
Figure 18:
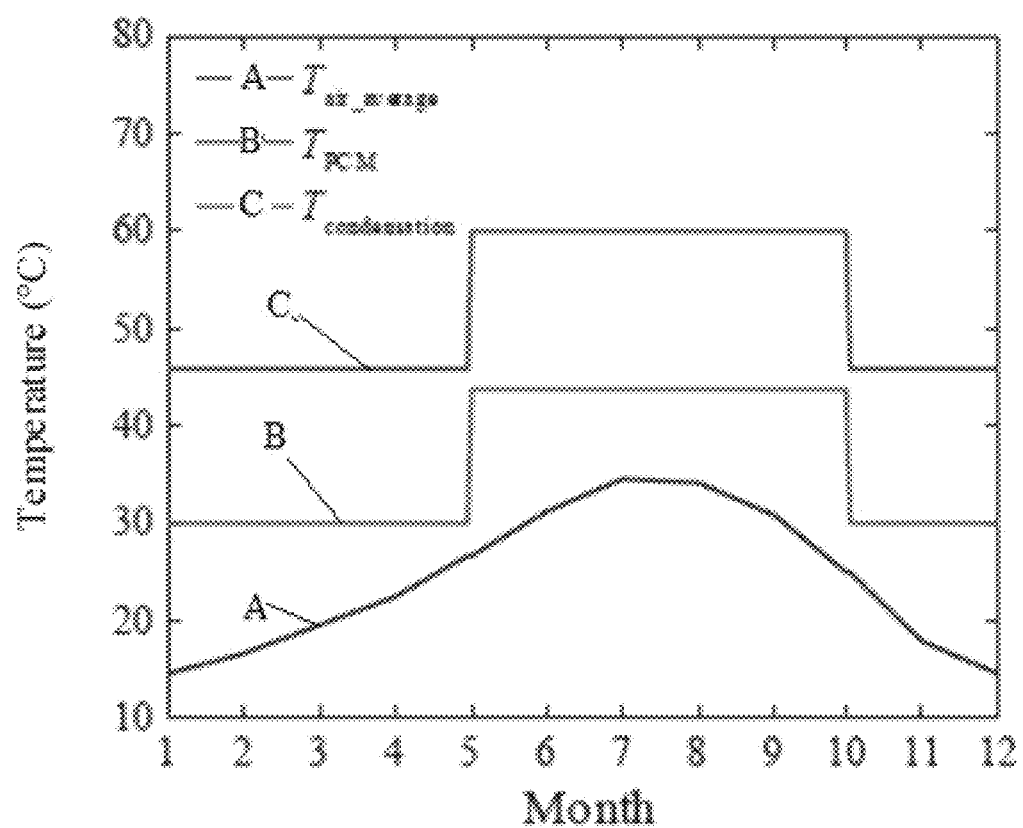
FIG. 18 is a graph showing the annual temperatures of the air, the temperature of condensation and the temperature of the phase change material in Yuma, Ariz.
Figure 19:
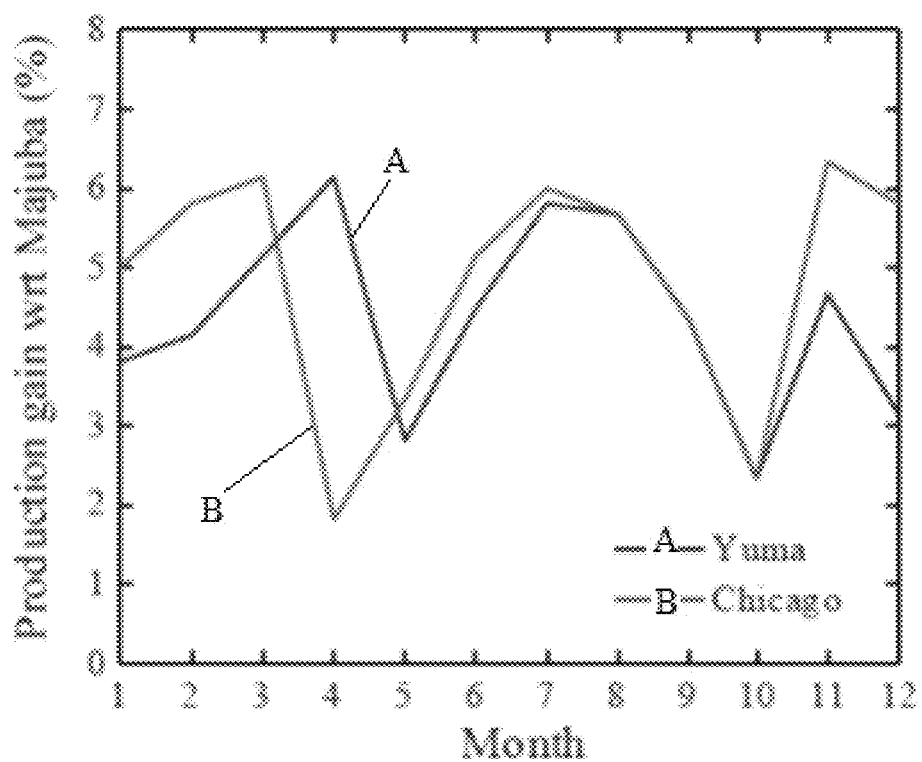
FIG. 19 shows the production gain with respect to Majuba percentage for Yuma, Ariz. and Chicago, Ill.

An alternative embodiment of the present invention contemplates using more than PCM for the cooling system. Different PCMs will typically have different phase change temperatures. FIGS. 17 and 18 show the year round operation when using more than one PCM. The year round operation graphs convey that when using two different PCM materials by using higher temperature PCM materials the system can be operated during the summer months, when the energy production need is greatest, without sacrificing much in performance. During the winter months the efficiency of the power plant can be increased by taking full advantage of the lower condenser temperature provided by the lower melting temperature PCM. In both cases the turbine exit temperature remains constant regardless of the PCM material used.

FIG. 18 is a graph showing the year round operation of dual PCMs in terms of production gain compared to direct ACC. The production gain is measured by considering the decrease in condenser temperature and the correlation that for every 3° C. drop in condenser temperature the production gain increases by 1%, see for example Table 6. The graph illustrates that there is 4.4% production gain for Yuma and 4.8% production gain for Chicago.

PCM Recirculating Mesh System

Figure 20:
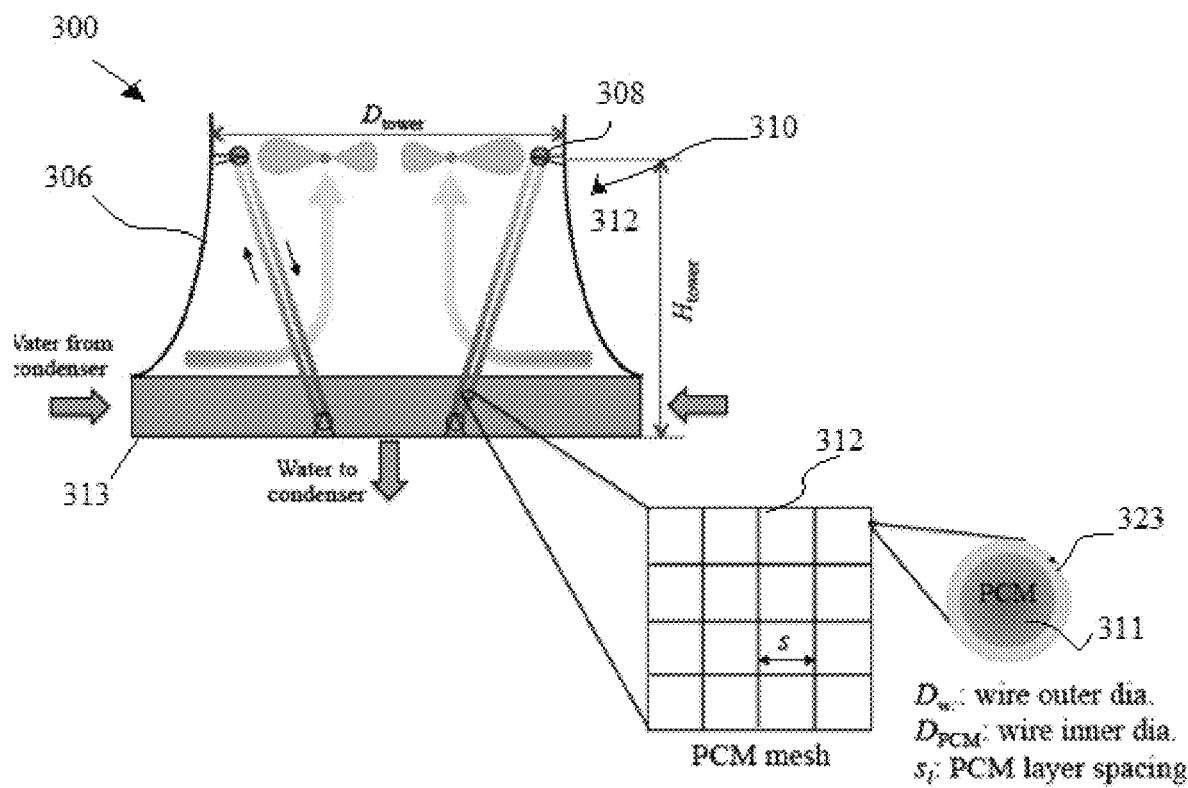
FIG. 20 shows a side view of a cooling system employing a moving mesh in accordance with an embodiment of the present invention.
Figure 21:
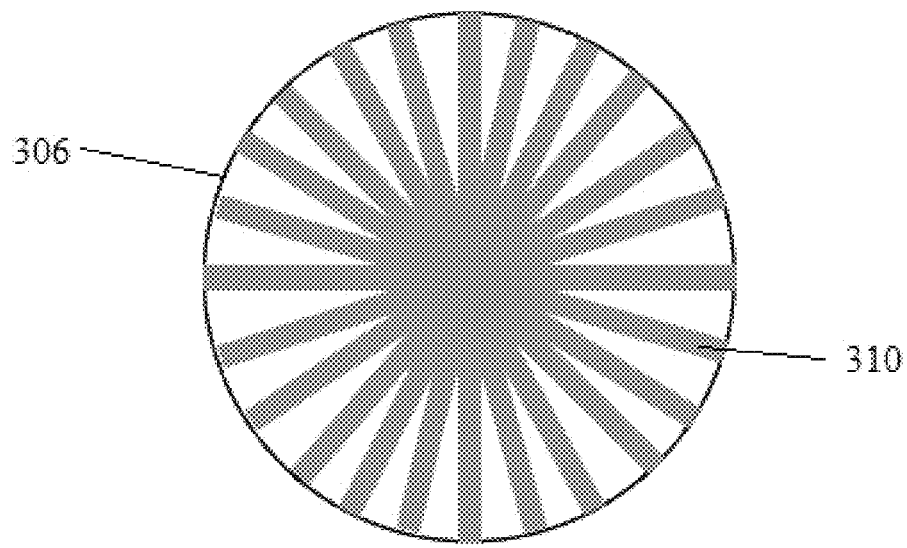
FIG. 21 is a top down view of the cooling system shown in FIG. 20.

Another embodiment of the present invention may employ a PCM recirculating mesh system 300. FIGS. 20 and 21 show a side view and a top down view of cooling tower 306 that employs a PCM recirculating mesh 310. The PCM recirculating mesh 310 is made of a mesh 312 comprised of PCM particles 311. Water exiting the condenser is cooled by melting phase change material embedded inside hollow metal/polymer thin wires that are interconnected to form a highly porous mesh 312. A plurality of meshes 312 may be layered to form a PCM recirculating mesh 310. In the embodiment shown, the PCM particles 311 are particles that are encapsulated with a metal encapsulating material 323. Additionally, the meshes 312 may be modular thereby allowing them to be substituted depending upon the environmental needs of area in which such meshes 312 are employed.

Figure 23:
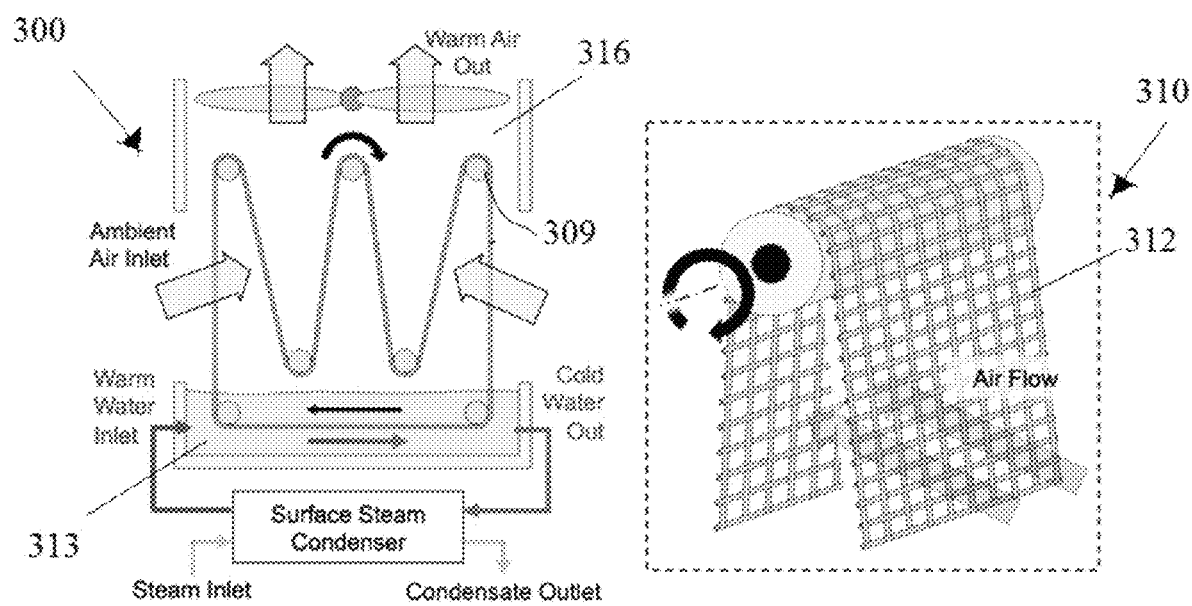
FIG. 23 shows a schematic view of a PCM recirculating mesh system and mesh, which employs conveyor rolls.
Figure 24:
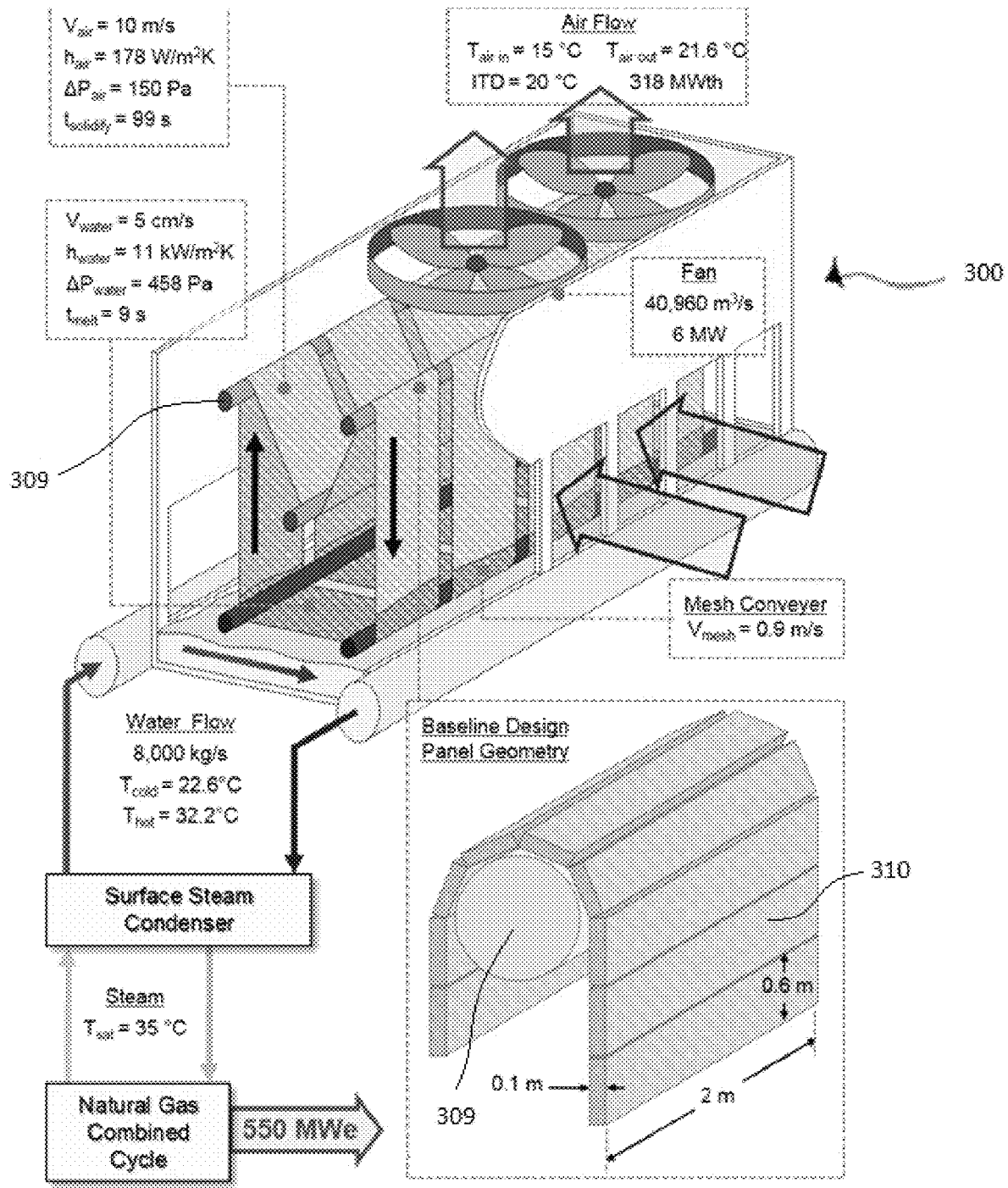
FIG. 24 shows another schematic view of a PCM recirculating mesh system employing conveyor rolls with an optional configuration that employs linked panels to create the mesh system.

Each mesh 312 may be moved between the fluid 313 and the airflow chamber 316 using a cable 308. FIGS. 23 and 24 also show a PCM recirculating mesh system 300 that employs conveyor rolls 309 to move the PCM recirculating mesh 310 through the airflow chamber 316 and fluid 313. The conveyor rolls 309 are one suitable mechanism for moving the PCM recirculating mesh 310. Other conventional transport systems may also be employed.

The mesh 312 cools the fluid 313 by absorbing heat from the fluid 313 thereby melting the PCM. The PCM in the mesh 312 loses heat and re-solidifies in the airflow chamber 316. The top down view of the PCM recirculating mesh system 300, shown in FIG. 21, shows that recirculating meshes are provided throughout the cooling tower 306 and radiate from the center of the cooling tower 306 to the top of the cooling tower.

Table 7 shows parameters of the PCM recirculating mesh 310 and the environment within the cooling tower 306.

TABLE 7

Values of parameters of cooling tower with PCM recirculating mesh

| Wire mesh diameter, $D_w$ | 2.7 mm | Air density, $\rho_{air}$ | 1.2 kg/s |
|---|---|---|---|
| Diameter of PCM contained in wire, $D_{PCM}$ | 1.9 mm | Air kinematic viscosity $v_{air}$ | 1.5 × 10−5 m²/s |
| In-plane spacing S | 20 mm | Air velocity, $U_{air}$ | 10 m/s |
| Out-of-plane spacing, $S_1$ | 25 mm | Enthalpy of fusion, $h_{fs}$ | 200 kJ/kg |
| Porosity, ε | 0.977 | Cooling tower diameter, $D_{tower}$ | 80 m |
| Solidification Time, $T_{solidification}$ | 118 s | Cooling tower height, $H_{tower}$ | 30 m |

Table 8 shows an analysis of the PCM recirculating mesh 310.

TABLE 8

Baseline analysis for recirculating mesh

| Variable | Symbol | Value | Variable | Symbol | Value |
|---|---|---|---|---|---|
| Wire diameter | $D_w$ | 2.7 mm | Solidification time | $T_{soli}$ | 118 s |
| Wire thickness | $T_w$ | 0.4 mm | Melting time | $T_{melt}$ | 6 s |
| PCM diameter | $D_{PCM}$ | 1.9 mm | Total PCM layer | $n_l$ | 150 |
| Wire in plane spacing | S | 20 mm | Total mesh thickness | $H_{PCM}$ | 3.75 m |
| Wire out of plane spacing | $S_l$ | 25 mm | Waterside heat transfer coefficient | $h_{water}$ | 2960 W/m²K |
| Power load | $P_{total}$ | 700 MW | Air side heat transfer coefficient | $h_{air}$ | 178 W/m²K |
| Porosity | ε | 0.977 | Pressure drop in water side | $\Delta P_{water}$ | 111.74 Pa |
| Air side Reynolds # | $Re_{DW}$ | 1720 | Pressure drop in air side | $\Delta P_{air}$ | 165.5 Pa |
| Footprint | | 80 m × 80 m | | | |

Further analysis of the system provides the various parameters required for the PCM recirculating mesh 310. For example, using the values taken from Table 8 the PCM flow rate can be calculated as:

$$\dot{m}_{PCM} = \frac{P_{total}}{h_{fr}} = \frac{700 \text{ MW}}{200 \text{ kJ/kg}} = 3{,}500 \text{ kg/s}$$

Total PCM required in the air side can be calculated as:

$$m_{PCM\_total} = \dot{m}_{PCM} t_{solidification} = 3{,}500 \text{ kg/s} \times 118 \text{ s} = 4.13 \times 10^5 \text{ kg}$$

The PCM volume per recirculating mesh area is:

$$v_{PCM\_area} = \frac{2\pi D_{PCM}^2 S}{4}\left(\frac{1}{s}\right)^2 = 2.8 \times 10^5 \text{ mm}^3/\text{m}^2$$

PCM mass per a recirculating mesh area is:

$$m_{PCM\_area} = v_{PCM\_area} \rho_{PCM} = 0.217 \text{ kg/m}^2$$

The recirculating mesh thickness that is required can also derived from the various parameters provided in Table 8. The total recirculating mesh area is:

$$A_{total} = \frac{m_{PCM\_total}}{m_{PCM\_area}} = 1.9 \times 10^5 \text{ m}^2$$

The recirculating mesh area per layer is:

$$A_{layer} = \pi D_{tower} L_{screen}$$
$$= \pi \times 80 \text{ m} \times 50 \text{ m} = 12566 \text{ m}^2$$

The number of recirculating mesh layers is:

$$n_l = \frac{A}{A_{layer}} = \frac{1.9 \times 10^6 \text{ m}^2}{12566 \text{ m}^2} = 150$$

Thus, the thickness of the PCM mesh is:

$$H_{PCM} = n_l s_l = 150 \times 25 \text{ mm} = 3.75 \text{ m}$$

Figure 22:
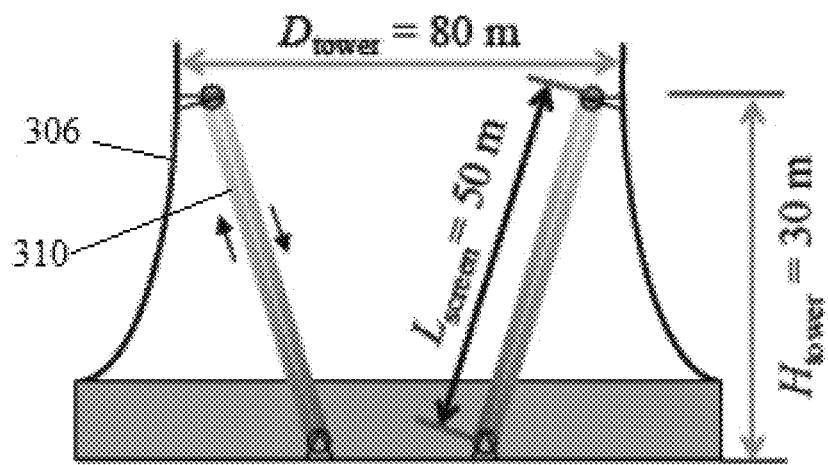
FIG. 22 shows a side view of a diagram illustrating an embodiment of the moving mesh of FIG. 20.
Figure 25:
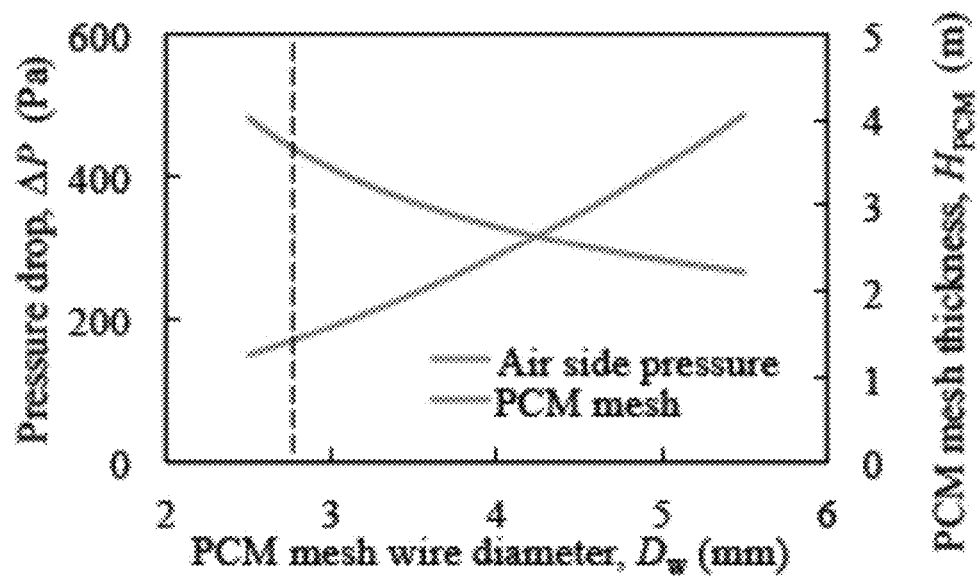
FIG. 25 is a graph showing the pressure drop, versus the phase change material mesh wire diameter and the phase change material mesh thickness.
Figure 26:
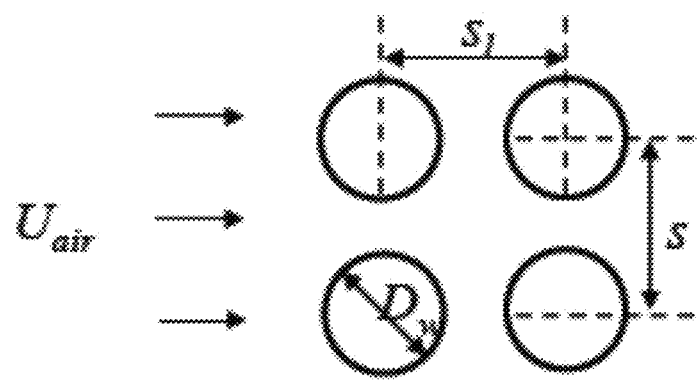
FIG. 26 is a diagram of the air flow across the conduit banks.

Reference is now made to FIGS. 25 and 26 to illustrate one method for calculating the air-side pressure drop of the PCM recirculating mesh system 300. The cooling tower 306 and the PCM recirculating mesh 310 and their respective dimensions are given in FIG. 22. The length of the recirculating mesh, $L_{RM}=50$ meters, the diameter of the cooling tower 306, $D_{tower}=80$ meters, and the height of the cooling tower, $H_{tower}=30$ meters, are used to calculate the air-side pressure drop using the following equation:

$$\frac{\Delta P_{air}}{H_{PCM}} = 64.5\left(\frac{1-\varepsilon}{\varepsilon}\right)^2 \frac{\rho_{air} v_{air} U_{air}}{D_w^2} + 1.455\left(\frac{1-\varepsilon}{\varepsilon}\frac{v_{air}}{U_{air}D_w}\right)^{0.103}\frac{1-\varepsilon}{\varepsilon}\frac{\rho_{air}U_{air}^2}{D_w}$$

where $U_{air}$ is the air velocity, $v_{air}$ is the kinematic viscosity of the air and $\rho_{air}$ is the air density.

The equation for determining volumetric porosity is:

$$\varepsilon = 1 - \frac{\pi D_w^2}{2 s s_l}$$

The air-side pressure drop $\Delta P_{air}$ is 166 Pa in this calculation. FIG. 25 shows the relationships between the diameter and thickness of the mesh and the air-side pressure drop.

Figure 27:
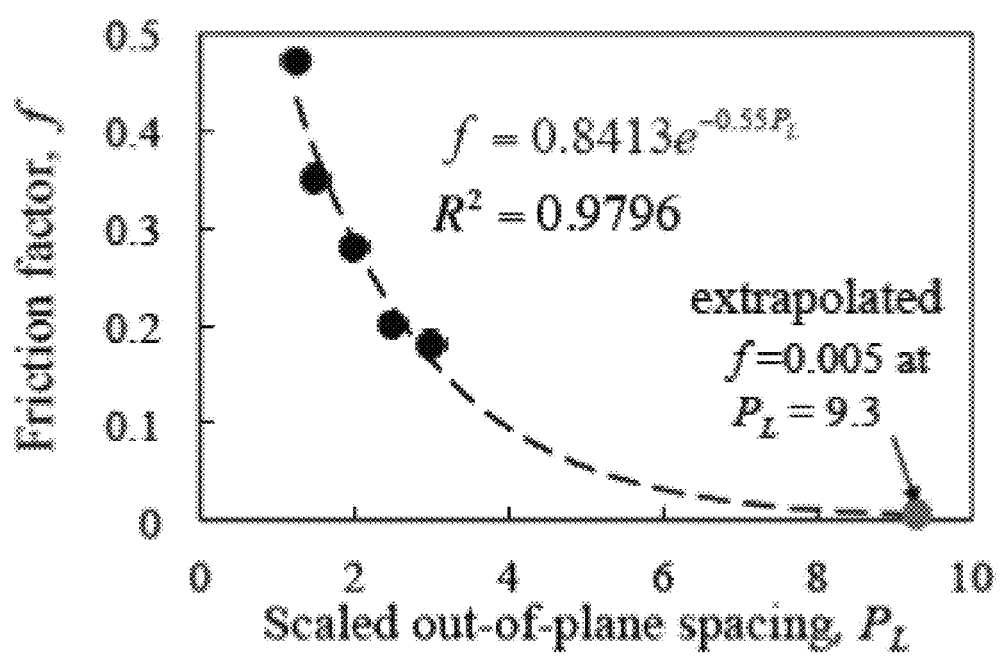
FIG. 27 is a graph of friction factor versus scaled out-of-plane spacing.

Reference is now made to FIGS. 26 and 27 in discussing another method of calculating the drop in air pressure across conduit banks such as are shown in FIG. 26. The equation used is:

$$\Delta P_{air} = n_l f_x \frac{\rho_{air} U_{air}^2}{2}$$

In the equation above, f is the friction factor, x is the correction factor and $n_l$ is the number of conduit layers. The calculation is as follows:

$$P_L = \frac{S_l}{D_w} = \frac{25 \text{ mm}}{2.7 \text{ mm}} = 9.3 \quad P_T = \frac{s}{D_w} =$$

$$\frac{20 \text{ mm}}{2.7 \text{ m}} = 7.4 \quad \frac{P_T - 1}{P_L - 1} = 0.77 \quad \chi = 1.3 \text{ and } Re_D = \frac{U_{air} D_w}{v_{air}} = 1800$$

with an approximate value for f of 0.005. The approximate pressure drop across the mesh that results in a system with two perpendicular conduit banks, $\Delta P_{air}$, is 117 Pa.

The meshes 310 of the PCM recirculating mesh system 300 have a high heat capacity, a high heat transfer coefficient on both the air and water sides, a very large surface area, a low cross-flow pressure drop, and result in a low cost when compared to other systems. Compared to an existing fin-tubed air-cooled condenser (ACC), the PCM recirculating mesh system 300 reduces the dry-cooling initial temperature difference (ITD) required for operation of the system to 20° C., which makes the steam condensation temperature comparable to that of a wet cooling tower, without dissipating water to the environment. Furthermore, the low ITD dramatically improves the power production efficiency compared to current ACCs that have an ITD>35° C. Power production efficiency (eta) can be calculated by eta=1−TL/ TH, where TL is the condenser temperature which is decreased relative to a typical ACC by fixing the PCM melt temperature. Also, the PCM recirculating mesh system 300 simultaneously increases both the heat transfer coefficient and heat transfer area, relative to those of complex finned tubes in current ACCs by significantly increasing the surface to area ratio. The PCM recirculating mesh system 300 has an air-side h value that is about four times the air-side h value of complex finned tubes in current ACCs. The PCM recirculating mesh system 300 also reduces the surface area and operational cost of primary steam by using indirect dry cooling to decouple steam condensation and heat rejection. Steam pathways can thus be optimized independently for reduced pressure drop and cost. Overall, the PCM recirculating mesh system 300 also reduces the capital cost and sub-freezing concerns relative to current ACC.

Compared to a spray-freezing cooling tower, the proposed PCM recirculating mesh system 300 has no particulate emissions because the encapsulated PCMs that are connected together into strong structures prevents contamination due drift loss. Furthermore, there is no need for additional air-side equipment when employing the present invention, since the absence of spray nozzles obviates potential nozzle clogging due to dust/debris. Also, the use of modular-based mesh 312 allows for different melting temperature PCMs to be substituted at different times to allow customization of the system to address different climatic conditions.

PCM Carousel

Figure 28:
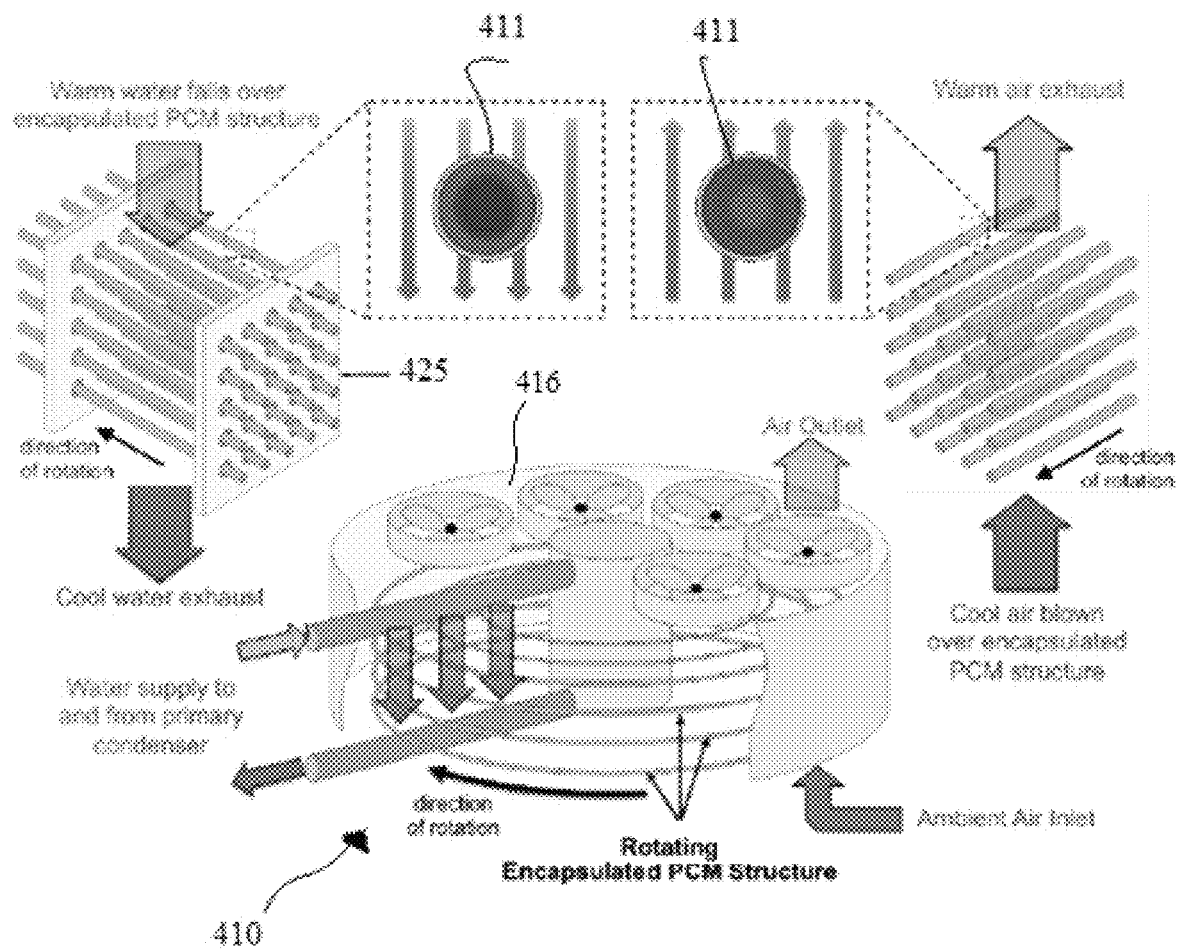
FIG. 28 is a schematic diagram of a carousel cooling system employing a rotating encapsulated phase change material structure in accordance with an embodiment of the present invention, the upper portion of FIG. 28 shows detail of diagram in the lower portion of FIG. 28.

FIG. 28 is a diagram of a PCM carousel 400. PCM carousel 400 is an alternative embodiment of a power plant cooling system. The upper portion of FIG. 28 shows detail of diagram in the lower portion of FIG. 28. In the PCM carousel 400 a porous EPCM structure 410 is rotated throughout the cooling tower. The EPCM structure 410 may be highly porous, having a porosity of, for example, 94% to 97%. As the EPCM structure 410 rotates, warm fluid, in this example water, cascades over EPCM structure 410. The EPCM particles 411 in the EPCM structure 410 absorb heat from the water causing the PCM material in EPCM particles 411 to melt. Cooled water is exhausted from the PCM carousel as shown. Separator walls 425 may be used to separate portions of the EPCM structure 410 to segregate water and air flows as well as minimizing drift of PCM material.

As the EPCM structure 410 rotates, ambient air is blown over the EPCM structure 410 in an airflow chamber 416. The EPCM particles 411 will then reject heat to the ambient air and freeze.

Table 9 is a table showing a baseline analysis for the PCM carousel 400 of FIG. 28.

TABLE 9

Analysis for PCM carrousel

| Variable | Symbol | Value | Variable | Symbol | Value |
| --- | --- | --- | --- | --- | --- |
| Wire diameter | $D_w$ | 2.7 mm | Solidification time | $T_{soli}$ | 118 s |
| Wire thickness | $T_w$ | 0.4 mm | Melting | $T_{melt}$ | 6 s |
| PCM diameter | $D_{PCM}$ | 1.9 mm | Total PCM layer | $N_l$ | 785 |
| Wire in-plane spacing | S | 30 mm | Water side heat transfer coefficient | $h_{water}$ | |
| Power load | $P_{total}$ | 700 MW | Air side heat transfer coefficient | $h_{air}$ | 178 W/m²K |
| Porosity | ε | 0.994 | Pressure drop in water side | $\Delta P_{water}$ | |
| Footprint | | 80 m × 80 m | Pressure drop in air side | $\Delta P_{air}$ | 167 Pa |

Rotary Heat Exchanger Using EPCM Materials

A further embodiment of PCM recirculating system includes an economically viable indirect dry cooling system that utilizes a recirculating high surface-area heat exchanger with encapsulated phase-change materials (EPCMs). The heat exchanger unit of the present invention should achieve or exceed all of the Advanced Research Projects Agency-Energy's ("ARPA-E") Advanced Research in Dry Cooling (ARID) program objectives and Category 3 targets ("Category 3 targets"). The disclosed system employs indirect dry cooling technology that will meet Category 3 targets by taking advantage of the high latent heat of solid-liquid phase change, which effectively absorbs heat from the condenser hot water and dissipates heat to the ambient air. Continuously circulating the heat exchange structures between the air and water sides creates a short-duration thermal storage system that effectively rejects heat at the PCM melting temperature using a compact system design.

Figure 29:
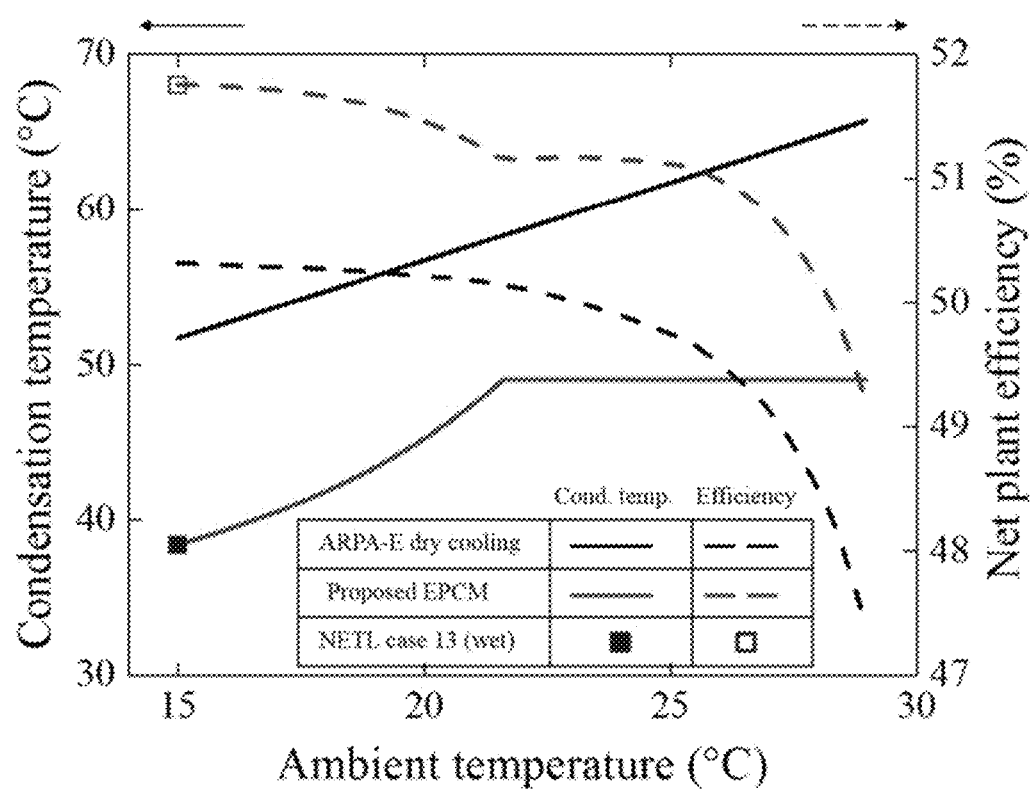
FIG. 29 is a graph comparing the condensation temperature and net plant efficiency versus ambient temperature of an embodiment of the invention and two standard models.

Table 10 compares the present technology with NETL Case 13 wet cooling, the ARPA-E dry cooling model at the design point of 15° C. ambient dry bulb (DB) temperature, and the FOA Category 3 targets. FIG. 29 illustrates the variations in net plant efficiency and steam condensation tem.perature as a function of ambient DB temperature for the proposed indirect dry cooling, together with the ARPA-E dry cooling model. The net plant efficiency increase is estimated based on a 0.6% increase per 5.5° C. decrease of steam condensation temperature when the ambient temperature is above 15° C.

TABLE 10

Comparison of present technology, NETL Case 13, ARPA-E dry cooling model and FOA targets

| Parameter | NETL Case 13 (wet) | ARPA-E Dry Cooling | Present Dry Cooling | Category 3 Target |
|---|---|---|---|---|
| Cooling water in temp, $T_{cold}$, °C. | 15.6 | 29 | 22.6 | |
| Steam condensation temp, $T_{steam}$, °C. | 38.4 | 51.7 | 38.4 | |
| Ambient wet bulb, °C. | 10.8 | 10.8 | 10.8 | |
| Ambient dry bulb, $T_{air\ in}$, °C. | 15 | 15 | 15 | |
| Dry cooling ITD ($T_{stem} - T_{air,in}$), °C. | — | 36.7 | 23.4 | ≤25 |
| PCM melting temp, °C. | — | — | 21.6 and 35.6 | |
| Capital cost full cooling system, $/kW$_{th}$ | 49 | | 129 | ≤200 |
| Plant Net Output, kW | 555,080 | — | 547,660 | |
| Calculated LCOE $/MWh (2007$) | 74.65 | — | 77.35 | |
| Increased LCOE, % | Base | — | 3.62 | ≤5% |

The benefits of the system are derived from the use of encapsulated PCM enclosed in a rotating matrix that circulates the PCM between heat absorption and rejection cycles. Compared to current fin-tubed air-cooled condensers (ACCs), the key benefits of the present cooling system are:
1. Reduced initial temperature difference (ITD). The present design results in an ITD varying between 20° C. to 25° C. as ambient temperature varies from 15° C. to 29° C., and a match of steam condensation temperature with wet cooling towers at the NETL Case 13 design point of 15° C. (FIG. 2). The low ITD improves the net NGCC plant efficiency by up to 2% compared to the ARPA-E dry cooling model, which has an ITD of 36.7° C. The ITD involves a tradeoff between cost and performance and may be further reduced or optimized;
2. Increased air-side heat transfer coefficient and surface area. The use of highly porous EPCM modules (~95% porosity) can significantly increase both the surface area and the air-side heat transfer coefficient, with an h value about 4 times greater than that of current ACCs;
3. Reduced pressure drop and operational cost of primary steam. By using indirect dry cooling to decouple the steam condensation and heat rejection processes, steam pathways can be independently optimized for reduced pressure drop and cost, which translates to lower steam turbine back pressure and more power production,
4. Reduced capital cost, footprint, and subfreezing concerns of ACC. By embedding high-capacity PCMs into a compact rotary heat exchanger, the present design can reduce up to 50% of the capital cost and footprint.

These technological advancements are likely to radically alter the dry-cooling technology for power plant cooling systems and data center cooling systems. Thus, in another aspect the invention relates to power plant cooling systems, power plants, data center cooling systems and data centers which comprise one or more and preferably a plurality of the heat exchangers of the present invention.

This invention utilizes a PCM slurry bed to absorb the heat from the steam tubes and spray nozzles to generate PCM droplets in the air for air-cooling and solidification of the PCM. The key advantages of the proposed dry cooling system are:
1. No potential particulate emissions. By encapsulating PCMs and connecting them together into strong structures, loss of PCM particles to the surrounding environment is eliminated;
2. Simplicity of air-side operation and maintenance. By eliminating spray nozzles and the need to pump liquid PCM, the potential for clogging as a result of contaminants, accidental freezing of flow lines, and other operational difficulties is eliminated; and
3. Increased compatibility with geographic and weather variations. By using modular EPCM structures and mixing two or more PCMs with various melting temperatures, designing and optimizing the proposed systems for various weather conditions is simplified.

As a result of these advantages, the system should be useful with next-generation power plant cooling. In addition, this technology can be adapted to the existing wet cooling towers that are used in about 42% of U.S. steam power plants, resulting in a relatively cost-effective retrofitting option. The costs associated with this system are expected to be much less than that of other emerging technologies because of the relative simplicity of the system.

Figure 30:
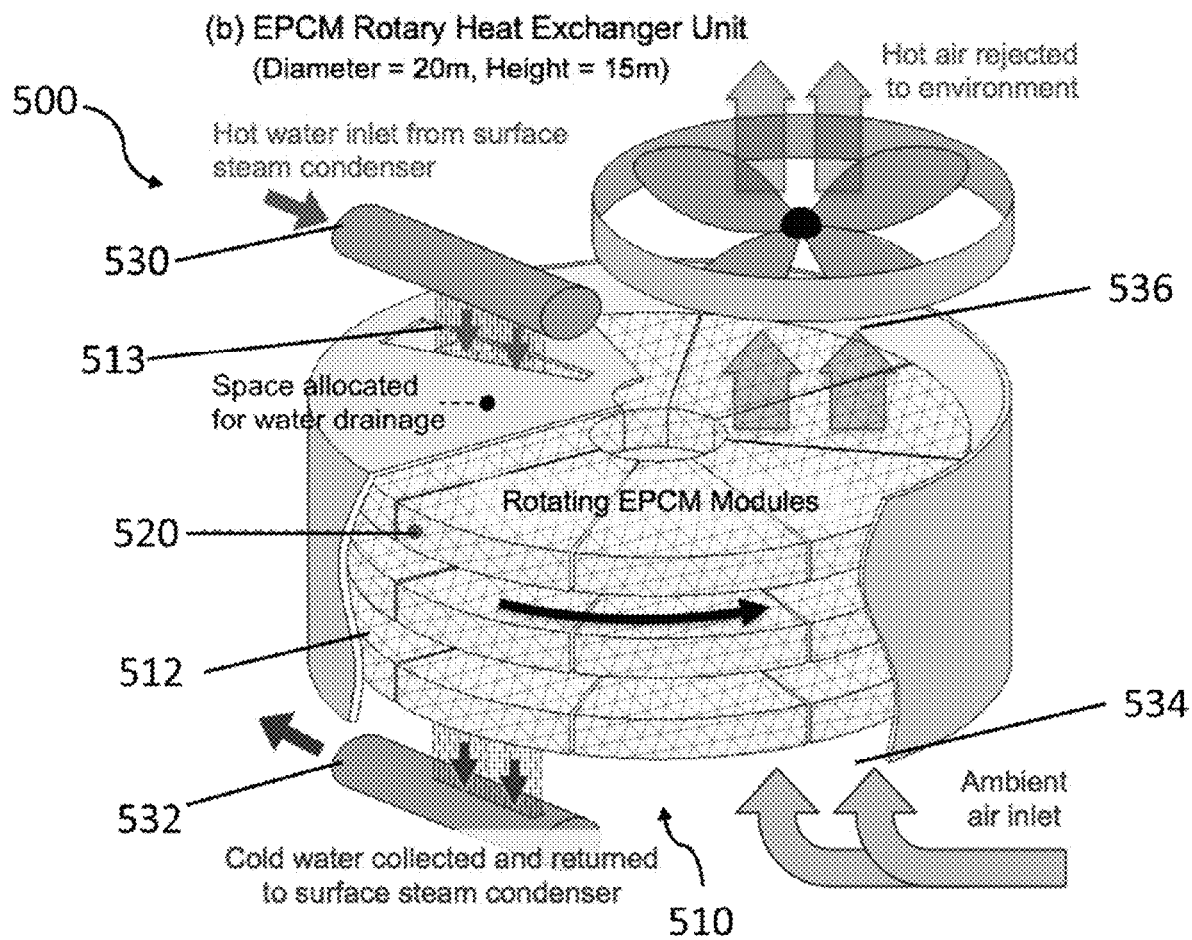
FIG. 30 is a schematic diagram of a rotary heat exchanger according to an embodiment of the present invention.

An embodiment of a rotary heat exchanger unit 500 is shown in FIG. 30, the rotary heat exchanger containing EPCM materials is used to dissipate heat from a water-cooled steam surface condenser with negligible water loss to the environment. The rotary systems that are incorporated with EPCM containers are based on the widely used regenerative air preheaters for the power plant industry. These large-scale rotary preheaters (e.g., 20 m in diameter and 10 m in height, see FIG. 31) are designed to run constantly in a harsh environment with extended life and low maintenance. The preferred EPCM rotary heat exchanger will benefit greatly from the existing well-optimized and reliable rotary designs.

Figure 31:
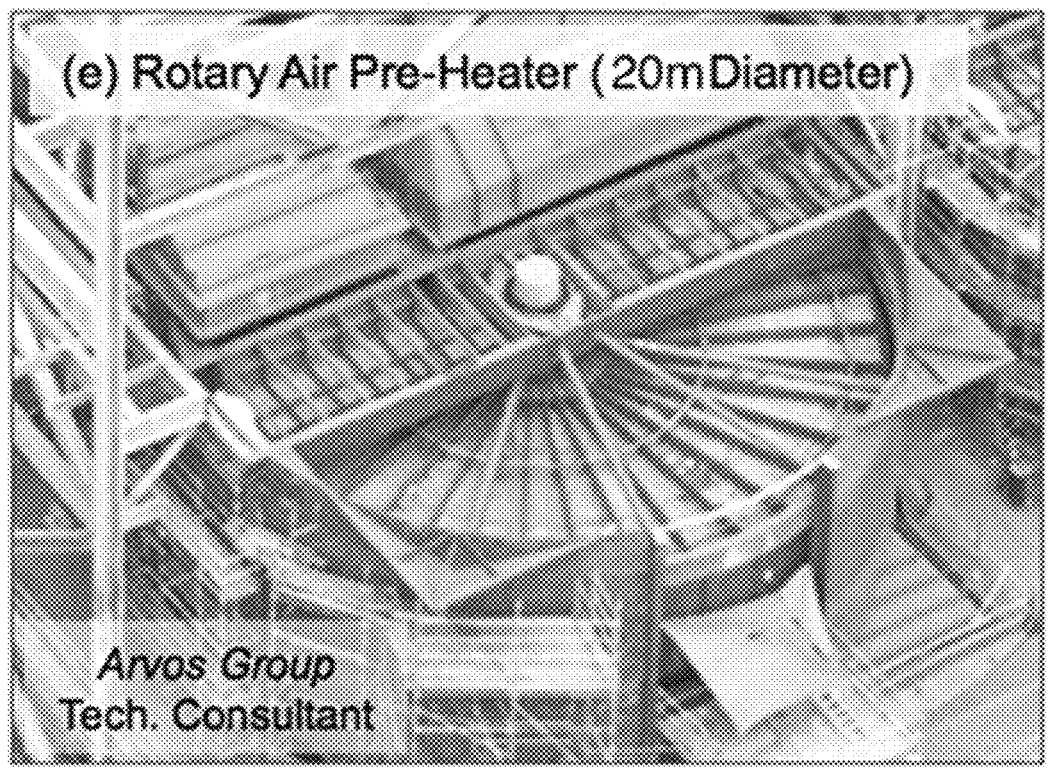
FIG. 31 is a photograph showing a prior art rotary air preheater.

As shown by FIGS. 30 and 31, the recirculating scheme of interest for the EPCM structure is the continuously rotating cylinder design that has been widely used in regenerative air preheaters for the power plant industry. A rotary air preheater is a large-scale heat exchanger that is packed with metallic heat transfer baskets in a sturdy steel frame and is used to recover heat from the flue gas to preheat the air before it enters a boiler. For the recirculating scheme of the present invention, instead of employing heat exchange between a flue gas and air, the system i) extends the rotary heat exchanger ("HX") design to transfer heat between a fluid (e.g. a liquid such as water) and another fluid (e.g. a gas such as air), and ii) embeds PCMs into a highly porous, and optionally polymeric structure in lieu of the metallic heat transfer element, for a compact, light-weight design at low cost. Meanwhile, the invention will benefit from the LJUNGSTRÖM rotary air preheater, an existing, well-optimized rotary system.

FIG. 30 shows a partial cut-away view of a heat exchanger 500 according to an embodiment of the present invention. Simple water treatment should be sufficient to prevent corrosion, scaling, and fouling. A minor makeup water supply may be required to occasionally compensate for the practically negligible water loss through evaporation from the outer surface of the hollow structures. Further, water loss mitigation strategies such as mechanical agitation of the EPCM structures and localized high-speed air jets can also be used, and are discussed in further detail below.

A first fluid enters the heat exchanger 500 through a first fluid inlet 530 that is preferably fluidly connected to a supply of liquid, which may be the hot water leaving a condenser. The first fluid inlet is positioned to direct the first fluid through the porous structure of the phase change material modules for contact between the first fluid and the outer surfaces of the hollow structures containing the phase change material. The first fluid is cooled by melting phase-change material housed within the hollow structures 524, a plurality of which, taken together, form the phase change material modules 520. After contacting the hollow structures 524, the first fluid may be removed from the heat exchanger 500 through a first fluid outlet 532.

A second fluid inlet 534 provides a second fluid to the heat exchanger. Preferably, the second fluid inlet is fluidly connected to a supply of a gas such as air. The second fluid inlet is positioned to direct the second fluid through the porous structure 510 for contact between the second fluid and the outer surfaces of the hollow structures. The second fluid is heated by freezing phase-change materials housed within the hollow structures. After contacting the hollow structures the second fluid may be removed from the heat exchanger 500 through a second fluid outlet 536. In a preferred design the direction of flow of the first fluid is substantially opposite to the direction of flow of the second fluid.

The porous structure 510 is mounted on a rotary system 544 that repeatedly circulates the phase change material modules 520 into alignment with the first fluid inlet and the second fluid inlet by rotation of the phase change material modules about a central axis of the heat exchanger. Preferably the rotary system 544 uses the existing technology developed for rotary air pre-heaters (FIG. 31). Although the rotary system 544 has been shown to be oriented in a vertical direction, the present embodiment of the heat exchanger can also be used with a rotary system that is oriented in a horizontal direction or any other orientation.

Figure 32:
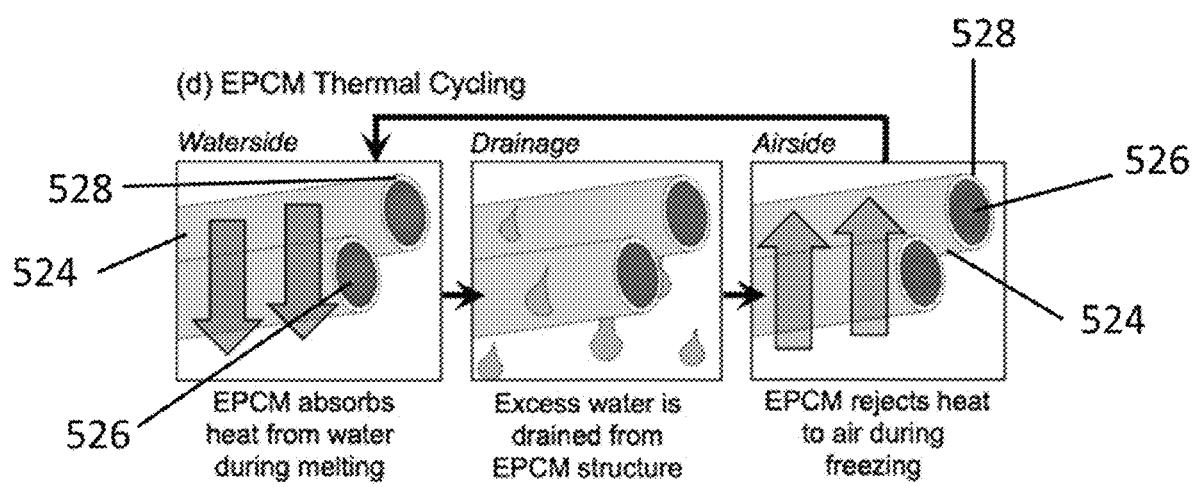
FIG. 32 is a schematic diagram of the thermal cycling of the heat exchanger of FIG. 30.
Figure 35:
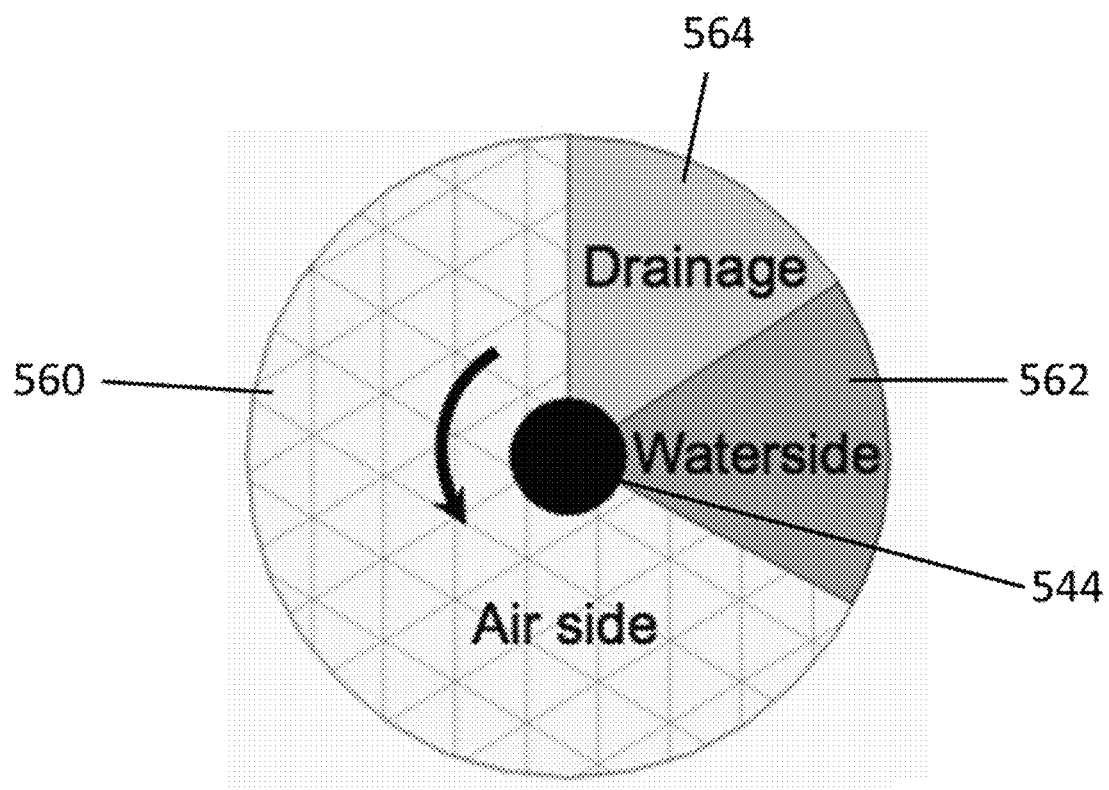
FIG. 35 is a schematic diagram of the top view of the heat exchanger of FIG. 30.

A summary of an example of the thermal cycle of the EPCM is shown in FIG. 32. As the first fluid is passed over the hollow structures in the warming side where the PCM is warmed, the PCM within the hollow structures absorbs heat from the fluid as the PCM melts. The first fluid is preferably water at a temperature above the melting temperature of the PCM and the warming side is thus preferably a water side as shown in FIG. 32. The first fluid exits via the first fluid outlet 532 and any excess fluid may then be drained from the porous structure in an optional drainage section following the warming side. Finally, within a cooling side of the heat exchanger, the PCM rejects heat to the second fluid as the second fluid contacts the outer surfaces of the hollow structures and, as a result, the PCM material freezes. The preferred orientation of the sections within the heat exchanger are shown in FIG. 35, where the drainage section 564 is located between the warming side 562 and the cooling side 560 as indicated based on the direction of rotation of the phase change material modules. The drainage section is preferably employed to reduce loss of water in the system to a practically negligible level.

Figure 33:
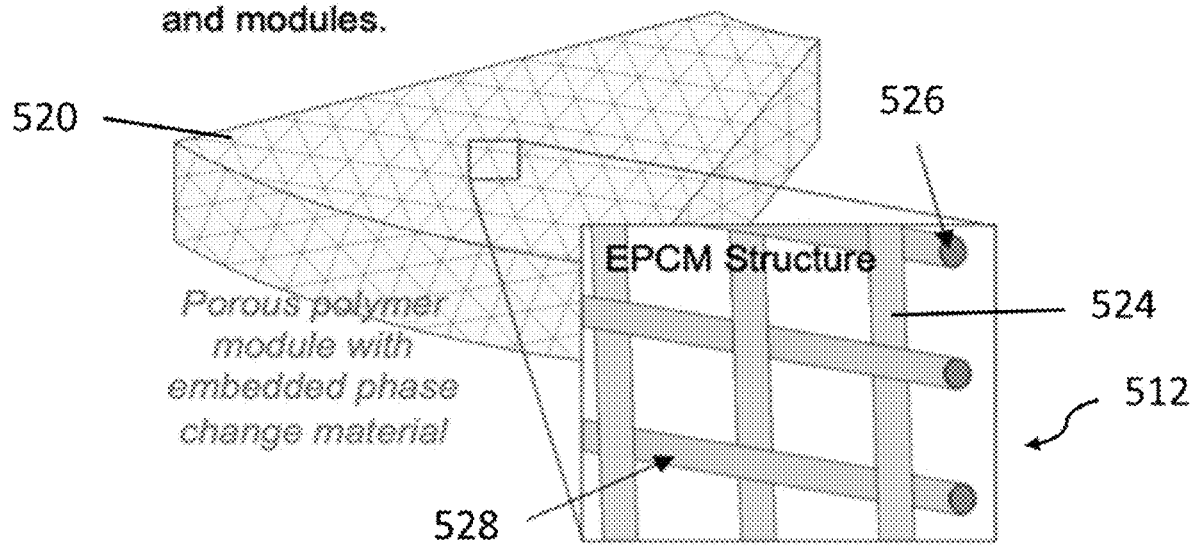
FIG. 33 is an enlarged schematic diagram of an EPCM module of the heat exchanger of FIG. 30.
Figure 41:
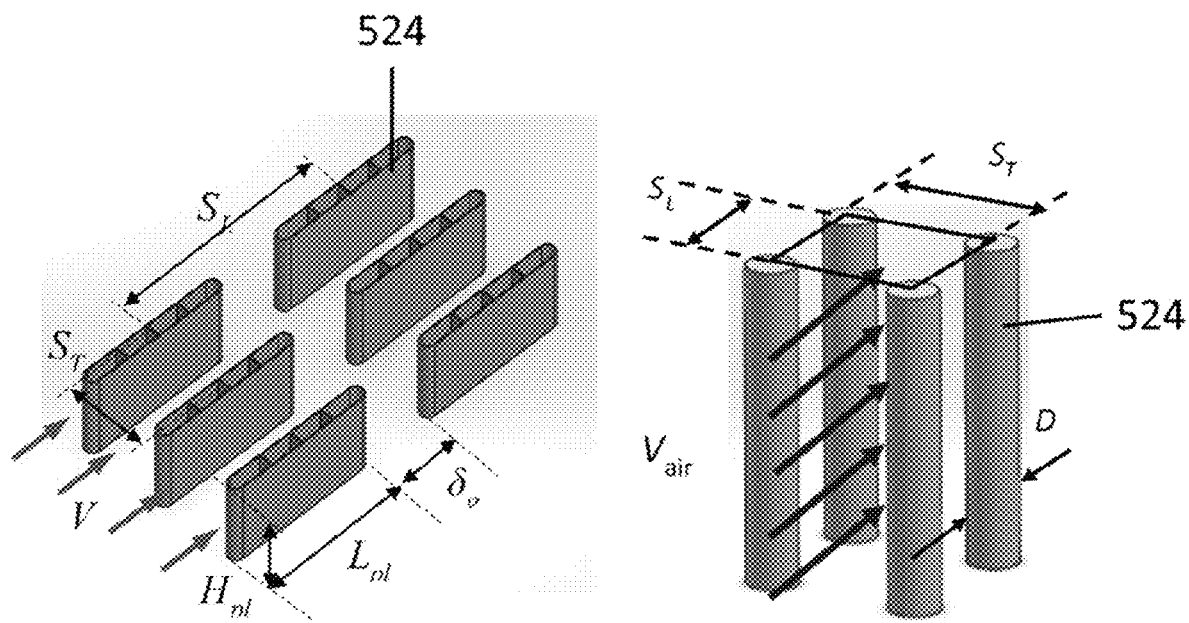
FIG. 41 is a schematic diagram showing circular and short flat plate tubes according to an embodiment of the present invention.

FIG. 33 shows a closer view of a PCM module 520 forming the porous structure 510. In this embodiment, a mesh-like structure 512 is employed as a possible configuration for the hollow structures 524. The hollow structures 524 are preferably made from a polymer, but other materials such as metals, discussed above, and composites can also be used. Specific considerations for material selection are discussed in more detail below. The porous structure may also be formed from hollow structures that are not intertwined with each other to form a mesh-like structure. As shown in FIG. 41 and discussed in further detail below, the porous structure may also comprise hollow structures with various different shaped cross-sections. These hollow structures may be intertwined, but are preferably substantially aligned with each other in the direction of intended fluid flow. The aligned hollow structures may also be arranged such that they radiate away from the central axis of rotation in a shape comparable to the spokes of a wheel when viewed from a direction parallel to the direction of the central axis of rotation. Alternatively, the aligned hollow structures may be oriented such that they form substantially concentric circles about the central axis of rotation.

The PCM material 526 is housed within the hollow structures. The PCM module 520 has a high heat capacity (>200 kJ/kg), a high heat transfer coefficient for both air and water, a large surface area, a low pressure drop, and preferably a low cost.

In some embodiments, invention employs the best PCM-hollow structure material pair for high $c_p$, k, and stability. Through high-fidelity modeling and experiments, the most efficient PCM heat transfer element for the best thermofluidic performance and mechanical reliability may be selected. The highly porous PCM structures can be fabricated via scalable manufacturing routes, and system-level simulations can be used to guide the design of the systems.

Figure 34:
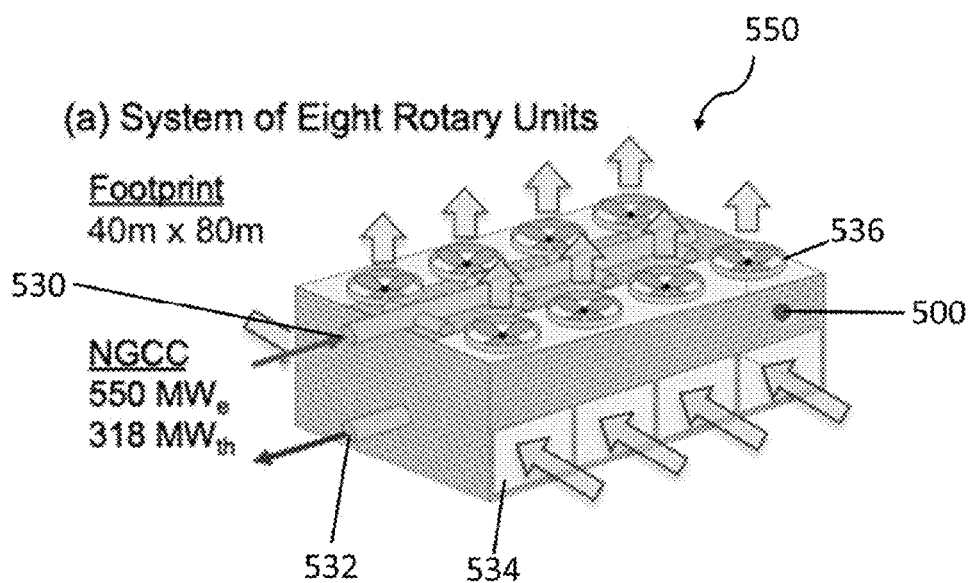
FIG. 34 is a schematic diagram of a cooling system of an embodiment of the present invention.

Preferably, an entire cooling system 550 can be formed using one or more of the heat exchanger units 500 as shown in FIG. 34, and as described herein. If more than a single unit is used, each of the units 500 may be connected to the same first fluid inlet 530, and first fluid outlet 532. Preferably, each heat exchanger has a separate second fluid outlet 536 and its own second fluid inlet 534 for drawing the second fluid into the heat exchanger 500.

Elimination of Water Loss to the Environment

In a preferred embodiment, the indirect dry cooling heat exchange system of the present invention uses short-term thermal storage within a high-surface-area EPCM structure to transport heat from the steam condenser water to the ambient air. The recirculating operating principle allows for strict segregation of the two flows to eliminate drift, water entrainment, and evaporation of the water while in contact with the cooling air. Although the two flows can be readily separated to avoid direct interaction, a key technical risk of the proposed design is the possibility of adhered water being physically transported from one side to the other side during operation. This phenomenon would create a potential for drift and evaporation, thus leading to a non-trivial water loss to the environment. As such, a key design specification for a preferred embodiment of the rotary heat exchanger unit is the elimination of adhesion and transportation of the first fluid, preferably water, on the EPCM structure.

Water loss considerations may drive the design of the overall rotary heat exchanger units. As seen in FIG. 35, the available footprint of the rotating EPCM structure is preferably segregated into three sections. A cooling side 560 will be used to freeze the EPCM during heat rejection to the second fluid. A warming side 562 will be used to melt the EPCM during heat absorption from the first fluid, and a drainage section 564 may be located immediately after exposure to the flow of the first fluid in the warming side 562. The drainage section 564 will be dedicated to recapturing the first fluid to avoid transport of the first fluid to the air or cooling side 560.

A combination of passive and active fluid removal strategies may be implemented in the drainage section of the rotary system. As can be seen, the overall size of the fluid recapture section will dictate the amount of the available footprint area for cooling; therefore, this section is a major driver in the overall heat load that one unit can dissipate. The size of the warming side heating area relative to the cooling side freezing area is directly proportional to the ratio of the cooling-side to warming-side heat transfer coefficients. The water drainage section should be minimized to increase the overall system efficiency while still maintaining a minimal, and preferably no first fluid loss from the system.

Passive Water Recapture Strategies

The porous structure is preferably fabricated using polymeric materials to form hollow structures with embedded phase-change materials within the polymeric shell. In addition to their low weight and cost, high durability and lifetime, and manufacturability, polymer materials provide the ability to make the hollow structure surfaces naturally hydrophobic. The preferred hollow structure materials of polypropylene and polyethylene ("PE") exhibit equilibrium contact angles of 95-102°, providing an intrinsic ability to naturally shed water during the fluid recapture portion of the cycle.

Figure 36:
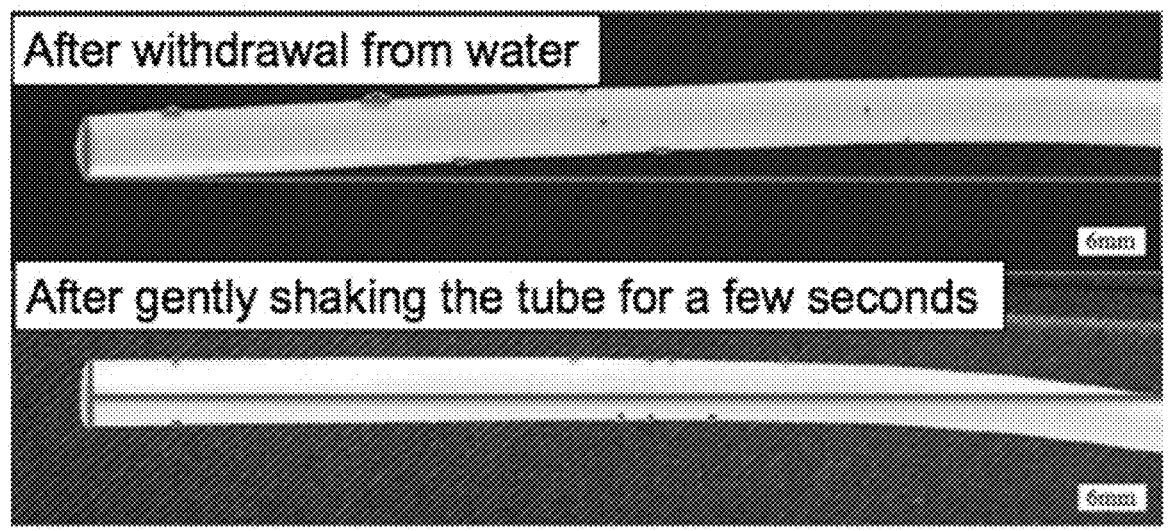
FIG. 36 is a photograph showing water droplets on a tube as shown in FIG. 33.

FIG. 36 shows the results of simple preliminary tests to characterize water adhesion and removal on ¼ inch diameter PE tubing. The commercially purchased tubes were immersed and removed from stagnant water and imaged to measure the volume of adhered water droplets. The measured water volume per unit surface area before and after gently shaking the tube was $3.6 \times 10^{-3}$ mm$^3$/mm$^2$ and $2.8 \times 10^{-4}$ mm$^3$/mm$^2$, respectively. This result shows that over 90% of the adhered water can be removed with mild vibration even with non-optimized surface geometries. Based on the preliminary design this would result in a total adhered water amount of less than 0.01% of the condenser flow. This value is consistent with the yearly water usage for cleaning a 550 MW ACC, and it is less than 0.5% of the water evaporation rate in a typical wet cooling tower capable of handling the same cooling load.

Figure 37:
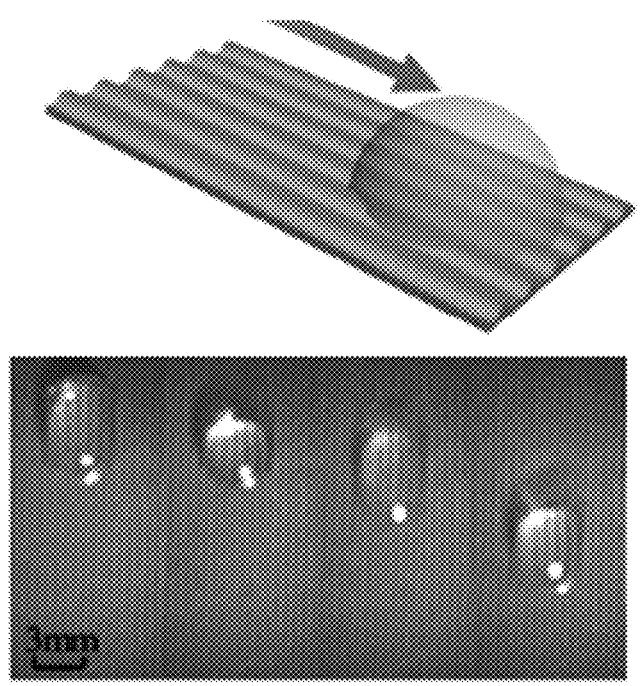
FIG. 37 is a diagram and picture showing fluid movement on a material surface.

Numerous drainage strategies may be considered to attempt to completely eliminate the potential for any first fluid loss. Fluid-shedding hollow structure designs incorporating surface structures (0.1-1 mm feature sizes) and geometric contours that promote gravity-driven removal of adhered water droplets, as shown in FIG. 37 can be utilized. Several preferred surface structures have been demonstrated in various reported works. For example, Hejazi, V., Sobolev, K., and Nosonovsky, M., "From superhydrophobicity to icephobicity: forces and interaction analysis," *Scientific Reports*, 3, (2013), Quéré, D., Azzopardi, M.-J., and Delattre, L., "Drops at rest on a tilted plane," *Langmuir*, 14, 2213-2216, (1998), Zhang, P. C., et al., "Grooved Organogel Surfaces towards Anisotropic Sliding of Water Droplets," *Advanced Materials*, 26, 3131-3135, (2014), and Zhong, Y., Jacobi, A. M., and Georgiadis, J. G., "Effects of surface chemistry and groove geometry on wetting characteristics and droplet motion of water condensate on surfaces with rectangular microgrooves," *International Journal of Heat and Mass Transfer*, 57, 629-641, (2013), which are incorporated herein by reference. Any of these, or similar structures may be employed. Preferable geometric features and contours are those that are capable of being readily included in the proposed manufacturing strategies; do not pose a major fouling problem; and do not rely on coating technologies that are susceptible to long-term wear and degradation.

Active Water Removal Strategies

Figure 38:
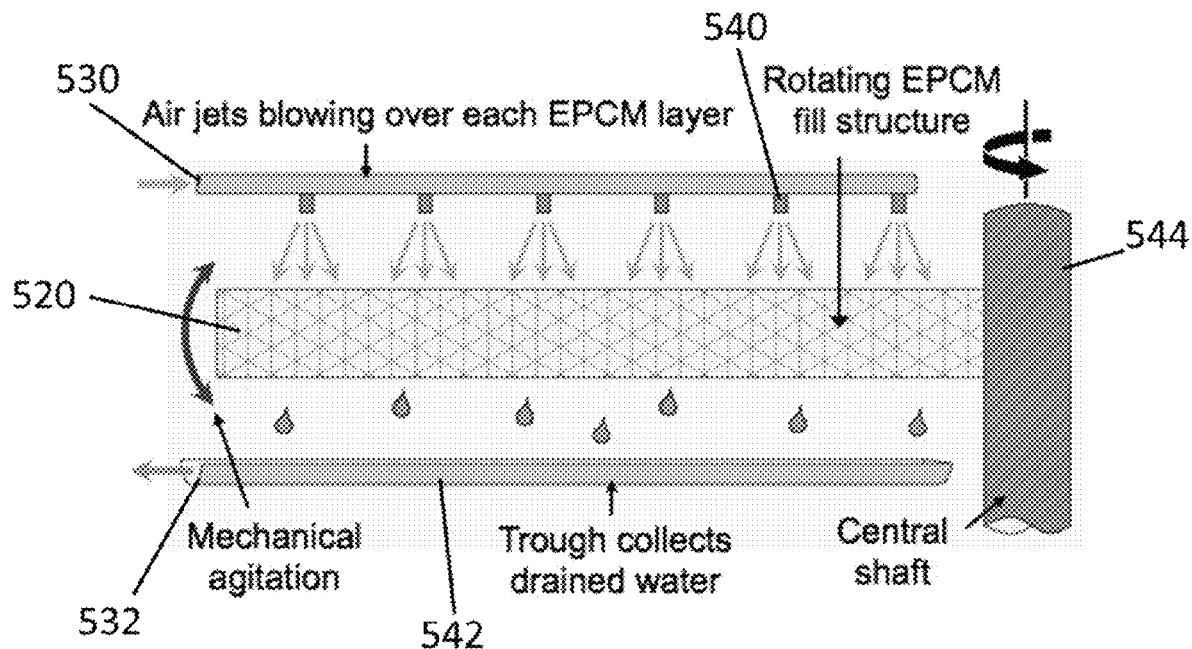
FIG. 38 is a schematic diagram of a drainage system according to an embodiment of the present invention.

The combination of optimized geometric designs with intrinsically hydrophobic materials may result in porous structures with minimal adhesion and water loss. However, considerations of the properties of the porous structure (for thermofluid performance, reliability, and manufacturability) may lead to designs that require the use of active removal strategies. Both shear-driven and mechanical agitation techniques may be used to ensure more complete elimination of any adhesion and transportation of water droplets into the cooling side fluid flow over the life cycle of the system (30+ years). FIG. 38 shows a schematic representation of a shear-driven "air-knife" approach. The continuously rotating layers of PCM modules 520 are interdigitated with linear arrays of pressurized air jets 540 and collection troughs 542 in the drainage section. The air flow from the pressurized jets provides sufficient shear force to shed small diameter adhered droplets within the complex porous structure. The fluid droplets are then collected from below and routed back to the condenser fluid flow. Based on the preliminary system design, a single rotary unit with 15 layers of 0.1 m thick PCM modules requires about 100 kg/s of airflow to provide a 25 m/s jet speed. These flows provide sufficient shear to remove droplets as small as 1 µL and would require negligible power consumption (10's kW) for the entire cooling system. See, Hu, H. B., Huang, S. H., and Chen, L. B., "Displacement of liquid droplets on micro-grooved surfaces with air flow," *Experimental Thermal and Fluid Science*, 49, 86-93, (2013), Milne, A. J. B. and Amirfazli, A., "Drop Shedding by Shear Flow for Hydrophilic to Superhydrophobic Surfaces," *Langmuir*, 25, 14155-14164, (2009). Although, these air speeds are preferable, slower or faster speeds may also be useful to remove excess fluid, and can be dependent on the materials selected for the hollow structure, sizing of the structures, and the specific fluid used.

In addition to (or in place of) air jet active removal strategies, simple mechanical and acoustic mechanisms to remove droplets using small structural agitations rather than shear flow could also be employed. As the PCM module rotates within the large cylindrical structure, small inertial forces can be applied via controlled induced vibrations or acoustic waves. This approach is simple and cheap, and can be used to overcome energy barriers associated with unwanted contact line pinning of adhered droplets. The preliminary tests discussed above, which used millimeter-scale polyethylene tubes have shown the viability of this general approach. The tubes were withdrawn from a water bath and then by gently shaking them three times the volume of adhered water was reduced by over 90%. These tests show that removal can be accomplished using extremely small amount of power.

The heat exchanger preferably implements at least one, and perhaps several, of these passive and/or active fluid removal strategies to achieve the net water loss target of <0.01% of the surface steam condenser water flow in a 550 MW power plant. This value is comparable to the evaporation rate experienced from an Olympic sized swimming pool, as well as to that used to clean similarly sized ACCs. However, it is also understood that the heat exchanger of the present embodiment can be operated without any additional passive or active fluid removal strategies as well.

Thermal Conductivity of EPCM

Among thermophysical and thermochemical energy storage materials, phase change materials offer high volumetric energy densities and are more suitable for the compact design required for power plant cooling. Paraffinic hydrocarbons, also referred to as Paraffin herein, are one of the most common PCMs due to their large latent heat, low vapor pressure in liquid, good chemical stability, self-nucleating behavior, safety, and low cost. By adjusting the carbon number of the alkane (paraffin), a desired melting temperature may be obtained, e.g., n-Nonadecane ($C_{19}H_{40}$) with $T_m=32°$ C. and n-Octadecane ($C_{18}H_{38}$) with $T_m=28°$ C. are promising phase change materials.

Despite these desirable properties, paraffin suffers from a relatively low thermal conductivity (0.2-0.4 W/m-K). Nano-additives, based on carbon nanotubes (CNTs), carbon/graphite nanofibers (CNFs), exfoliated graphite nanoplatelets (xGnP), ultrathin-graphite foams may be employed as conductivity enhancers for paraffin PCMs. For paraffin/xGnP composites with 10 wt % xGnP loading, an up to 10-fold thermal conductivity increase can be attained. Commercially available xGnP (XG Sciences) of different sizes have been mixed at various weight fractions with pure icosene ($C_{20}H_{42}$) and another PCM. Results show a 5-fold thermal conductivity enhancement at 5 wt % xGnP loading, as these high aspect ratio xGnPs (15 nm thickness and 25 μm diameter) reach the percolation threshold. Paraffinic hydrocarbons are preferably used as the PCM material, but other PCM materials, such as fatty acids, inorganic salt hydrates and/or eutectics may also be used in the present invention.

For the polymer encapsulant, high density polyethylene (HDPE) hollow structures are preferred because of their hydrophobicity and relative low cost. The HDPE encapsulant (thermal conductivity of ~0.5 W/m-K) may be only about 0.2 mm thick, thin enough to not cause major heat resistance on the air side, i.e., $\delta/k_{HDPE}=0.0004$ K-m$^2$/W as compared to the air-side heat resistance of $1/h_{air}=0.0056$ K-m$^2$/W for $h_{air}=178$ W/K-m$^2$ as shown in Table A2 for a 2.7 mm OD hollow structure design. If the thermal conductivity is still a concern, additives, such as nanoclay or exfoliated graphite can be blended with the HDPE resin during hollow structure fabrication to increase the encapsulant conductivity.

Hollow Structure Design for Porous Structure

The design of the geometric features of the hollow structures forming the porous structure impact 1) air-side heat transfer coefficient (HTC) and pressure drop, 2) manufacturability and reliability, and 3) the ability to efficiently and effectively shed the first fluid prior to exposure to the second fluid flow.

High density polyethylene ("HDPE") hollow structures of different sizes and shapes can be mass produced by extrusion down to a wall thickness of as little as 0.025 mm. The other criteria for selection of HDPE will be discussed in further detail below. The PCM melt can then be infiltrated into the HDPE encapsulant to form PCM modules. Interdigitated designs may be useful for reducing possible water entrapment around cross regions between the hollow structures, if cross regions are present in the design. A PCM structure and design can be selected based on aerodynamic performance benefits using computational fluid dynamics (CFD) simulations, as well as based on the thermofluidic performance of different cross-sectional geometries. To create the porous structure, injection molding is preferred, but any suitable process can be used, including 3D printing.

The geometry of the hollow structures that form the porous structure can be optimized in a variety of different ways. Considerations for EPCM structure design and fabrication include PCM properties, CFD/FEA analysis, wind tunnel/environmental chamber tests for diverse EPCM structures such as extended surfaces and vortex generators, fast PCM solidification time, enhanced cooling-side heat transfer, and reduced pressure drop.

The outer surface of the hollow structures may have a configuration to increase the flow of liquid from its surface. Additionally, the cross-section of the hollow structures can be selected to have a preferred shape to increase the thermofluidic performance (j/f). The thermofluidic performance of the porous structure may also be optimized by either keeping the structures inline or offsetting them so that they are staggered across the direction of flow.

Figure 42:
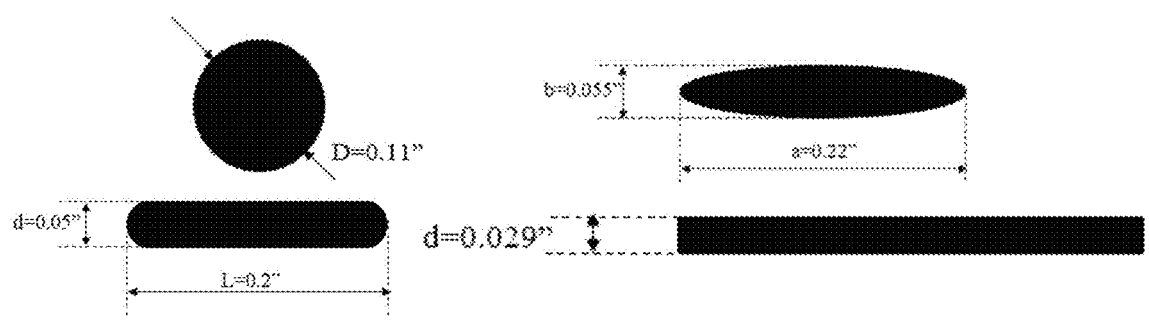
FIG. 42 is a diagram showing various cross-sectional shapes for tubes according to an embodiment of the present invention.

The thermofluidic performance of different cross-sectional geometries shown in FIG. 42 was measured at the same porosity of 98%. Thermofluidic performance results are show in Table 11 and is measured as j/f, where:

$$j = \frac{Nu}{Re \cdot Pr^{1/3}}$$

$$f = \frac{\Delta p}{\frac{A_t}{A_c} \frac{1}{2} \rho V_{max}^2}$$

$A_t$—Total tube circumferential areas
$A_c$—Cross-sectional area of test section

TABLE 11

Thermofluidic performance of different geometries of tube cross-sections

| Geometry | j/f |
| --- | --- |
| Circular tube bank | 0.103 |
| Elliptical tube bank | 0.126 |
| Flattened tube bank-Inline | 0.169 |
| Flattened tube bank-Staggered | 0.137 |
| Short flat plate (Stadium-shaped) | 0.444 |

Regarding cross-sectional geometries, any cross-sectional shap can be used, including but not limited to circular, elliptical, rectangular, stadium-shaped, teardrop-shaped, airfoil shaped, rounded rectangular, and ovoid. FIG. 42 shows several of these possible cross-sectional geometries. Preferably, the PCM module has a stadium-shaped cross-section based on the demonstrated best thermofluidic performance.

Figure 43:
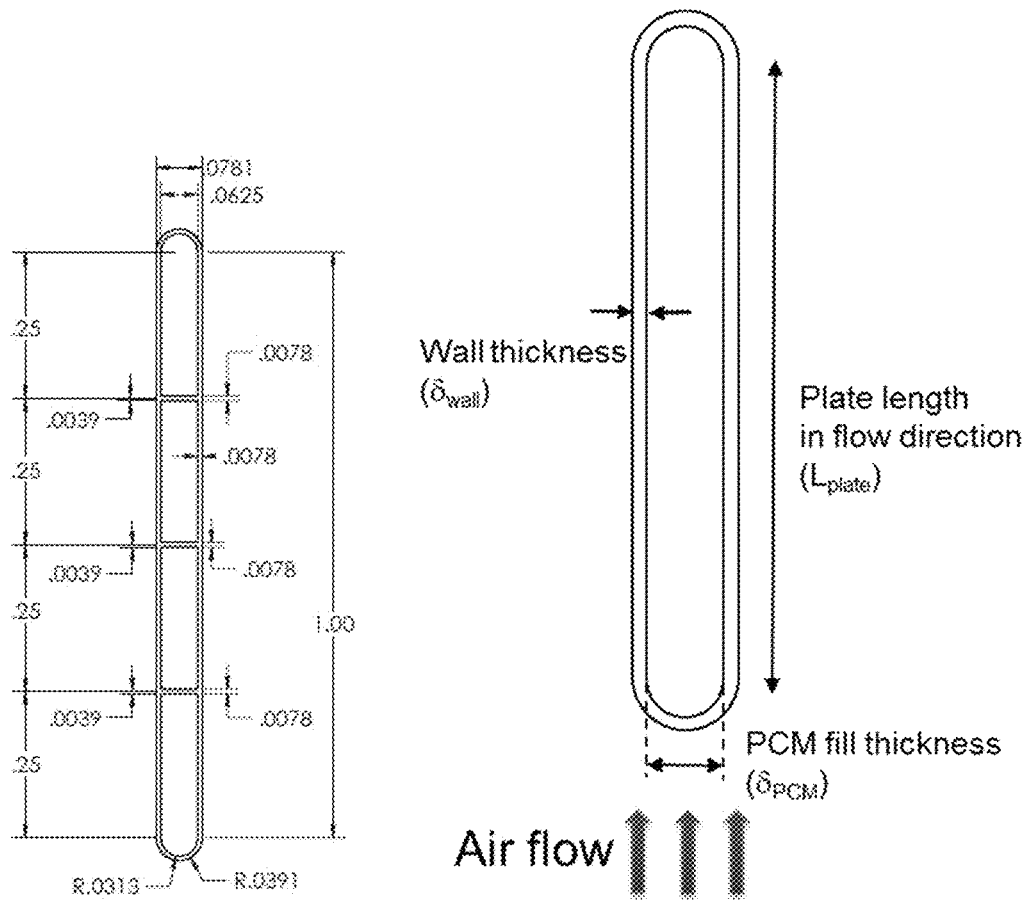
FIG. 43 are diagrams showing dimensions for short flat plat tubes shown in FIGS. 41 and 42.
Figure 43:
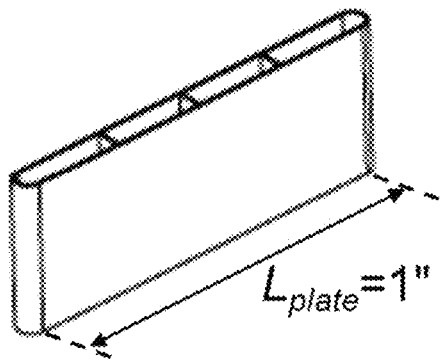

The preferred plates for forming the porous structure are shown in FIG. 43. Preferably, the length of the cross-section of the plate is greater than 2 times the width of the cross-section of the plate. Preferably, the plate is made from HDPE with a wall thickness from about 0.10 mm to about 0.3 mm, more preferably from about 0.15 mm to about 0.25 mm, and most preferably about 0.2 mm. For HDPE, a wall thickness of about 0.2 mm has been shown to provide over 30 years of service life. The PCM fill thickness is about 1.0 mm to about 2.0 mm, more preferably about 1.4 mm to about 1.8 mm and most preferably the PCM fill thickness is about 1.6 mm. The plate length is about 20.0 mm to about 30.0 mm, more preferably about 22.0 mm to about 26.0 mm, and most preferably 25.4 mm. Each plate preferably includes a plurality of internal partitions extending across the interior of the plate as shown in FIG. 43. The internal walls forming the partitions within the plates preferably have a thickness of about 0.02 mm. The partitions are optional and are used to increase the rigidity of the thin-walled hollow structure formed by the plate.

Regarding offset, Table 11 above shows that inline arrangement of the hollow structures provides a better thermofluidic performance than a staggered configuration. A preferable configuration for each PCM module includes at least two sets of hollow structures. Each hollow structure in a set of hollow structures is substantially aligned with the other hollow structures of the set in the intended fluid flow direction, as shown in FIG. 41. FIG. 41 also shows that each set of hollow structures is substantially parallel with another set in the direction of intended fluid flow.

The optimal parameters for both circular cross-section hollow structures (right side of FIG. 41), as well as the preferable stadium-shaped geometries for the hollow structures (left side of FIG. 41) are shown in FIG. 41. Thus, $$P_T = \frac{S_T}{D} \quad P_L = \frac{S_L}{D}$$

Preferably, $P_L$ is 1-5, or 2-4 and $P_T$ is 4 to 16, or 6-15, or 8-13, or 10-12. Most preferably, $P_T$=12 and $P_L$=3.

In the above equations, $S_T$ is the distance from the center of a first hollow structure to the center of a second hollow structure as measured perpendicular to the intended direction of fluid flow. $S_L$ is the distance from the center of a first hollow structure to the center of a second hollow structure as measured parallel to the intended direction of fluid flow, and D is the largest distance across a hollow structure as measured in a direction substantially parallel to an intended fluid flow direction.

The coefficient of performance was calculated for a low cost option, a base option and an aggressive option, as shown in Table 12.

TABLE 12

Thermal load = 357 MW, Air inlet temperature = 15° C.,
Water inlet temperature = 35.6° C., $T_{melt}$ = 29° C.,
Foot print area = 70 m × 70 m

| $V_{air}$ [m/s] | $L_{plate}$ [mm] | $\delta_{well}$ [mm] | $\delta_{PCM}$ [mm] | $\Delta p$ [Pa] | $\Delta T$ water (C) | $t_{solid}$ [S] | $t_{melt}$ [S] | $L_{total}$ [m] | COP |
|---|---|---|---|---|---|---|---|---|---|
| Low cost option |||||||||| |
| Surface area = 930, 620 m², $N_{layers}$ = 75, $M_{PCM}$ = 307, 104 kg |||||||||| |
| 10.5 | 25.4 | 0.2 | 0.8 | 141 | 5 | 128 | 78 | 3.7-6.2 | 70 |
| Base option |||||||||| |
| Surface area = 1.07 × 10⁶ m², , $N_{layers}$ = 86, $M_{PCM}$ = 354, 957 kg |||||||||| |
| 8.2 | 25.4 | 0.2 | 0.8 | 113 | 5 | 164 | 74 | 4.3-7.2 | 100 |
| Aggressive option |||||||||| |
| Surface area = 1.31 × 10⁶ m², $N_{layers}$ = 126, $M_{PCM}$ = 431, 474 kg |||||||||| |
| 6.9 | 31.75 | 0.2 | 0.8 | 92 | 5 | 216 | 73 | 7.2-11.2 | 130 |

Figure 44:
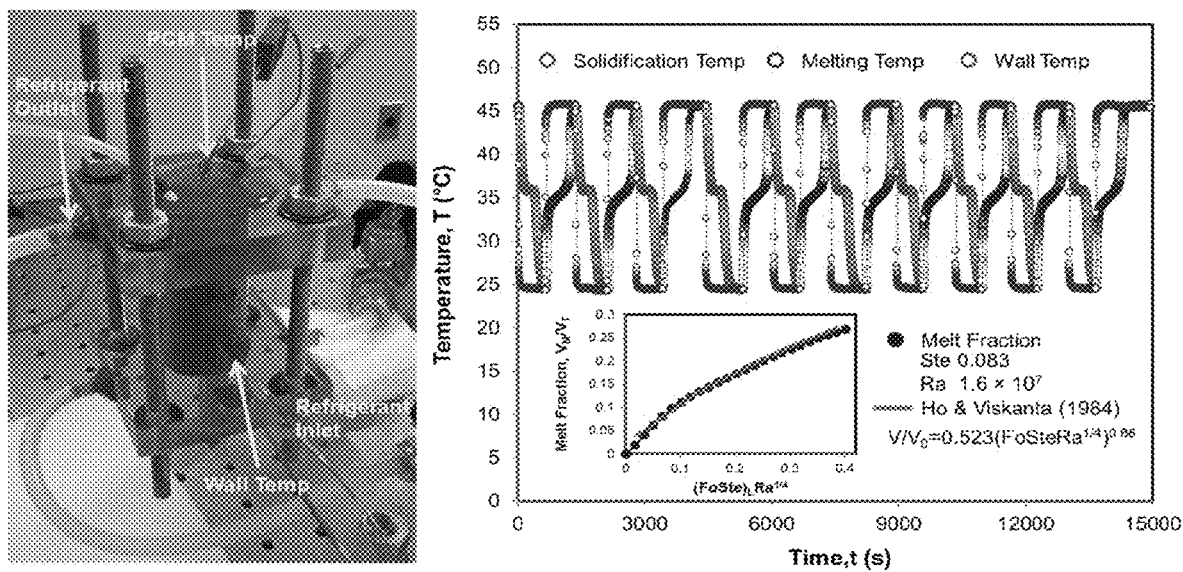
FIG. 44 is a testing device used to test the PCM materials of the present invention.

Air-side and water-side heat transfer and pressure drop analysis: The air-side heat transfer and flow through EPCM structures can be influenced by constructing EPCM structures of different size, shape, spacing, and porosity. The air flow rate, pressure drop, and temperature can be measured in and out of the wind tunnel shown in FIG. 44, along with the temperature of the EPCM. The air-side heat transfer coefficient $h_{air}$ and the pressure coefficient $C_{p,air}$ can be calculated and correlated with the $Re_{air}$ (using the EPCM wire outer diameter d), and wire spacing $\delta$ and porosity $\varepsilon$ of the EPCM structure following:

$$C_{p,air} = 2\Delta p_{air}/\rho_{air} U^2 = f_1(Re_{air}, \delta, \varepsilon)$$

$$Nu_{air} = h_{air} d/k_{PCM} = f_2(Re_{air}, \delta, \varepsilon)$$

$$h_{air} = \dot{Q}/[A_t(T_{PCM} - T_{air}^{in})] \quad (1)$$

where $A_t$ is the total surface area of the EPCM in air.

Other aspects that may play a role are the periodic domain of the structure matrix (single row or multiple rows) aerodynamic simulations for the pressure loss calculations as well as heat transfer calculations under isothermal wall conditions (PCM freezing temperature conditions) with air flow. Sensitivity to wall conduction may also be considered. Large Eddy Simulation (LES), Detached Eddy Simulation (DES) or Reynolds-Averaged Navier-Stokes Simulations (RANS) may be employed as determined by validation with measurements. Both LES and unsteady-RANS (URANS) approaches may be appropriate. See, Saha, A. K. and Acharya, S., "LES and Unsteady RANS for Turbulent Flow and Heat Transfer in a Coolant Passage with an Array of Square Pin-Fins," *Numerical Heat Transfer, Part A: Applications*, 46, 731-763, (2004). The simulations may also incorporate an optimization algorithm that will optimize for a weighted objective of minimum pressure drop and maximum Nusselt number, with the mesh geometrical parameters (diameter, spacing, shape) as control variables. See, Babaee, H., Acharya, S., and Wan, X., "Optimization of Forcing Parameters of Film Cooling Effectiveness," *Journal of Turbomachinery*, 136, 061016, (2014). OPENFOAM (an open-source CFD software) or an in-house scalable code (Chem3D) developed and used in the co-PI Acharya's group over the last two decades will be used for the calculations. See, Jones, R., Harvey, A., and Acharya, S., "Low Reynolds Number Turbulence Modeling of Stirred Tank Flows," *ASME J. of Fluids Engineering*, 123, 640-648, (2001), Roy, S., Acharya, S., and Cloeter, M. D., "Flow structure and the effect of macro-instabilities in a pitched-blade stirred tank," *Chemical Engineering Science*, 65, 3009-3024, (2010), Roy, S. and Acharya, S., "Scalar mixing in a turbulent stirred tank with pitched blade turbine: Role of impeller speed perturbation," *Chemical Engineering Research and Design*, 90, 884-898, (2012), and Tyagi, M. and Acharya, S., "Large eddy simulation of turbulent flows in complex and moving rigid geometries using the immersed boundary method," *International Journal for Numerical Methods in Fluids*, 48, 691-722, (2005). Chem3D is based on a body-fitted finite-difference approach using higher order differencing schemes. For embodiments involving a periodic mesh domain (single row or a streamwise periodic row), body-fitted meshes with the appropriate boundary-layer resolution can be generated using commercial grid generators such as ICEM.

RANS approaches may be used as a precursor to the larger and more complex calculations to be undertaken for the full geometry 4. These calculations, and the associated model selection (guided by the measurements and higher-fidelity simulations), can be used to provide the computational platform for the large-scale full-system simulations.

For the warming side, the calculations have to account for fluid column break-up, droplet impact and roll-off. Surface tension and the surface characteristics may play an important role in this process. Interfacial behavior can be modeled in OPENFOAM using either level set or volume of fluid (VOF) approaches. Both the passive and active approaches may be used for removing fluid from the hollow structure surface by incorporating slip conditions, as needed, on the surface to capture the hydrophobic nature of coated surfaces. High shear jets may be used as a mechanism for stripping the water. Surface translation may be used to mimic the rotary mesh and shaking to evaluate the water carryover from the warming zone to the cooling zone.

These calculations, both on the cooling side and the warming side, will provide the appropriate pressure drop correlations and heat transfer coefficients for the design.

Different geometrical parameters (mesh diameter, spacing, row-to-row configurations, form factor or shape) can be used to develop a numerical database that will complement the measurements (performed over a more limited set for validations). This database and the ensuing correlations can then be used to guide the full-scale system simulation.

Operational Design Considerations

The design uses elements from the established air preheater technology, but requires the use of new materials and structures. Because of the preferred operational mode of rotating the PCM through water and air flow, the operational lifetime of the system and subsystems needs to be considered. For the EPCM module, which is inserted into the rotating machinery, the thermal and mechanical cycling of water and air flow may impact its structural integrity. It should be noted, however, that the temperature change is only a few degrees during the cycling operation because of the PCM phase change enthalpy thereby reducing the effects of thermal stress. During the PCM phase change a volumetric change of about 10% occurs, which could put additional stress onto the encapsulating material. This additional strain can be mitigated in the EPCM manufacturing process by filling the encapsulating material with fully liquid PCM at temperatures above the operational regime. Finite Element Analysis (FEA) of thermal cycling on the stresses on the EPCM structure may be used to further quantify and ameliorate this issue.

Another technical concern is the stability of the PCM material when cycling through the solid-liquid phase change repeatedly. In the literature, a number of researchers have tested the stability of paraffin undergoing a phase change and have reported no change in the chemical and physical behavior. See, Silakhori, M., et al., "Accelerated Thermal Cycling Test of Microencapsulated Paraffin Wax/Polyaniline Made by Simple Preparation Method for Solar Thermal Energy Storage," *Materials*, 6, 1608-1620, (2013), Alkan, C., Sari, A., and Karaipekli, A., "Preparation, thermal properties and thermal reliability of microencapsulated n-eicosane as novel phase change material for thermal energy storage," *Energy Conversion and Management*, 52, 687-692, (2011), which are incorporated herein by reference. Nevertheless, a cycling test can be performed to determine the properties of a specific PCM material chosen for this application, as well as for the study of the performance of PCM materials whose thermal conductivity is enhanced with micro- and/or nano-additives.

PCM melting and freezing characterization: Relevant properties may include the latent heat of fusion, specific heat, melting temperature, density, thermal conductivity, surface tension, and viscosity of paraffin and other PCMs, with and without nano-additives. A differential scanning calorimeter, a hot wire conductivity tester, a freezing/melting cycling chamber (see FIG. 8), a tensiometer, and a rheometer can be used for measuring these properties. The microstructures of additive-enhanced PCMs before and after the melting/solidification cycles may be characterized by environmental scanning electron microscopy. One concern is the stability of the additive-enhanced PCM mixtures. Solidification and melting behaviors of additive-enhanced PCMs under different cooling and heating conditions can be examined using the liquid-cooled cycling chamber shown in FIG. 8 with one thermocouple at the center of the PCM and another at the center of the copper shell. FIG. 9 shows CFD simulations of the melting and sedimentation of PCM particles in their own melt using the arbitrary Eulerian-Lagrangian approach. See, Hamidreza Shabgard, Ying Sun, and McCarthy, M. "Heat Transfer Analysis of Solid Particles during Melting and Sedimentation in a Liquid Pool," 1st Thermal and Fluids Engineering Summer Conference. 2015. New York, N.Y. It has been found that the presence of settling PCM particles enhances the heat transfer between the bulk fluid and the heating surfaces, as a result of improved mixing as well as the latent heat associated with phase change.

The EPCM structure may be constructed using thin-wall high-density polyethylene (HDPE) tubes. HDPE has been widely used for pressurized and non-pressurized pipes and tubes. HDPE gas pipes with diameters as small as 13 mm have been designed and proven to have a service life of 50 years. A 100-year service life HDPE gas pipe can be realized using bi-modal and multimodal resins. In this application, tubes with an outer diameter in the range of 2-3 mm, with a wall thickness of 0.2 mm, may be used in the design of the EPCM modules.

Figure 39:
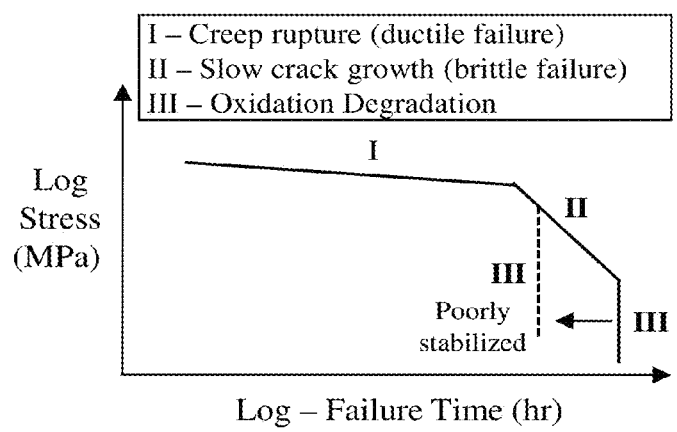
FIG. 39 is a graph showing the stress versus failure time of a polymer.
Figure 40:
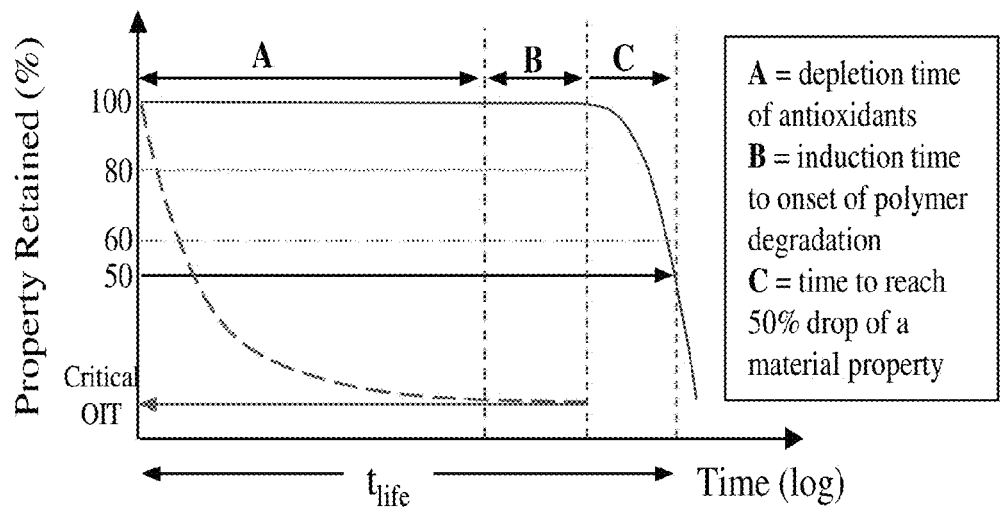
FIG. 40 is a graph showing the correlation between antioxidant depletion and material properties of a polymer.

FIG. 39 presents the conceptual relationship between the stress and failure time of HDPE pressurized pipes. Because of the non-linearity of the logarithmic stress/time curve, the long-term design strength of the tube should not be extrapolated based on the short-term test data without assessing the onset of Stage II, which is governed by stress cracking. Also, Stage III is controlled by the oxidation stability of the HDPE, which depends on the type and amount of antioxidant (AO) added to the product. The function of antioxidants is to protect HDPE from thermal- and/or photo-oxidation. Once AOs have been consumed, oxidation begins and the polymer undergoes chain scission and cross-linking-leading to the deterioration in its mechanical properties (see FIG. 40).

For an appropriately stabilized HDPE product, the onset of Stage III (i.e., the end of the lifetime of AO) will be equivalent to the design life of the product in a specific application. Specifications have been established for variety of engineering products (such as pipes, sheets and films). The efficiency of the EPCM system depends on the thermal conductivity of the HDPE tubes, whereas the polymer is known to have a low thermal conductivity. Even though the thin-wall thickness may not greatly impede the heat transfer, nanoclay or exfoliated graphite may be blended with HDPE resin during the fabrication of the tubes. 2 to 4-wt % of nanoclay can enhance stress crack resistance; however, it also accelerates the AO depletion in thick samples.

To further explore the impact of thermal cycling or mechanical perturbations on the stress distributions along the mesh structure, FEA can be undertaken using ANSYS with the heat transfer coefficient correlations developed serving as the boundary condition. The external flow temperature can be cycled over the appropriate temperature ranges and/or external forces imposed on the structure to represent agitation, and the stresses can be computed along the mesh structure. As needed, the mesh geometry may be adjusted to ensure that thermally-induced or mechanically-induced stresses are well within safety norms.

EPCM Module Manufacturing for Low Cost, High Performance, and Long Life

The modular-based EPCM structure design allows for easy manufacturing, transportation, and maintenance. Either the mold or the entire structure of modular EPCM meshes can be 3-D printed. Polymer encapsulants with diverse EPCM shapes may be used to reduce the weight and cost of the EPCM mesh, while providing a design that can meet the target of a greater than 30 years lifespan.

In ensuring that the HDPE tubes can achieve a minimum of a 30-year service life at the designed internal pressure, ASTM D1598 can be used to establish a ductile-brittle curve (as shown in FIG. 39) for tubes made from HDPE with a unimodal and bimodal molecular weight distribution. Using time-temperature superposition (Eq. 2), the predicted onset time of Stage II should be >30-years with 97.5% confidence, using statistical method described in ISO9080. Additionally, tube samples can be evaluated for its fatigue behavior by subjecting it to fluctuated internal pressures $$\log t = A + \frac{B}{T} + \frac{C \cdot \log \sigma}{T} \qquad (2)$$

where t is time (hr.), T is test temperature (K), $\sigma$ is applied stress, and A, B and C are material constants.

The depletion rate of AO can be evaluated using the Arrhenius model so that the lifetime can be predicted at the service temperature. HDPE blended with known AO formulations may be used. The baseline will be established using Irganox® 1010 (I-1010) which is a widely used hindered phenol type of AOs for HDPE. AOs with greater water leaching resistance and/or with ultraviolet light protection may be used if the depletion rate of I-1010 is too fast. Furthermore, the change of wettability with aging time should be considered. The low molecular weight fraction of the polymer, which tends to migrate to the tube surface during the extrusion, may degrade faster causing changes in the wettability.

The embodiments of the invention described above, paired with a well-optimized surface condenser provides the following benefits:

It is cost effective.

It has no net water dissipation, except for a practically negligible heat exchange surface evaporation loss (<0.5% evaporation loss of a typical wet cooling tower).

It achieves power production efficiency similar to wet cooling towers.

It meets or exceeds all the Category 3 targets.

The EPCM structure is environmentally benign and robust, eliminating all drift or particulate losses to the environment as well as the inevitable contamination that would be encountered with liquid coolants exposed to the air. The invention includes cost-effective manufacturing and maintenance strategies for the recirculating EPCM meshes to allow for durable operation and long lifetimes. To account for various weather conditions, EPCM modules with a variety of melting points can be manufactured and implemented at different geographic locations. In addition, two or more EPCMs with different melting points can be mixed at an optimal ratio to compensate for large ambient temperature variations and to improve steam condensation temperature and net power production gain.

Full-Scale System for Year-Round Operation

The EPCM module, hot water injection, drainage, and air path and fan configuration can be part of the full-scale system. For different geographic and weather conditions, year-round operation strategies, including structures with a mixture of EPCM of different melting points and weight ratios may be used. Strategies to reduce potential water loss including the use of hydrophobic materials, automatic shaking, and active mechanical removal of water droplets may be employed.

Figure 45:
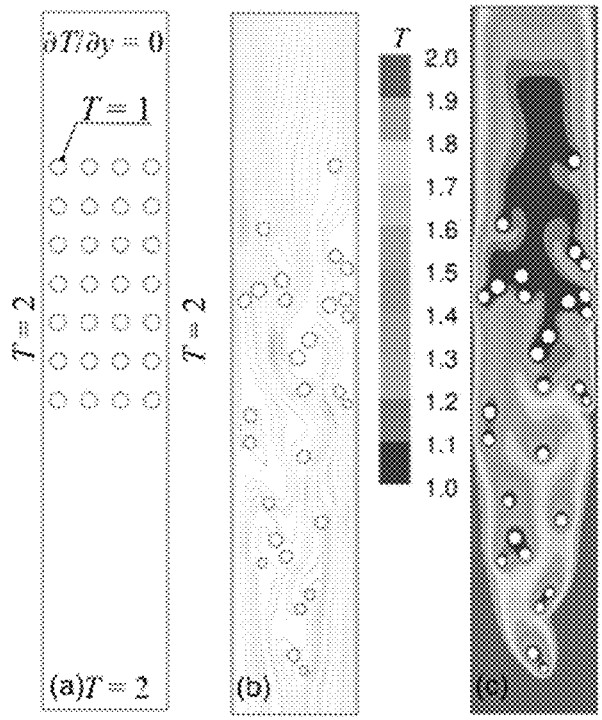
FIG. 45 are results for testing the PCM materials of the present invention.
Figure 46:
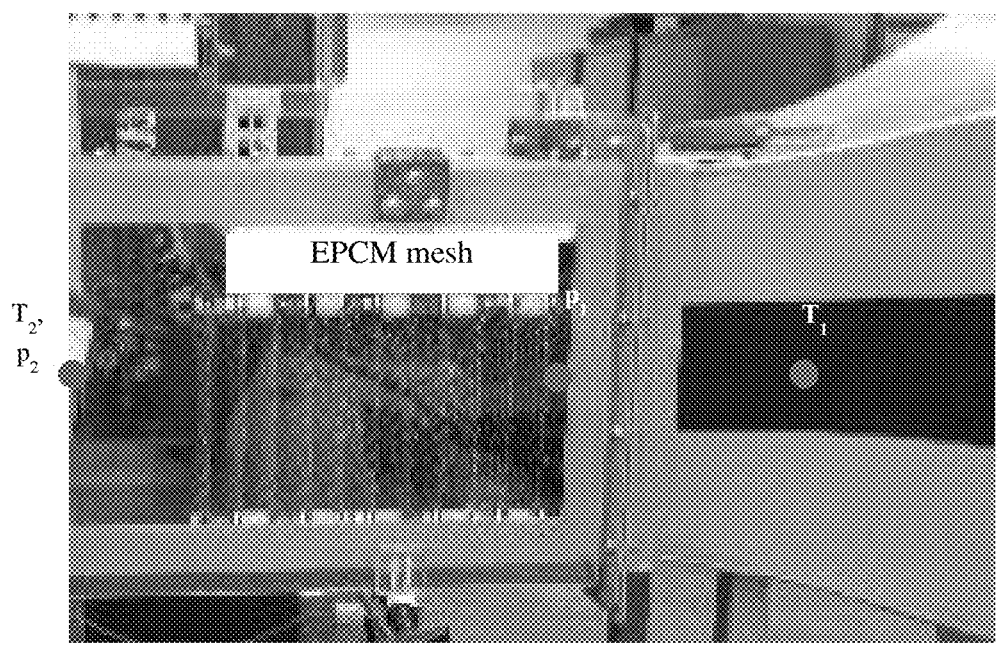
FIG. 46 is a picture of a wind tunnel used for testing the mesh of the present invention.
Figure 47:
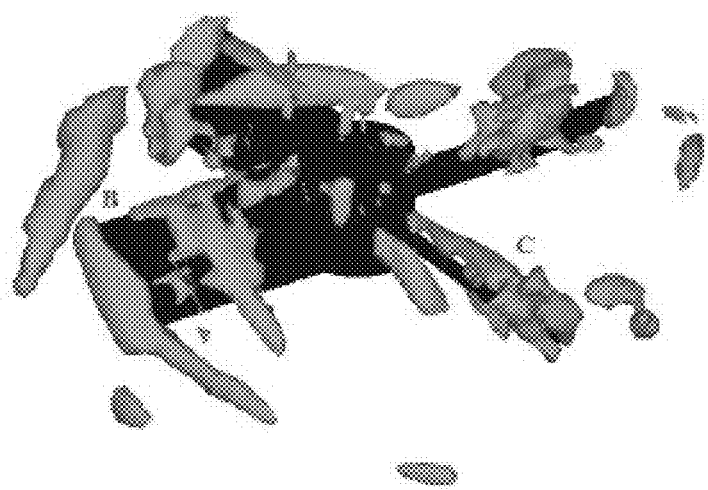
FIG. 47 is a computer simulated image of flow structures past a rotating impeller blade.

The full-scale system may include the entire recirculating porous structure, heated water (from condenser) injection, air flow injection and fans, and the draft tower. With the appropriate thermal boundary conditions (overall coefficient that includes the heat transfer coefficient and the conduction resistance between the PCM and the air), the air flow patterns, fan configuration and locations, and the draft tower design with the recirculating mesh can be used to demonstrate the system performance and to determine the fan locations, the draft tower configuration, and the air flow patterns for pressure drop and thermal performance. The tube-side boundary conditions, PCM temperatures during the phase change periods are known. To accommodate the rotating EPCM structure and the stationary features along the confining boundaries (such as fan locations), a stationary numerical grid can be used in a RANS calculation. The size and geometrical complexity further dictates the necessity of using a simplified grid configuration such as a Cartesian or a cylindrical curvilinear grid. The geometrical complexities and rotational surfaces embedded within this simplified grid can be addressed using the Immersed Boundary Method. The Immersed Boundary technique and Cartesian grids may be used for studying flow and mixing in stirred tanks used in the chemical industry with rotating mechanical agitators and impeller blades (FIG. 45).

With such an approach, the computational effort required for the grid generation can be minimized, and cost-effective simulations can be undertaken to determine the fan locations, air injection patterns, the recirculating mesh configuration, and the draft tower geometry for maximum performance from both the pressure drop and thermal perspectives. Measured data (pressure drop, heat transfer etc) can then be used to check the system-level simulation.

EXAMPLE 2

Design Construction and Testing of 50 kW$_{th}$ Cooling System

Figure 48:
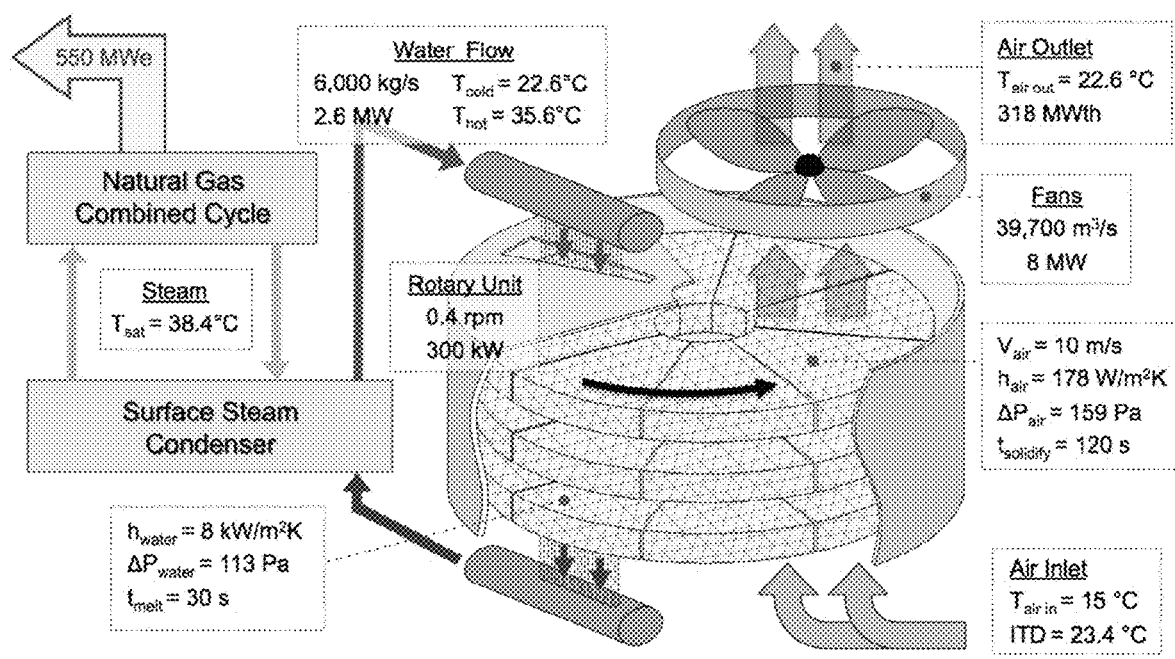
FIG. 48 is a schematic diagram of FIG. 30 showing preferred parameters for operating the heat exchanger of FIG. 30.

A 50 kW$_{th}$ cooling system may be fabricated. An EPCM structure with optimal thermal-fluid performance can be integrated with the candidate water drainage strategy in the design of individual EPCM layers. Baseline design parameters, thermal performance estimations, and basic materials properties are summarized in FIG. 48, as well as in Table 13, and Table 14 below for a 550 MWe natural gas combined cycle (NGCC) plant based on the assumptions of National Energy Technology Laboratory (NETL) Case 13. See, DOE/ NETL, Cost and Performance Baseline for Fossil Energy Plants, Volume 1: Bituminous Coal and Natural Gas to Electricity, Rev. 2, DOE/NETL-2010/1397, (2010). The results of the system-level model can be used to design the rotary heat exchanger unit comprised of numerous EPCM layers, as well as the operating conditions for the fluid handling equipment (air and water). The 50 kW$_{th}$ system consists of a 2 m diameter rotary heat exchanger unit with three 0.1 m thick disk shaped EPCM modules. This design results in approximately 1 m$^3$ of the highly porous EPCM material, containing approximately 34 kg of PCM within the polymer structure.

Cost and Performance Analysis

In this section, estimated cost and performance of the proposed recirculating EPCM cooling tower for a 550 MW NGCC power plant (FIG. A1) based on basic assumptions and material properties listed in Table 13 is presented. The majority of thermo-fluidic analyses are based on fundamental Fluid Mechanics, Heat Transfer, and Thermodynamics textbooks. The analysis is performed at an ambient air temperature of $T_{air} = 151°$ C. Radiation heat transfer is neglected.

TABLE 13

Basic assumptions and material properties

| Parameter | Value | Parameter | Value |
|---|---|---|---|
| NGCC heat load, $P_{total}$ | 318 MW | Water density, $\rho_{water}$ | 998 kg/m$^3$ |
| Air temperature, $T_{air}$ | 15° C. | Water specific heat, $c_{p,water}$ | 4.179 kJ/kg-K |
| Air density, $\rho_{air}$ | 1.2 kg/m$^3$ | Water conductivity, $k_{water}$ | 0.58 W/m-K |
| Air specific heat, $c_{p,air}$ | 1.01 kJ/kg-K | Water viscosity, $\upsilon_{water}$ | 8.94 × 10$^{-7}$ m$^2$/s |
| Air conductivity, $k_{air}$ | 0.0247 W/m-K | Water Prandtl #, $Pr_{waterS}$ | 7.01 |
| Air viscosity, $\upsilon_{air}$ | 1.6 × 10$^{-5}$ m$^2$/s | Footprint, m$^2$ | 80 × 40 |
| Air Prandtl #, $Pr_{air}$ | 0.7 | PCM cost, $/kg | 1 |
| PCM density, $\rho_{PCM}$ | 787 kg/m$^3$ | Polymer cost, $/kg | 2.4 |
| PCM conductivity, $k_{PCM}$ | 0.402 W/m-K | PCM latent heat, $H_{fs}$ | 240 kJ/kg |
| Standard gravity, g | 9.8 m/s$^2$ | Ball bearing friction coef, $f_m$ | 0.005 |
| Fan efficiency, $\eta_{fan}$ | 85% | Motor and gear efficiency, $\eta_m$ | 93% |
| Pump and motor efficiency, $\eta_p$ | 78% | | |

Table 14 summarizes the baseline recirculating EPCM dry cooling tower design parameters for EPCM mesh, water condenser, and air flow to achieve desired performance parameters. As highlighted in Table 14, the calculated air-side convection heat transfer coefficient is $h_{air}$=178W/m$^2$K, about 4x larger than complex finned tubes in current ACC designs. The details of the air-side heat transfer analysis are shown in Worksheet 1. Worksheet 1 shows equations for heat and mass balance, and geometric relations. The air-side convective heat transfer coefficient $h_{air}$ is determined based on Nusselt number correlation for flow across a cylinder. The air-side pressure drop $\Delta P_{air}$ is calculated using correlations for airflow acros tube bundles where the pressure drop across mesh is approximated as twice as large as tube bundles.

Figure 49:
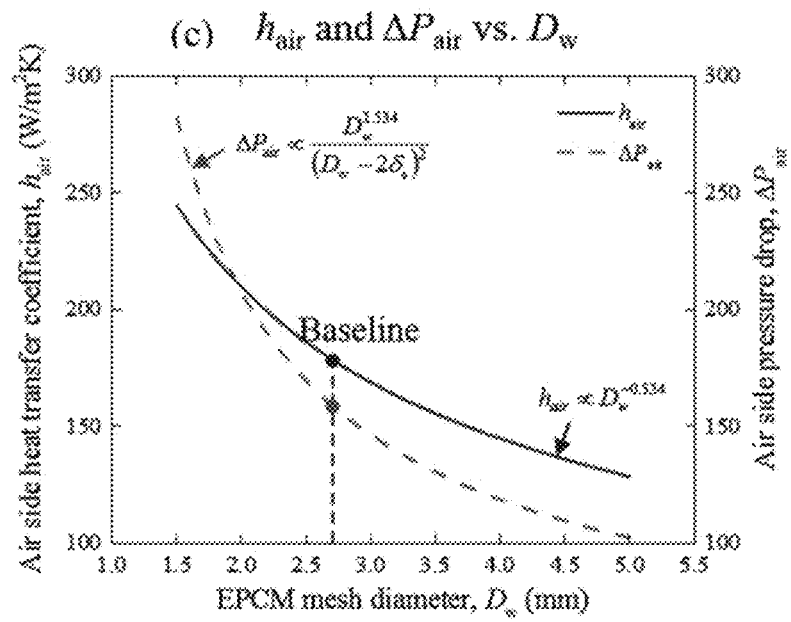
FIG. 49 is a schematic diagraph showing the inside of a tube of FIG. 33.

As shown in FIG. 49, decreasing EPCM mesh diameter $D_w$ leads to a larger heat transfer coefficient but also a larger air-side pressure drop. Also, in order to keep the mechanical strength of the mesh, the polymer shell thickness could not be decreased with $D_w$. Therefore, decreasing EPCM mesh diameter makes the volume ratio of polymer shell and PCM core increase (i.e. $v_s$/VPCM'(1-$\delta_s$/$D_w$)$^2$) and thus consumes more energy to rotate the mesh. The baseline design parameters are chosen at $D_w$=2.7 mm where $h_{air}$ is 4 times larger than an ACC and at the same time $\Delta P_{air}$ is within 1.5 times of an ACC. The flow rate of air is calculated based on the heat balance between the heat load and the heat dissipated into air using Eq. 10. The required fan power is calculated as the product of the pressure drop and air flow rate.

TABLE 14

Baseline recirculating EPCM dry cooling tower design parameters

| Parameter | Value | Parameter | Value |
|---|---|---|---|
| EPCM 1 melting point, $T_{PCM1}$, ° C. | 21.6 | Condenser water inlet temp, $T_{cold}$, ° C. | 22.6 |
| EPCM 2 melting point, $T_{PCM2}$, ° C. | 35.6 | Cond. water out temp, $T_{hot}$, ° C. | 35.6 |
| Condensation temp, $T_{sat}$, ° C. | 38.4 | Ratio of PCM1:PCM2, $r_{PCM}$ | 0.432:0.568 |
| EPCM wire outer dia., $D_w$, mm | 2.7 | PCM solidification time, $t_{solid}$, s | 120 |
| EPCM wire core dia., $D_{PCM}$, mm | 2.3 | Air velocity, $V_{air}$, m/s | 10 |
| EPCM in-plane spacing, s, mm | 8.1 | Air-side heat transfer co, $h_{air}$, W/m$^2$K | 178 |
| EPCM out-of-plane spacing, $s_l$, mm | 25 | Air-side pressure drop, $\Delta P_{air}$, Pa | 159 |
| EPCM mesh porosity, ε, % | 94.3 | PCM melting time, $t_{melt}$, s | 30 |
| EPCM rotary unit diameter, $D_o$, m | 20 | Cond. water flow rate, $Q_{water}$, m$^3$/s | 5.9 |
| EPCM rotary unit height, $H_r$, m | 15 | Water-side heat trans. coef, $h_{water}$, W/m$^2$K | 7,896 |
| # of EPCM rotary unit, $N_r$ | 8 | Water-side press drop, $\Delta P_{water}$, Pa | 113 |
| # of EPCM module per unit, $N_{module}$ | 15 | PCM weight, $m_{PCM\_total}$, kg | 298,209 |
| Thickness of EPCM module, m | 0.1 | PCM volume, $v_{PCM\_total}$, m$^3$ | 379 |
| EPCM rotating speed, ω, rpm | 0.4 | Fan power, $P_{fan}$, kW | 8,239 |
| Rotary shaft diameter, $D_i$, m | 2 | Pumping power, $P_{pump}$, kW | 2,600 |
| EPCM shell weight, $m_{shell}$, kg | 186,236 | Power to move mesh, $P_{emotion}$, kW | 300 |

Figure 50:
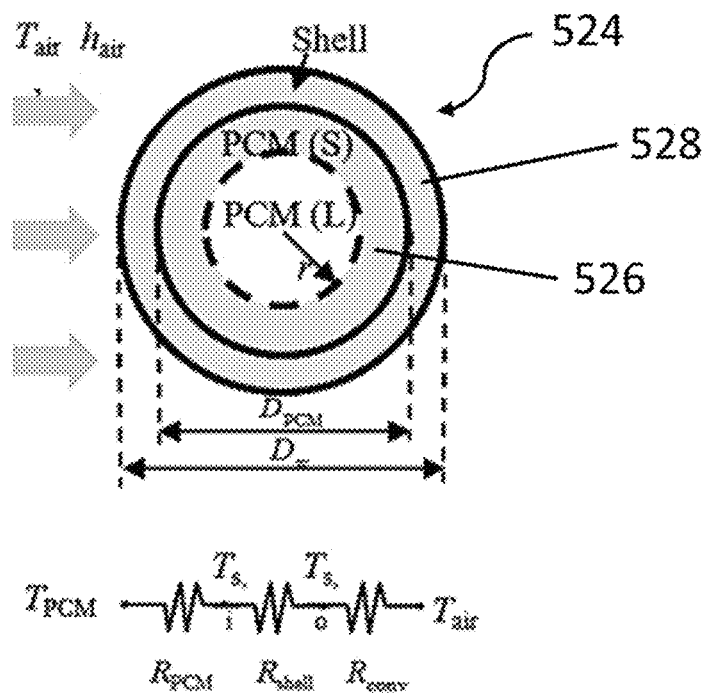
FIG. 50 is a graph showing an air side heat transfer coefficient as related to mesh diameter.
Figure 51:
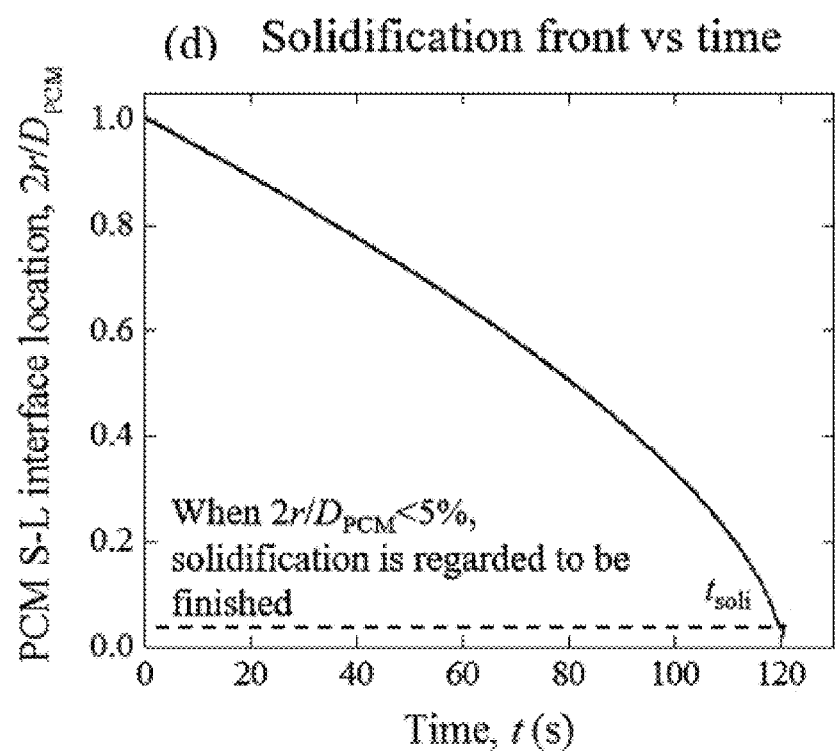
FIG. 51 is a graph showing the solidification front of a PCM versus time.

Solidification and melting times are determined based on phase change analysis in a cylinder, as shown in the schematic in FIG. 50. The heat generated by solidification of PCM at the interface between the solid and liquid phases is conducted across the solid phase of the PCM, polymer shell and finally dissipated to the air. In solidification of EPCM mesh, the air convective resistance is still the dominant resistance. FIG. 51 shows the solidification front as a function of time. It is defined here when the solidification front reaches 2r/$D_{PCm}$=5% (i.e. the liquid PCM occupies 0.013% of the entire PCM volume), solidification is regarded as finished and the time for 2r/$D_{PCM}$ reaching 5% is the solidification time $t_{solid}$.

As for water-side heat transfer, the same set of equations could be used for analysis by replacing the air properties with water properties. It is noted that the water-side heat transfer coefficient $h_{water}$ is much larger than $h_{air}$ due to the large thermal conductivity of water. Thus, for melting of EPCM, the conductive resistance of PCM and the polymer shell are the dominant resistance. Since the present design requires water to be pumped to $H_r=15m$, the pumping power includes both the pressure drop through the condenser and piping system and the 15m static head, as calculated using Eq. 19.

Worksheet 1: Air side heat transfer and flow mechanics parameters
(a) Equations for heat and mass balance and geometric relations

| Equation | # |
|---|---|
| $Nu_{air} = 0.683\, Re_D^{0.466}\, Pr^{1/3}$ | 1 |
| $h_{air} = \dfrac{Nu_{air} k_{air}}{D_w}$ | 2 |
| $Re_D = \dfrac{U_{air} D_w}{V_{air}}$ | 3 |
| $\dot{m}_{PCM} = \dfrac{P_{total}}{H_{fs}}$ | 4 |
| $m_{PCM} = r_{PCM}\dot{m}_{PCM}(t_{soli} + t_{melt})$ | 5 |
| $v_{PCM\_area} = \dfrac{2\pi D_{PCM}^2 S}{4}\left(\dfrac{1}{s}\right)^2$ | 6 |
| $A_r = \pi(D_o^2 - D_i^2)/4$ | 7 |
| $n_{layer} = \dfrac{m_{PCM}}{\rho_{PCM} v_{PCM\_area} N_r A_r}$ | 8 |
| $\Delta P_{air} = 2n_{layer} f_\chi \dfrac{\rho_{air} U_{air}^2}{2}$ | 9 |
| $P_{total} = c_{p,air}\rho_{air}Q_{air}\Delta T_{air}$ | 10 |
| $P_{fan} = \Delta P_{air} Q_{air}/\eta_{fan}\eta_m$ | 11 |
| $R_s = \dfrac{\ln(D_w/D_{PCM})}{2\pi k_s}$ | 12 |
| $D_{PCM} = D_w - 2\delta_s$ | 13 |
| $R_{air} = \dfrac{1}{h_{air}\pi D_w}$ | 14 |
| $R_{PCM}(t) = \dfrac{\ln(D_{PCM}/2r(t))}{2\pi k_{PCM}}$ | 15 |
| $T_{s,o} - T_{air} = \dfrac{T_{air} - T_{PCM}}{R_{PCM} + R_s + R_{air}} R_{air}$ | 16 |
| $\omega = 1/(t_{soli} + t_{melt})$ | 17 |
| $P_{motion} = f_m(m_{PCM} + m_s)g\omega D_i/2$ | 18 |
| $P_{pump} = (Q_{water} g H_r + Q_{water}\Delta P_{water})/\eta_p$ | 19 |
| $\rho_{PCM} H_{fg} 2\pi r \dfrac{dr}{dt} = h_{air}\pi D_w(T_{s,o} - T_{air})$ | 20 |
| $r(0) = D_{PCM}/2$ | |

The amount of PCM that needs to go through phase change per unit time (PCM recirculating rate) is calculated based on the assumption that all of the heat load is dissipated by melting PCM using Eq. 4. For a single-PCM design, the total amount of PCM could be determined as the product of the PCM recirculating rate and the total cycle time (solidification time plus melting time). However, a dual-PCM design may be used in order to achieve good performance in a range of ambient temperatures (instead of a one-PCM design point) and the cooling system could work efficiently year round without changing PCM. The problem that dual-PCM design brings is that at high ambient temperature only the high melting point PCM works and all the low melting point PCM (PCM1) is at its liquid state, the total amount of PCM (PCM1+PCM2) is higher than single-PCM design but lower than two times of single-PCM design because both PCM1 and PCM2 are effective at low temperatures. The ratio between dual-PCM design and single-PCM design is denoted as rpcM. In the present design, dual PCM (PCM1 with melting point of 21.6° C. and PCM2 with melting point of 35.6° C.) is used and $r_{PCM}=1.75$. The total amount of PCM is determined using Eq. 5 with solidification time and melting time and the factor $r_{PCM}$ introduced for the dual-PCM design. For an air temperature <21.6° C., both PCMs are effective. For an air temperature >21.6° C., only PCM2 is effective while PCM1 is kept in liquid state.

TABLE 15

Performance and Cost Comparisons: Wet Cooling Tower vs. EPCM Dry Cooling
Design base: 15° C. Dry Bulb, 10.8° C. Wet Bulb

|  | Wet cooling (DOE Case 13) | EPCM Dry Cooling | Remarks |
|---|---|---|---|
| 1. Cooling Tower Design Parameters | | | |
| Water Inlet Temperature, ° C. | 26.7 | 35.6 | |
| Water Outlet Temperature, ° C. | 15.6 | 22.6 | |
| Fan Power, kW | 1,190 | 8,239 | Using $\Delta P_{air} = 159$ Pa and 70.9° F. air exit temperature |
| 2. Steam Condenser Design Parameters | | | |
| Condenser Pressure, kPa | 6.77 | 6.77 | |
| Steam Condensation, ° C. | 38.4 | 38.4 | |
| Water Inlet Temperature, ° C. | 15.6 | 22.6 | |
| Water Outlet Temperature, ° C. | 26.7 | 35.6 | |
| Water Flow, kg/s | 6,737 | 5,768 | |
| Condenser Duty, MWth | 318.0 | 318.0 | Consistent w/ APRA-E |
| Condenser TTD, ° C. | 11.7 | 2.8 | Commonly used condenser |

TABLE 15-continued

Performance and Cost Comparisons: Wet Cooling Tower vs. EPCM Dry Cooling
Design base: 15° C. Dry Bulb, 10.8° C. Wet Bulb

|  | Wet cooling (DOE Case 13) | EPCM Dry Cooling | Remarks |
|---|---|---|---|
| 3. Circulating Water Pump Design Parameter | | | |
| Water Flow, kg/s | 6,737 | 5,768 | Excl. water flow for plant closed cooling water |
| Pump Head, m | 30.5 | 36.6 | Single/two pass condenser |
| Incremental Pump Power Increase, kW | Base | 71 | 78% total efficiency for pump and motor |
| 4. Other Design Requirement | | | |
| Power Consumptions for Rotary Cooler, kW | — | 300 | Excl. the fan power |
| 5. Plant Performance | | | |
| Gas Turbine Output, kW | 362,200 | 362,200 | |
| Steam Turbine Output, kW | 202,500 | 202,500 | |
| Plant Gross Output, kW | 564,700 | 564,700 | |
| Plant Auxiliary Power, kW | 9,620 | 17,040 | |
| Plant Net Output, kW | 555,080 | 547,660 | |
| Plant Net Heat Rate, Btu/kWh (HHV) | 6,792 | 6,884 | |
| Plant Net HHV Efficiency, % | 50.25% | 49.58% | |
| 6. Capital Cost Estimate, ×1000$[1] | | | |
| Cooling Tower - Equipment | 3,880 | 18,000 | Based on rotary cooler |
| Cooling Tower - Total Installed | 5,224 | 27,900 | |
| Condenser - Equipment | 4,108 | 6,600 | |
| Condenser - Total Installed | 6,370 | 10,300 | |
| Circulating Water Pump - Equipment | 1,142 | 1,200 | |
| Circulating Water Pump - Total Installed | 1,425 | 1,500 | |
| Circulating Water Piping - Total Installed | 4,189 | 3,800 | |
| Circulating Water System Foundation | 4,618 | 7,000 | |
| EPCM Initial Filling Cost | — | 770 | Based on polymer shell |
| Total Cooling System Cost | 21,826 | 51,270 | |
| Total Cooling System Cost, Excl. Condenser | 15,456 | 40,970 | |
| Total Cooling System Cost, $/kWth | 69 | 161 | |
| Total Cooling System Cost (Excl. Condenser), $/kWth | 49 | 129 | |
| 7. LCOE[2] | | | |
| Calculated LCOE, $/MWh | 74.65 | 77.35 | |
| Difference, % | Base | 3.62% | |

[1]Cost data for wet cooling tower configuration is extracted from DOE fossil power baseline study report.
[2]LCOE calculation is based on a model reproduced from DOE Baseline study report.

Table 15 summarizes the capital cost and power consumption of a recirculating EPCM dry cooling tower. The capital cost of the EPCM recirculating cooling tower system includes the material cost of PCM, shell of EPCM mesh, circulating water system and cooling tower including the rotary shell and rotating device. The capital cost includes both equipment cost and installation cost. The auxiliary power in the cooling tower includes the fan power, water pumping power, and power consumption to move EPCM mesh. It is noted that the total plant auxiliary power estimated here is conservatively high and could be mitigated with further optimization, such as recovering power from falling water using a turbine, shooting falling water on rotary with an angle of attack chosen to propel the rotation, and designing hydrodynamic shape of EPCM rather than cylindrical wire to reduce pressure drop.

The baseline performance parameters listed in Table 14 are based on the design point at ambient temperature of 15° C. As ambient temperature increases, the condensation temperature increases but the power consumption remains the same. FIG. 29 illustrates the variations in net plant efficiency and steam condensation temperature as a function of ambient DB temperature for the proposed indirect dry cooling, together with the ARPA-E dry cooling model.

The net plant efficiency increase is estimated based on 0.6% increase per 5.5° C. decrease of steam condensation temperature when the ambient temperature is above 15° C. The proposed recirculating EPCM dry cooling design leads to the same condensation temperature and net plant efficiency with wet cooling at the design point of 15° C. ambient temperature, and out-performs the ARPA-E dry cooling model in the temperature range of 15-29° C. At an ambient temperature of 15° C., the low melting point PCM (PCM1) is working at its full capacity and part of the high melting point PCM (PCM2) is working. As ambient temperature increases, less PCM1 works because of smaller difference between air temperature and PCM1 melting point. As a result, the condensation temperature increases. For an ambient temperature >21.6° C., PCM1 remains in liquid form and only PCM2 is working and the condensation temperature is thus fixed.

Table 10 on page 33 above, compares the EPCM technology with NETL Case 13 wet cooling, ARPA-E dry cooling model at the design point of 15° C. ambient dry bulb (DB) temperature, and the FOA Category 3 targets. The proposed solution will achieve ARID program objectives and Category 3 targets by taking advantage of the high latent heat of solid-liquid phase change that effectively absorbs heat from the condenser water and dissipates heat to the ambient air. Continuously circulating the EPCM meshes between the air and water sides creates a short-duration thermal storage system that effectively rejects heat at the PCM melting temperature using a compact system design.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A heat exchanger for cooling a fluid comprising:
   a plurality of phase change material modules mounted for rotation about a central axis to form a porous structure having a porosity of from 94% to 98%, each said phase change material module including a plurality of hollow structures and a phase change material housed within the hollow structures;
   a first fluid inlet positioned to direct the fluid through the porous structure for contact between the first fluid and an outer surface of the hollow structures;
   a first fluid outlet for removing the first fluid from the heat exchanger and located to receive the first fluid after contact with the hollow structures;
   a second fluid inlet positioned to direct a second fluid through the porous structure for contact between the second fluid and the outer surface of the hollow structures; and
   a second fluid outlet for removing the second fluid from the heat exchanger and located to receive the second fluid after contact with the hollow structures;
   wherein rotation of the plurality of phase change material modules repeatedly circulates the porous structure of the modules into alignment with the first fluid inlet and the second fluid inlet, and the phase change material is selected to undergo a phase change as a result of heat exchange with each of the first and second fluids, and the outer surfaces of the hollow structures are formed from a hydrophobic material.

2. The heat exchanger of claim 1, wherein said phase change material is selected from the group consisting of paraffinic hydrocarbons and fatty acids.

3. The heat exchanger of claim 1, comprising at least two sets of hollow structures in each said phase change material module and wherein a longitudinal axis of each hollow tube of one said set is substantially aligned in an intended fluid flow direction of the first fluid.

4. The heat exchanger of claim 3, wherein a distance between said hollow structures of one said set, as measured in a direction substantially parallel to the intended fluid flow direction of the first fluid, is from about 1 to about 5 times a largest distance across one said hollow structure, as measured in the direction substantially parallel to the intended fluid flow direction of the first fluid and a distance between said hollow structures of another said set, as measured in a direction substantially perpendicular to an intended fluid flow direction of the first fluid is from about 4 to about 16 times a largest distance across one said hollow structure in a direction substantially parallel to the intended fluid flow direction of the first fluid.

5. The heat exchanger of claim 1, wherein the hollow structures have a length of a cross-section of the hollow structures that is at least twice as long as a width of the same cross-section of the hollow structure.

6. The heat exchanger of claim 1, further comprising a drainage section operatively configured to recapture some of the first fluid and located between the first fluid inlet and the second fluid outlet, based on a direction of the rotation of the plurality of phase change material modules and including a device for providing an array of pressurized air jets directed at said hollow structures.

7. The heat exchanger of claim 1, wherein the first fluid inlet is fluidly connected to a supply of liquid and the second fluid inlet is fluidly connected to a supply of air and the phase change material freezes at a temperature above a temperature of the air and below a temperature of the liquid.

8. The heat exchanger of claim 1, wherein a flow direction of the first fluid inlet is substantially opposite a flow direction of the second fluid inlet.

9. The heat exchanger of claim 1, wherein said hollow structures have a cross-sectional area through said phase change material selected from the group consisting of elliptical, rectangular, stadium-shaped, teardrop-shaped, airfoil shaped, rounded rectangular, and ovoid.

10. The heat exchanger of claim 1, wherein each of said hollow structures includes a plurality of partitions inside the hollow structure to increase rigidity of the hollow structure.

11. A power plant cooling system or a data center cooling system comprising a plurality of the heat exchangers as claimed in claim 1.

12. The heat exchanger of claim 1, further comprising a drainage section operatively configured to recapture some of the first fluid and located between the first fluid inlet and the second fluid outlet, based on a direction of the rotation of the plurality of phase change material modules.

13. The heat exchanger of claim 3, wherein a longitudinal axis of each of the hollow structures in the second set of hollow structures is substantially aligned perpendicular to an intended fluid flow direction of the first fluid.

14. The heat exchanger of claim 1, wherein the phase change material is selected to undergo a phase change between a liquid phase and a solid phase, and an additional liquid is also located within each said hollow tube to form a slurry of said solid phase of the phase change material in said additional liquid.

* * * * *